US007562287B1

(12) United States Patent
Goldstein et al.

(10) Patent No.: US 7,562,287 B1
(45) Date of Patent: Jul. 14, 2009

(54) SYSTEM, METHOD AND APPARATUS FOR SELECTING, DISPLAYING, MANAGING, TRACKING AND TRANSFERRING ACCESS TO CONTENT OF WEB PAGES AND OTHER SOURCES

(75) Inventors: Eric Goldstein, New York, NY (US); Derek Krzanowski, Arkdale, WI (US)

(73) Assignee: Clipmarks LLC, New York, NY (US)

( * ) Notice: Subject to any disclaimer, the term of this patent is extended or adjusted under 35 U.S.C. 154(b) by 516 days.

(21) Appl. No.: 11/207,177

(22) Filed: Aug. 17, 2005

(51) Int. Cl.
*G06F 17/00* (2006.01)
(52) U.S. Cl. .................... 715/201; 715/234
(58) Field of Classification Search ............ 715/201, 715/234
See application file for complete search history.

(56) References Cited

U.S. PATENT DOCUMENTS

| | | | |
|---|---|---|---|
| 5,734,380 A | 3/1998 | Adams et al. | |
| 5,751,283 A | 5/1998 | Smith | |
| 5,754,175 A | 5/1998 | Koppolu et al. | |
| 5,838,906 A | 11/1998 | Doyle et al. | |
| 5,877,765 A | 3/1999 | Dickman et al. | |
| 5,893,091 A * | 4/1999 | Hunt et al. ................ | 707/3 |
| 5,897,644 A | 4/1999 | Nielsen | |
| 5,933,142 A | 8/1999 | LaStrange et al. | |
| 6,008,809 A | 12/1999 | Brooks | |
| 6,023,275 A | 2/2000 | Horvitz et al. | |
| 6,037,934 A | 3/2000 | Himmel et al. | |
| 6,052,130 A | 4/2000 | Bardon et al. | |
| 6,185,589 B1 | 2/2001 | Votipka | |
| 6,215,502 B1 | 4/2001 | Ferguson | |
| 6,216,141 B1 | 4/2001 | Straub et al. | |
| 6,272,493 B1 | 8/2001 | Pasquali | |
| 6,278,448 B1 | 8/2001 | Brown et al. | |

(Continued)

OTHER PUBLICATIONS

Sarawagi, Sunita, et al, "Learning to Extract Information From Large Domain-Specific Websites Using Sequential Models", ACM SIGKDD Explorations Newsletter, vol. 6, Issue 2, Dec. 2004, pp. 61-66.*

(Continued)

*Primary Examiner*—Laurie Ries
(74) *Attorney, Agent, or Firm*—St. Onge Steward Johnston & Reens LLC

(57) ABSTRACT

A method, system and apparatus for selecting, displaying, managing, tracking and transferring access to content of Internet web pages and other sources along with custom text messages has programming permitting a user to create custom selections of selected image, animation, movie and text content items, and other types of content items from web pages or other sources from the same or different network sources containing multiple content items, along with user-supplied text messages, in an independent, resizable, rescalable browser window; permitting the user to transfer access to the custom selection of content items to a recipient; permitting the user or recipient to navigate quickly to a source of a content item in the custom selection; and permitting the user to define search keywords for performing searches related to content items in a custom selection; and other features. A method of tracking viewing and sharing activities of content items and custom selections of content items by users and recipients is also disclosed. A method of assisted content selection provides temporary borders around content items on mouseover. A method of Dynamic Content Display provides updating of selected content items.

10 Claims, 41 Drawing Sheets

U.S. PATENT DOCUMENTS

| | | | |
|---|---|---|---|
| 6,289,362 B1 | 9/2001 | Van Der Meer | |
| 6,310,631 B1 | 10/2001 | Cecco et al. | |
| 6,321,209 B1 | 11/2001 | Pasquali | |
| 6,396,500 B1 | 5/2002 | Qureshi et al. | |
| 6,405,221 B1 | 6/2002 | Levine et al. | |
| 6,434,563 B1 | 8/2002 | Pasquali et al. | |
| 6,463,460 B1 | 10/2002 | Simonoff | |
| 6,535,882 B2 | 3/2003 | Pasquali | |
| 6,571,295 B1 | 5/2003 | Sidana | |
| 6,605,120 B1 * | 8/2003 | Fields et al. | 715/239 |
| 6,636,856 B2 | 10/2003 | Pasquali | |
| 6,658,419 B2 | 12/2003 | Pasquali | |
| 6,684,218 B1 * | 1/2004 | Santos et al. | 707/102 |
| 6,687,878 B1 | 2/2004 | Eintracht et al. | |
| 6,697,838 B1 | 2/2004 | Jakobson | |
| 6,859,909 B1 | 2/2005 | Lerner et al. | |
| 6,877,137 B1 | 4/2005 | Rivette et al. | |
| 6,944,821 B1 | 9/2005 | Bates et al. | |
| 6,959,424 B1 | 10/2005 | Gardner et al. | |
| 7,243,301 B2 | 7/2007 | Bargeron et al. | |
| 2002/0032693 A1 * | 3/2002 | Chiou et al. | 707/500 |
| 2002/0078050 A1 * | 6/2002 | Gilmour | 707/9 |
| 2002/0198758 A1 * | 12/2002 | Sawa et al. | 705/9 |
| 2003/0048286 A1 | 3/2003 | Lal | |
| 2003/0081000 A1 | 5/2003 | Watanabe | |
| 2003/0204490 A1 | 10/2003 | Kasriel | |
| 2003/0212666 A1 * | 11/2003 | Basu et al. | 707/3 |
| 2003/0221167 A1 | 11/2003 | Goldstein et al. | |
| 2004/0014013 A1 * | 1/2004 | Diesel et al. | 434/118 |
| 2004/0021686 A1 | 2/2004 | Barberis | |
| 2004/0138946 A1 | 7/2004 | Stolze | |
| 2004/0186817 A1 | 9/2004 | Thames et al. | |
| 2006/0004703 A1 | 1/2006 | Spivack et al. | |
| 2006/0116994 A1 | 6/2006 | Jonker et al. | |
| 2006/0173985 A1 | 8/2006 | Moore | |

OTHER PUBLICATIONS

Netscape Communicator 4.75 (Netscape) copyright 2000, pp. 1-18.
Homer et al. Instant HTML, copyright 1997, p. 139.
MicroSoft Word 2000 (Microsoft Word), copyright 1999, pp. 1-4.
Netscape Navigator 3.01 (Netscape 3.01), copyright 1996, pp. 1-3.
Using an Octopus to Drive Non-Members to Your Reviews; Epinions. com, Nov. 28, 2000'.
NAR's Web Intelligence Summary—No. 11; Realtor.org, Jul. 2000.
Better Ways to Browse the Web; Harry McCracken, PCWorld.com, Oct. 27, 2000.
Octopus Revamps Web Customization Service; Tom Spring, PCWorld.com, Jul. 7, 2000.
Octopus.com Partners With Content Providers; Writenews.com, Aug. 9, 2000.
Octopus CEO Steve Douty. (Company Business and Marketing); Kathryn O'Brien, Internet World, Apr. 1, 2001.
Content Goes to Pieces. (Company Business and Marketing); James C. Luh, Internet World, Jul. 1, 2000.
Capturing Images in Netscape Communicator, http://www.internet4classrooms.com/netscape_images.htm, Apr. 15, 2001, pp. 1-3.
Composing and editing Webpages—An overview of Composer and its features, http://wp.netscape.com/eng/mozilla/4.0/handbook/comp.htm, Aug. 9, 2000, pp. 3-6 and 24-27.
Netscape Help—My Netscape, May 2, 2001, http://help.netscape.com/mynetscape/faq.html, pp. 1-6.
Sarawagi et al., "Learning to Extract Information From Large Domain-Specific Websites . . ." ACM SIGKDD Explorations Newsletter, vol. 6, Issue 2, Dec. 2004, pp. 61-66.

* cited by examiner

| Symbol | Name | Last Trade | Change | Volume |
|---|---|---|---|---|
| AA | ALCOA INC | 32.42 2:34PM ET | ↑ 0.08 (0.25%) | 2,900,000 |
| AIG | AMER INTL GROUP | 72.69 2:34PM ET | ↓ 0.34 (0.47%) | 3,142,400 |
| AXP | AMER EXPRESS CO | 50.40 2:34PM ET | ↑ 0.12 (0.24%) | 3,270,600 |
| BA | BOEING CO | 43.60 2:34PM ET | ↑ 0.36 (0.83%) | 1,909,700 |
| C | CITIGROUP | 49.15 2:34PM ET | ↑ 0.16 (0.33%) | 8,133,100 |
| CAT | CATERPILLAR INC | 81.70 2:34PM ET | ↑ 0.80 (0.99%) | 1,341,700 |
| DD | DU PONT CO | 44.50 2:34PM ET | ↓ 0.49 (1.09%) | 2,827,300 |
| DIS | WALT DISNEY CO | 24.38 2:34PM ET | 0.00 (0.00%) | 6,136,500 |
| GE | GENERAL ELEC CO | 30.80 2:34PM ET | ↑ 0.05 (0.16%) | 19,437,000 |
| GM | GENERAL MOTORS | 49.84 2:34PM ET | ↑ 0.51 (1.03%) | 3,008,100 |
| HD | HOME DEPOT INC | 36.65 2:34PM ET | ↑ 0.30 (0.83%) | 3,653,200 |
| HON | HONEYWELL INTL | 35.63 2:34PM ET | ↑ 0.87 (2.50%) | 2,922,100 |
| HPQ | HEWLETT-PACKARD | 21.41 2:34PM ET | ↓ 0.26 (1.20%) | 6,383,900 |
| IBM | INTL BUS MACHINE | 91.54 2:34PM ET | ↑ 1.11 (1.23%) | 3,304,900 |
| INTC | INTEL CORP | 27.04 2:39PM ET | ↓ 0.11 (0.41%) | 36,309,144 |
| JNJ | JOHNSON & JOHNSON | 54.43 2:34PM ET | ↑ 0.53 (0.98%) | 6,500,100 |
| JPM | JP MORGAN CHASE | 38.77 2:34PM ET | ↑ 0.22 (0.57%) | 5,681,300 |
| KO | COCA COLA CO | 50.66 2:34PM ET | ↓ 0.03 (0.06%) | 4,064,300 |
| MCD | MCDONALDS CORP | 27.30 2:34PM ET | ↓ 0.02 (0.07%) | 2,993,600 |
| MMM | 3M COMPANY | 88.34 2:34PM ET | ↑ 0.59 (0.67%) | 2,324,900 |

FIG. 37
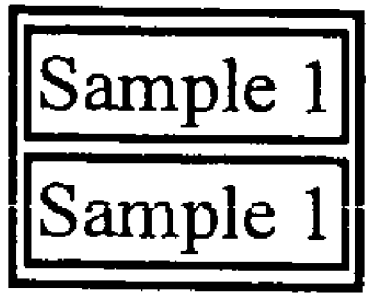
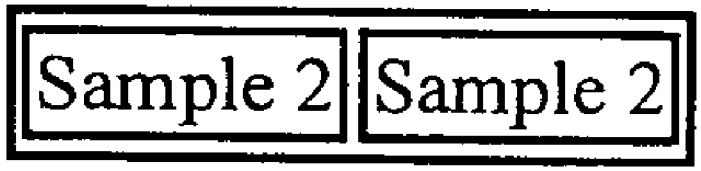

Save Clipmark

CONTENT PREVIEW | BG Color

620

The company said that given China's engineering talent pool and the country's increasing level of innovation, it would continue to evaluate opportunities for R&D expansion in China as well as partnerships with local companies and research organizations.

don't see content?

Tags:* (seperate by commas)    what are tags?

| outsourcing ~ 622 |

Title:*

| China Outsourcing ~ 624 |

Comments: (optional)

| User-entered description ~ 626 |

Folder: (optional) new

| General |

☐ Add clipmark to the public library what is this?

627

[ Save ]  [ Cancel ]

628

*mandatory field

SYSTEM, METHOD AND APPARATUS FOR SELECTING, DISPLAYING, MANAGING, TRACKING AND TRANSFERRING ACCESS TO CONTENT OF WEB PAGES AND OTHER SOURCES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention pertains in general to the World Wide Web, and more particularly to a method, system and apparatus for selecting, displaying, managing, tracking and transferring access to content accessible by computing devices on the World Wide Web and other sources.

BACKGROUND OF THE INVENTION

Interconnected computer systems, such as those interconnected by the Internet, and the like, provide fast and convenient means for obtaining information from various sources throughout the world, and for sharing the information with others. In the world of the Internet, one of the forms of this information is the web page.

An Internet web page can contain a large amount of information and a large number of individual items, such as text, photographs, moving images and the like. The present invention enables Users to quickly and conveniently focus on and display separately selected items of content of a web page, and to share those selected items with other individuals or systems over the network.

The World Wide Web uses a growing variety of media, styles and elements arranged in the form of web pages. These web pages contain various types of content, including text, pictures and other compelling visual formats. As a rule, web pages have a finite amount of usable space in which to place text, images, and other content. Because of this, the authors of the web pages must make compromises in regards to how much space is reserved for textual information, and how much for the other visual aspects (images, animation, video, etc). An analogy can be made to a newspaper. Each section of the paper is provided its own 'space' on the paper itself, with boundaries defining where topics, stories and pictures appear. Since a web page also follows many of these same layout restrictions, elements within a web page are typically restricted to given areas on the page.

One notable difference between the pages of printed matter and the pages of a web site lies in the digital format of the web page. The web page can be dynamic and changeable, whereas the printed pages are fixed and unchanging. But because web pages share much of their layout characteristics with the printed page, even the digital format must obey the space restrictions placed upon it. This is what determines how much space a picture or image gets, in comparison to the text on a page. Text, be it on a printed page or web page, follows normal publishing rules regarding size, font, spacing and other factors affecting the page design. Images, pictures and other rich content, however, are restricted by the remaining limited space available on the page. There is, therefore, a need for a method, system and apparatus that allows users to display selected content from web pages and other sources in separate, scalable, and re-sizeable windows.

Often, as users view web pages, they find that they have no easy or practical way to simultaneously view content from two different web pages or web sites. Some of the methods that have been devised to overcome this limitation include launching multiple instances of a web browser, or opening a link in a new window (both launch a new full instance of the browser). This allows users to try to resize the content within each page or browser instance, and fit both on the screen together. Most browsers will resize, but the contents within the page often will not. Additionally, by opening another fully enabled browser instance, users consume more memory resources than one browser instance would consume. By opening a link in a new window (if permitted), users are still running another full browser instance, and downloading that whole page in its entirety, regardless of which part of the page interests them, wasting time and bandwidth. Most web browsers (and web sites) display one web page at a time. To display more than one page, additional browser instances would be opened. There is, therefore, a need for a method, system and apparatus that allows users to simultaneously display selected content from different web pages in a manner that does not require the user to launch multiple fully-enabled browsers.

If a user wants to share web page content with others, the current and easiest existing method is to E-mail a 'link' to that content. The user would simply copy the URL in the address bar of their browser and paste it into an E-mail message. Another method that is considerably faster is that of Instant Messaging. Online, the user would copy and paste the URL of the shared web page in real-time. This has significant speed advantages, and allows for an almost 'virtual meeting' to take place. Unfortunately, the web pages do not always indicate the URL for the web page a user is viewing. This makes it difficult, if not impossible for the user to 'share' the location of this web page with another user. Another problem is caused by dynamic, form driven pages. These pages may have a number of drop-down lists from which the user could choose, or blank fields that might require user input. Because the URL for the resulting page may not be visible to the end user, it is difficult for a user show another user selected content. Much time is wasted by users having to 'walk' the other user through the entire web site in order for them to see the same results on their browser. There is, therefore, a need for a method and system that allows users to 'share' selected visual content from web pages with other users. There is also, therefore, a need for a method, system and apparatus that allows users to share only selected content from web pages in a manner that saves time and reduces bandwidth use.

The current invention also relates to the 'tracking' of online activity of web users. Existing methods of tracking online activity often involve the use of a 'cookie', which is a small file written to, and then subsequently read from a user's computer. Advertising companies that serve up 'banner ads' are predominant users of these cookie files. As users 'surf' (i.e. view) web pages, 'cookies' are created for the purpose of tracking what pages or web sites the user visits. Companies track, record and sell this information to other companies that are interested in obtaining such data. Many users and privacy advocates are speaking out against the invasive tracking method of using cookies.

While it is true that users can simply choose not to accept a cookie while on a specific web site, much, if not all, of the web site's functionality often becomes inaccessible by doing so. In effect, the web site forces the user to accept the cookies in order to fully use the site. On any given web page, the user can be prompted several times to 'accept' a cookie if their browser settings do not accept them automatically. While the cookie was originally created to allow users to enjoy dynamic content and other rich experiences, today it is mainly a tracking measure. Users have begun to rely on third party software programs to purge their computers of cookie files, only to often have them recreated when they return to the web.

Another tracking method is the 'web bug'. Just as the name implies, web bugs are actually tiny graphics, usually 1 pixel×1 pixel in size. Because of the tiny size of these special graphics, they are extremely hard to notice or even find if you look for them. Much like the cookie file, the web-bugs function is to report back to its server the IP address and other data of a user viewing the web page. Most users have no idea that the web bug is there, let alone what it does. To properly illustrate the hiding power of the web bug, imagine that a microphone is implanted within this very paper you are reading. The size of this microphone is the size of the period at the end of this sentence, and it is painted white to match the paper color perfectly. As newer and more brazen methods of tracking user activity are developed, users continue to develop methods of foiling such data collection efforts.

These tracking and data collection efforts may never end, but they will likely change. Users want privacy, and they expect non-invasive ways for data tracking to be used. Advertisers and content providers, on the other hand, want a tracking solution that provides the most reliable data possible, via a method that cannot be thwarted or spoofed by users. There is, therefore, a need for a method, system and apparatus that tracks online web activity that does not use the preplacement of invasive methods such as cookies or web bugs.

An interesting aspect of some existing data tracking methods is that they are limited to tracking web pages as a whole. Web pages usually consist of a combination of various media and some existing tracking methods cannot discern with any certainty specifically what the user was viewing on each web page. For instance, current tracking methods cannot discern when a user is viewing a specific item on a web page from Site A and also a specific item on a web page from Site B simultaneously. The owner of Site A can only know what page the user views on Site A, but has no way to gather data regarding Site B. An advertiser can place a banner ad on the web pages of both Site A and B, but still does not know what specific item the user viewed on those pages, only that pages were shown to the user. There is, therefore, a need for a method, system and apparatus that allows tracking of specific content that a user chooses to view from web pages. There is also, therefore, a need for a method, system and apparatus that allows tracking of specific visual content that the user chooses from multiple web pages or web sites simultaneously.

Another aspect of the current invention pertains to searching for content on the World Wide Web. Many "search engines" exist today, but users often lack the required skills to use them as efficiently as possible. In order for a search engine to return relevant results to a query, the user must know how to format search criteria. This means the user must know what key words to query, and what combination of key words to use. Users will often not use the correct key words, causing the search results to have little relevance.

Furthermore, because a web page can be comprised of many elements or topics, there may be confusion as to what element in the page to search. If the user were to search a particular web page or site for related information, the user usually gets results relevant to that page, not a specific element of that page.

For instance, if the user were interested solely in one product on a web page, and used existing search engines to search for related sites, the user would likely get results that include sites similar to the site he is on. However, such a user would not get results indicating sites that are both similar to the site and contain the specific product. A real world example might be that of a woman searching for a shoe store that sells a specific brand of shoe. The woman knows that she can find many shoe stores, but she is only interested in shoe stores that carry the brand of shoe she is looking for. This is known as a Boolean or compound query, where more than one search criterion must be met in order to satisfy the search results. There is, therefore, a need for a method, system and apparatus that allows users to search for related sites or information based on selected specific visual content that the user chooses to view from a web page or pages.

With the rapid development and general acceptance of the World Wide Web as the ultimate medium and resource library, software and hardware applications have been developed to help use, organize, and share some of these resources. E-Mail is one of the most popular applications used today. Email, however, is not capable of addressing all of the aforementioned concerns or issues that users encounter online.

SUMMARY OF THE INVENTION

The invention provides a system, method and apparatus for selecting, displaying, managing, tracking and transferring access to content accessible by computing devices, such as content in web pages, pop-up windows, players and plug-ins available on the World Wide Web, word processor documents, spreadsheets, and other like content. The selected content can be in the form of plain text, or can be in the form of static or dynamic graphic images, such as pictures, movies, animations, web casts, "3-D" images, or the like. Further, using the system, the User can select several different content items, of the same type or of different types, and place all of the items in an independent browser window.

Importantly, the content placed in the independent browser window only contains the content selected by the User, and does not contain other content which may be present in the original source of the content. For example, a User may wish to select a specific image or string of text from a web page containing several images or a lengthy text section. Thus, the system allows the User to create an independent window with only the desired content item, free from other content items on the source, which permits the User to focus on the desired content item. Thus, the system provides a heretofore unavailable ability for a User to create a grouping, or custom selection of content available from the World Wide Web or other sources.

The system also provides the ability to adjust both the size of the entire independent browser window, and, separately, the size of each content item within the window. Other important capabilities of the system include the ability to easily search for content similar to the selected content and the ability to transfer access to the custom selection to others via electronic mail, instant messenger applications, and other electronic communications methods.

The invention is effected, in part, by software added to the User's computing device, which is preferably in the form of a plug-in to an Internet browser, such as the Internet Explorer™ Internet browser of Microsoft Corporation or the Netscape Navigator™ Internet browser of Netscape Corporation, or similar content viewing applications. The software on the User's computing device modifies the User's browser to allow the User to select desired content from a web page or other document or spreadsheet, or the like, and to place the desired content in an independent browser window, free from other content on the source web page or document. To access functions provided by the software, the software creates a toolbar on the browser, the Main Toolbar, having menu items or icons which activate the functions.

In a preferred form, the software allows the User to select desired content from a web page by directing the mouse pointer over the content, depressing the right mouse button (i.e., "right click") and choosing a Select Content Function offered in an otherwise standard pop-up menu. (In the drawings included herewith, the Select Content Function on such pop-up menu is identified by the word "Amplify"™). In the case of a text selection, the User preferably first defines the desired text by using the standard "click and drag" method and then the "right click" method.

For some types of content, such as media content, the system may place a floating icon over the content when the mouse is directed over the content. The floating icon can be used (clicked on) to select the content item with one click. Preferably, the floating icon appears as an overlay on top of the content item and only appears when the User directs the mouse pointer over the content item. Thus, the floating icon does not ordinarily obscure the content item.

After the User selects the content, the software may present the User with a Properties Window that allows the User to enter a descriptive Description for the Custom selection being created by the User, and allows the User to enter Keywords for the custom selection. As described in detail below, the software uses the Keywords to perform searches for similar content on the World Wide Web.

Next, the software creates an independent browser window, the Custom Selection Window, containing only a relatively small toolbar, the Window Toolbar, and the custom selection of the content items selected by the User. This allows the User to select and focus on desired content free from additional, and possibly distracting, content on the source page.

Preferably, the Custom Selection Window is of a predetermined size and may be resized by the User in the known manner of resizing windows. Also, preferably, the content selected by the User is set to occupy specific percentages of the height and width of the window (other than the Window Toolbar), such as 100%. Thus, when the User adjusts the height or width (or both) of the Custom Selection Window, the browser adjusts the dimensions of the content within the window proportionately.

Certain content available on the World Wide Web, such as movies, animations and web casts, 3-D images and the like, may require that additional software be present on the User's computer. Such additional software includes media players such as Microsoft's Windows Medial Player, Real Media's Real Player, Apple's Quicktime, and other similar media players, and includes other "applets", plug-ins, applications and programs. The User would need to install this software prior to using the system of the invention for these types of content.

The system allows the User to have several instances of the Custom Selection Window open simultaneously, each window containing a different custom selection. If additional software is required to view a content item in a Custom Selection Window, such as a media player or applet, or the like, the additional software is preferably defined within the Custom Selection Window as an "embedded object", which allows multiple instances of the additional software to operate on the computing device at the same time. In this manner, the User can select and view several content items requiring the same additional software simultaneously.

This system also allows the User to add additional content items to an existing Custom Selection Window. The User can preferably define whether the additional content item is to appear above, below, to the right, or to the left of an existing content item. The process can be repeated to populate a Custom Selection Window with yet more content items.

The several content items contained within one Custom Selection Window are each placed within an individual frame created within the window, which frames are preferably set to collectively occupy specific percentages (e.g., 100%) of the height and width of the Custom Selection Window (not including the Window Toolbar, as discussed above). Further, as with a single content item, each of the several content items is preferably set to occupy specific percentages (e.g., 100%) of the height and width of its respective frame. The User may also preferably resize the frames. Thus, when a frame for a content item is resized, the browser resizes the content within that frame, and, importantly, resizes the other frames (and the content therein), proportionately. It can be appreciated that the ability to arrange, size and resize multiple content items within one independent browser page gives the User great flexibility when creating custom selections.

Preferably, each frame of a Custom Selection Window includes a toolbar, the Frame Toolbar, having predefined functions that are applied with respect to the specific content item located in the frame, as opposed to Window Toolbar which has functions that are applied with respect to the Custom Selection Window as a whole. For example, the Frame Toolbar preferably contains icons that allow the User to divide (and sub-divide) each frame to allow the User to populate the Custom Selection Window with multiple content items, as described above. Preferably, the Frame Toolbar appears as an overlay to the content item within the frame and only appears when the User directs the mouse pointer over the content item (i.e., on a so-called "mouseover" event). Thus, the Frame Toolbar does not ordinarily cover or otherwise obscure the content item located within the frame.

The Frame Toolbar preferably provides a menu item or icon to select the content item located within the respective frame and place the content item in a new Custom Selection Window in a manner similar to selecting content from an original source page. Thus, using this function, the User can pick desired content items out of an existing Custom Selection Window. In addition, the Frame Toolbar preferably includes a menu item or icon to Refresh the content item in the respective frame. The Window Toolbar also preferably provides a similar function to refresh all of the content items within a Custom Selection Window simultaneously.

Once a Custom Selection Window is created, the system provides the ability to search the World Wide Web for content similar to the selected content. To perform such a search, the User can select a Search function provided by the software, which is preferably accessible via an icon on the Window Toolbar of the Custom Selection Window or on the Frame Toolbar. Upon receiving such a search command, the software opens a new browser page and queries a predetermined World Wide Web search engine, such as google.com, or the like, with certain Search Parameters. The Search Parameters are created from a group including the domain name of the source of a content item in the Custom Selection Window, the title of the original web page of the content item, and the Keywords. Preferably, the search can be performed on the basis of the Search Parameters of the entire Custom Selection Window (via the Window Toolbar), or on the basis of an individual content item within a frame of the Custom Selection Window (via the Frame Toolbar).

The result of the search is an independent browser window containing "hits" returned by the search engine, which should be relevant to the selected content or source of the content. As is common, the hits are typically in the form of short descriptions of the search results accompanied by hypertext links, or universal resource locators (i.e., url's), which lead to web pages.

The system also provides the ability for the User to open a new browser window containing either the entire web page of a selected content item, or containing the main or "home" web page of the domain for the selected content. These functions, the GoTo This Page and GoTo This Site functions are preferably made available via menu items or icons on the Window Toolbar or via menu items or icons on each Frame Toolbar. Thus, the system provides a quick and convenient means to find and view the source of selected content items.

Further, the system provides the ability to maintain the Custom Selection Window as the "top" window on the computing device. This function, the Always On Top function, is preferably made available via a menu item or icon on the Window Toolbar. When the Always On Top function is selected (i.e., "on"), the Custom Selection Window will remain visible as the top window on the computing device irrespective of whether the User selects another window, such as another program, as the active window. With this function, the User can quickly and conveniently select and focus on a desired content item, such as a streaming video, and ensure that the content item is always visible even if the User is working with another program. As mentioned above, the User can resize and relocate the Custom Selection Window to view other programs, as desired.

The system also provides the ability for the User to save a Custom Selection Window for later viewing. One mode of this feature creates a Most Recently Used (MRU) list, or History, which saves a predetermined number (e.g., 20) of the last saved custom selections, in chronological order of use. Another mode of this feature, the Send to Favorites function, creates a semi-permanent list of Favorites. A Favorites List is preferably made available via a menu item or icon on the Window Toolbar. Preferably, the Main Toolbar, accessible on the main browser, includes a retrieval function, the GoTo Favorites function, accessible via a menu item or icon. When selected, the GoTo Favorites function displays a list of saved Custom Selection Windows, which are identified by the Description entered by the User when creating the Custom Selection Window. Thus, once a Custom Selection Window is sent to Favorites, the User can quickly and conveniently recreate the window at a later time by choosing the selection from the list of Favorites. The system also provides a convenient means for the User to print the Custom Selection Window. The Send To Printer function is preferably made available via a menu item or icon on the Window Toolbar.

Importantly, the system also provides the ability for the User to transfer a Custom Selection Window to another computing device (a Recipient) via electronic mail, instant messenger programs, or other similar electronic communication means. This function, the Send To Friends function, is preferably made available via a menu item or icon on the Window Toolbar. Upon selecting the Send To Friends function, the software presents the User with a dialog window to enter the Electronic Address of the Recipient (e.g., the email address, or instant messenger name). The software also preferably provides the ability to save the Electronic Addresses of Recipients, identified by a descriptive Recipient Name entered by the User, in a Friends List for future use.

When a Recipient is entered (or chosen), the software sends a Definition of the Custom Selection Window to a Server. The Definition includes a predefined, unique identifier for the sender (the User Identifier), the Description, the arrangement and sizes of the frames in the window and the Keywords. For image content, the Definition also includes the universal resource locator (url) for the image content. For text content, the Definition also includes either the entirety of the selected text or the url for the source of the text and parameters that define the location of the beginning and end of the selected text within the source of the text.

Upon receipt of the Definition, the Server assigns a unique Window Identifier to the Custom Selection Window. At this point, an electronic message is sent to the Recipient at the Electronic Address of the Recipient via electronic mail, instant messaging program, or other electronic means, as appropriate. The electronic message sent to the Recipient contains a hypertext link, or universal resource locator (url) which leads back to the Server. As described below, the link contains the Window Identifier of the Custom Selection Window. The electronic message can be sent by the Server or can be sent by the computing device of the User. In the case where the electronic message is sent by the User, the Server transmits the Window Identifier of the Custom Selection Window to the User and the Window Identifier is incorporated into the electronic message as described above.

The presence of the Keywords in the Definition provide an important function by allowing the creator of the custom selection to provide targeted words to search for related content on the web. As a part of the Definition, the Keywords are attached to the Custom Selection Window and remain with the Custom Selection Window when it is saved by the User (or sent to the Favorites List), and travel with the Custom Selection Window when the Custom Selection Window is accessed by a Recipient.

It should be noted that the electronic message sent to the Recipient does not contain the content items themselves, but only a link to the Server. As opposed to prior methods of sending entire content items to a recipient, the present invention greatly reduces the time and bandwidth required to send an electronic message to another to share content over a network such as the World Wide Web. Moreover, electronic messaging systems often have limitations in the type and amount of content that each can transmit in a single message. For example, electronic mail systems typically limit messages to a certain size and instant messaging systems typically do not allow the transfer of images and typically limit the amount of text in a message to a certain number of characters. The present invention overcomes these limitations by sending an electronic message containing a link used to re-create the custom selection.

Upon receiving the electronic message, the User can recreate the Custom Selection Window by selecting, or clicking on, the hypertext link in the message. When the Recipient selects the link within the electronic message, the computing device of the Recipient activates a browser application that sends a request to the Server, which request contains the unique Identifier of the Custom Selection Window. The Server responds with a web page that recreates, on the computing device of the Recipient, the custom selection as defined by the sender.

Importantly, preferably a standard browser application can create a Recipient Window containing the custom selection without the additional software required to initially create and send the custom selection. Therefore the User is able to transmit access to the custom selection to another computing device on the network, even if the other computing device does not have the additional software required to initially create the custom selection.

Preferably the Recipient Window is configured to load the content items of the custom selection via the browser application on the computing device of the Recipient directly from the respective sources of the content. Thus, by employing the browser application on the computing device of the Recipient to retrieve and load the content items, the system of the present invention avoids the content type and size limitations of electronic messaging systems, as discussed above.

The Recipient Window also preferably includes a tool bar, the Recipient Toolbar, that provides certain functions to the Recipient related to the custom selection in the Recipient Window. The Recipient Toolbar preferably includes Search, Goto This Page, GoTo This Site, and Print functions, similar to those functions provided by the Window Toolbar, to allow the User to search the World Wide Web for content related to the content in the Recipient Window, to open another browser window with either the source web page containing the content item or the web site of the domain of the source web page, or to print the Recipient Window.

As mentioned above, the custom selection received by the Recipient includes the Keywords in the Definition, which allows the Recipient to perform targeted searches of the web for related content.

The initial web page sent to the Recipient preferably senses whether the Recipient has installed the software on their computing device. If so, the Recipient has the full functionality of the Custom Selection Window, including the functionality of the Window Toolbar, as described above. In particular, the Recipient has the ability to save the Custom Selection Window to the History List, the Favorites List and has the ability to transfer access to the Custom Selection Window to other computing devices, among the other functionality described above.

The software is preferably compatible with several different computing platforms, such as Microsoft Windows-based and Apple computers, internet appliances, personal digital assistants (PDAs, such as the Palm Pilot, and the like), and other computing platforms, such that custom selections can be shared among Users of various computing devices. Further, certain items of User-defined attribute information, such as the User's Favorites and the Friends List, are preferably portable amongst various computing devices of the User. The software accomplishes this function by transmitting the attribute information to the Server and storing the information along with the unique User Identifier. The User's attribute information is retrieved using the User Identifier when the User first launches the browser. Thus, the system provides a consistent and familiar experience regardless of which computing device the User chooses.

The system also provides a highly accurate and flexible means to track content viewed and shared by Users and Recipients. The Server is contacted whenever a custom selection is saved to or chosen from the Favorites list, when a custom selection is sent to another device using an electronic message, and when a Recipient views a received custom selection. During each of these actions, the unique Identifier of the custom selection is sent to the Server, which Server contains the Definition of the custom selection. Therefore, in the case of custom selections of a User's Favorites List, the system can track and compile statistics including regarding what content items have been selected, what content items are selected in the same window, the number of times a selected item (or group of items) is viewed, and the frequency of viewing. Such statistics can be compiled along with the unique User Identifier to track such information with respect to a particular User, or can be compiled "blind" without regard to a particular User.

For custom selections shared with others, the system can also track and compile statistics on what content items (or groups) are shared with others (and by whom), the number of times a Recipient views a selection, the frequency of viewing, and the chosen method of messaging. As an example, the system can track statistics regarding a User viewing (and likely comparing) images of two products side-by-side in a custom selection, and can track statistics about any sharing of that custom selection. This tracking can be accomplished whether the two images are on the same site or different sites.

The system also provides means for users to compose a message and insert the message within the custom selection.

Further, the system does not rely on pre-placed tracking devices, such as "cookies" or "web bugs." The tracking capability of the present invention is based on the content items themselves, in their unaltered format. Moreover, the tracking capability of the system is highly targeted in that it is able to track viewing and transferring of specific content items, whereas traditional tracking methods such as cookies and web bugs typically only track views of entire web pages. Further, since communication with the Server is required for certain actions, such as saving and retrieving, the tracking capabilities of the system cannot be circumvented. Therefore, the system provides a very non-invasive reliable, highly targeted and flexible tracking system.

The system can display advertisements with the custom selections, where the advertisements are chosen based on the content items displayed, a message composed by the user, or other parameters.

It can be appreciated that the present invention provides a convenient method for a User to create, view, modify, print and save custom groupings of image and text content items available on web pages and other sources, to search for other related content, and to transfer access to such selections with others, which method is effected in a manner which avoids the limitations of electronic communications methods, which reduces the time and bandwidth required to share the custom groupings via electronic messages, and which provides for highly accurate and flexible tracking of such content viewing and sharing.

BRIEF DESCRIPTION OF THE DRAWINGS

For a complete understanding of the above and other features of the invention, reference shall be made to the following detailed description of the preferred embodiments of the invention and to the accompanying drawings, wherein:

FIG. 30 is an image of an Internet browser application showing a temporary border around a cell of an HTML table;

FIG. 31 is an image of a Custom Selection Window showing an HTML table selected via the Assisted Content Selection feature;

FIG. 37 is an image of a sample web page defined by the source code in Table AE.

FIG. 40 is an image of a Content Mark Save interface; and

DETAILED DESCRIPTION OF THE INVENTION

Figure 1:
FIG. 1 is an image of an Internet browser application showing the Main Toolbar of the present invention.

Referring to FIG. 1, to employ the present invention, the User installs software on the User's computing device that adds functionality to the Internet browser application and operating system of the User's computing device. Upon installation of the software, the software communicates with a remote Server that assigns a unique User Identifier for the User and transmits the User Identifier to the User's computing device, which stores the User Identifier on a memory device for later use.

Selecting Content Items

The software adds a Main Toolbar 10 to the browser application 12 on the User's computing device to allow the User to create a custom selection by selecting desired content items from a web page or other document or spreadsheet, or the like, and to place the desired content items in an independent browser window, free from other content on the source web page or document. As discussed in detail below, the Main Toolbar 10 has menu items or icons that activate some of the functions.

By default, the software may analyze web pages and other types of sources upon loading into the browser application to identify content items supported by the software and to determine the network locations of the content items. A list of supported content is preferably contained in a file stored on the User's computing device, such as in a Dynamic Link Library (DLL), that can be updated automatically as new types of content become supported by the software. The Main Toolbar 10 preferably provides a menu item that allows the User to disable the automatic page scanning if desired.

Figure 2:
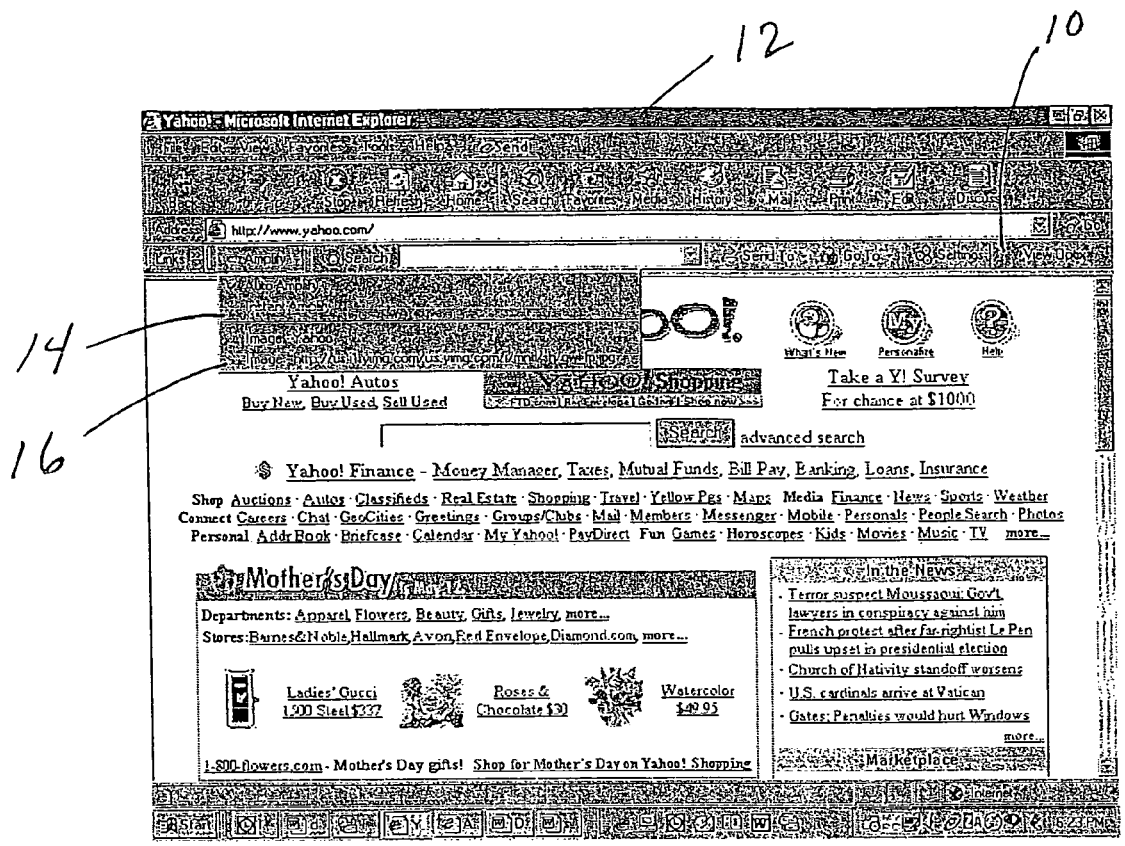
FIG. 2 is an image of the Main Toolbar showing the Identified Content Item List.

Referring to FIG. 2, the Main Toolbar 10 includes an Identified Content 14 menu item that displays an Identified Content Items List 16 of supported and identified content items in the web page or source currently loaded into the browser application. The User can select a desired content item by clicking on the item in the Identified Content Items List 16.

Figure 3:
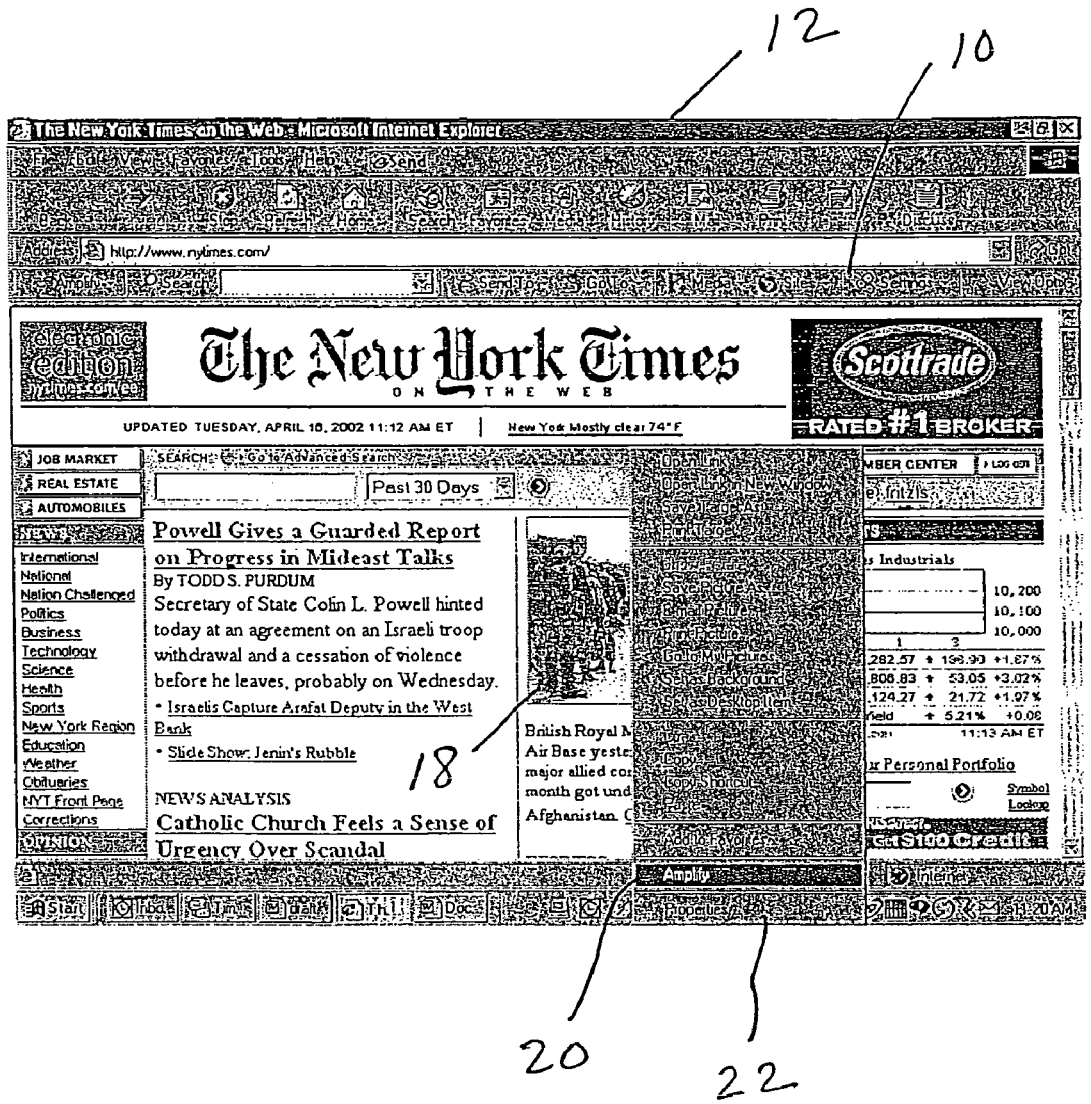
FIG. 3 is an image of the Select Content Item Function invoked by the "right-click" method of selecting a content item.

Referring to FIG. 3, the User can also select a desired content item from a web page by directing a pointing device of the computing device (e.g., a mouse pointer) over the content item 18 in the page, depressing the right mouse button (i.e., "right click") and choosing a Select Content Item Function 20 offered in an otherwise standard pop-up menu 22. (In the drawings included herewith, the Select Content Item Function 20 on such pop-up menu 22 is identified by the word "Amplify"™).

It should be noted that, when selecting content items, the software obtains the network location and name of the content item from the web page or other source of the content item and retains the network location in memory, which is preferably temporary memory. Specifically, the system obtains and retains the complete network location of the content item whether the content item is defined in the source code of the document (e.g., web page) by an absolute uniform resource locator (url) or by a relative url. Further, it should be noted that content items (and groups of content items) can be selected using the standard "click and drag" method and then the "right click" method.

In the case of a content item that is text, the User preferably first defines the desired text by using the standard "click and drag" method and then the "right click" method. This function is also operable to select non-text content items. A group of non-text content items or a group of text and non-text content items may be selected in a similar manner by selecting the entire group, for example using the "click and drag" method. Preferably, a select function inherent in the operating system (e.g., Windows™) is employed to obtain HTML coding or other formatting instructions for the text and/or non-text content items. It should be noted that, as used herein, the term "click" is meant to encompass any means or method by which the pointing device receives a selection command from the User.

Figure 4:
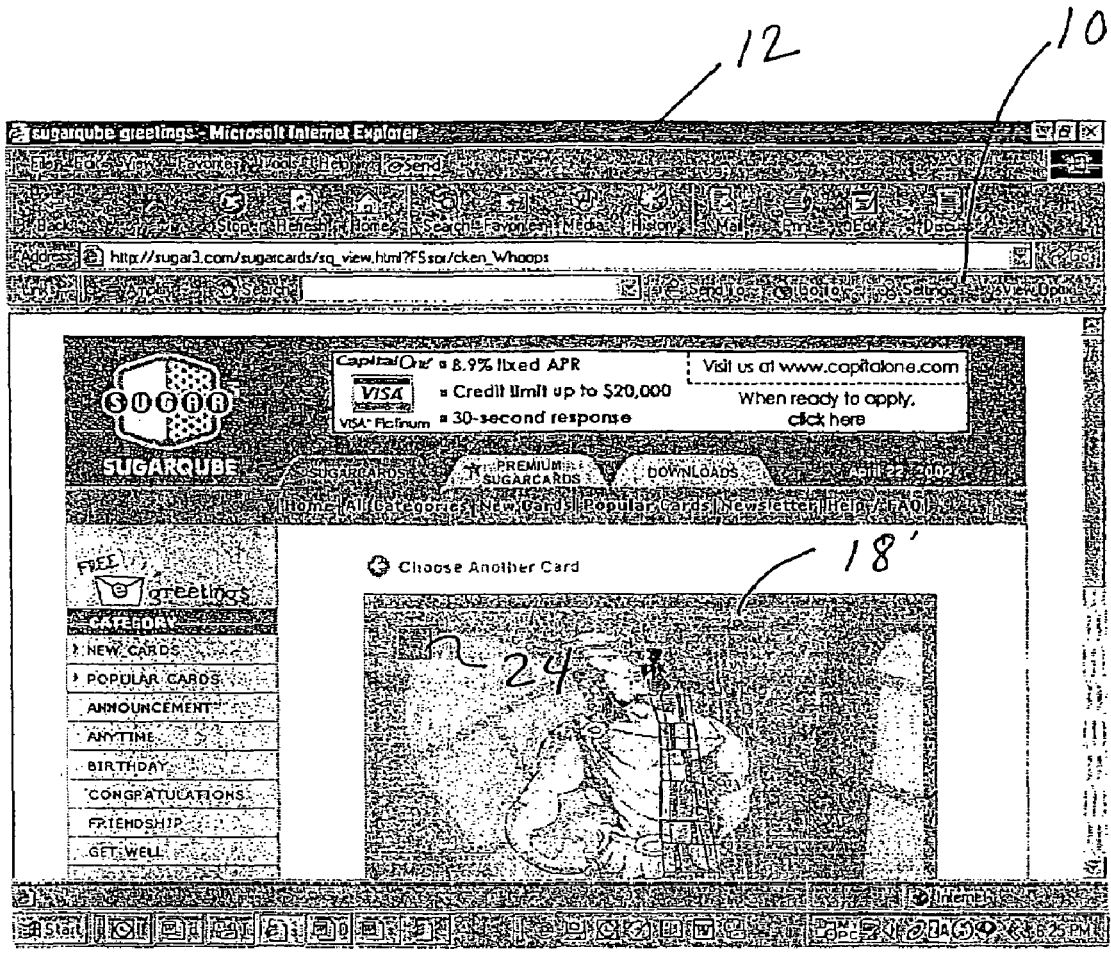
FIG. 4 is an image illustrating the floating Instant Selection Icon.

Referring to FIG. 4, for some types of content, such as media content, the system preferably places a floating, Instant Selection Icon 24 over the content item 18' when the User directs the mouse pointer over the display area or frame of the content item. The Instant Selection Icon 24 can be used (clicked on) to select the content item 18' with one click. Preferably, the Instant Selection Icon 24 appears as an overlay on top of the content item 18' and only appears when the User directs the mouse pointer over the display area or frame of the content item. Thus, the Instant Selection Icon 24 does not ordinarily obscure the content item.

Window Description and Keywords

Figure 5:
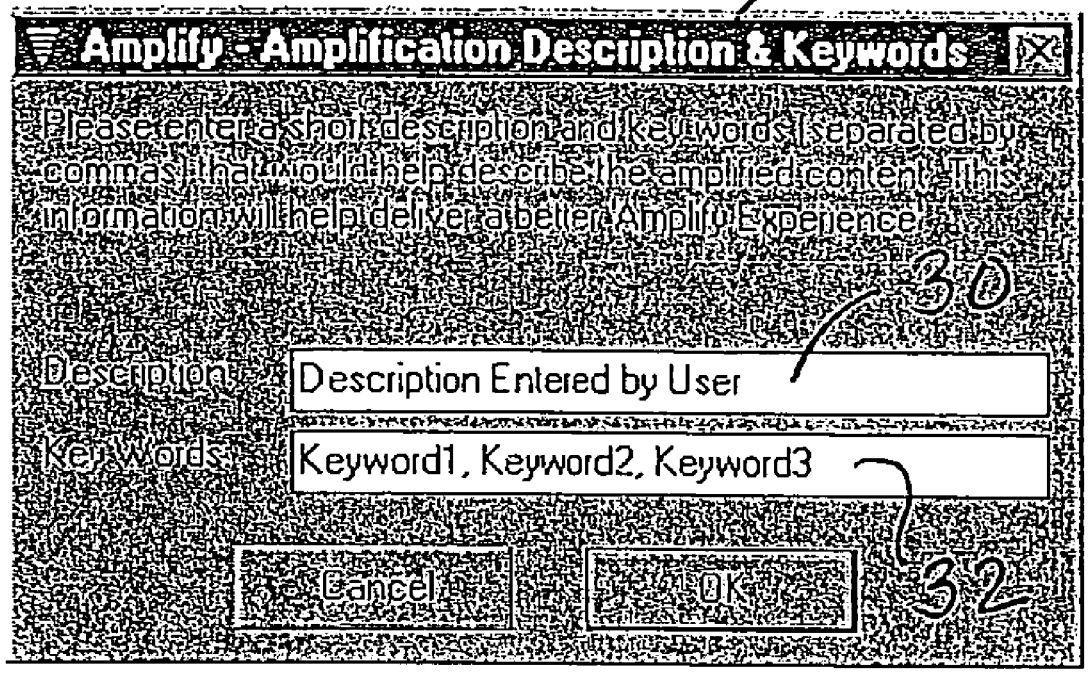
FIG. 5 is an image of the Properties Window.

Referring to FIG. 5, after the User selects the content item, the software may present a Properties Window 28 that allows the User to enter a Description 30 for the custom selection being created by the User, and allows the User to enter Keywords 32 for the custom selection. As described in detail below, the software uses the Keywords 32 to perform searches for similar content on the World Wide Web.

The Custom Selection Window

Figure 6:
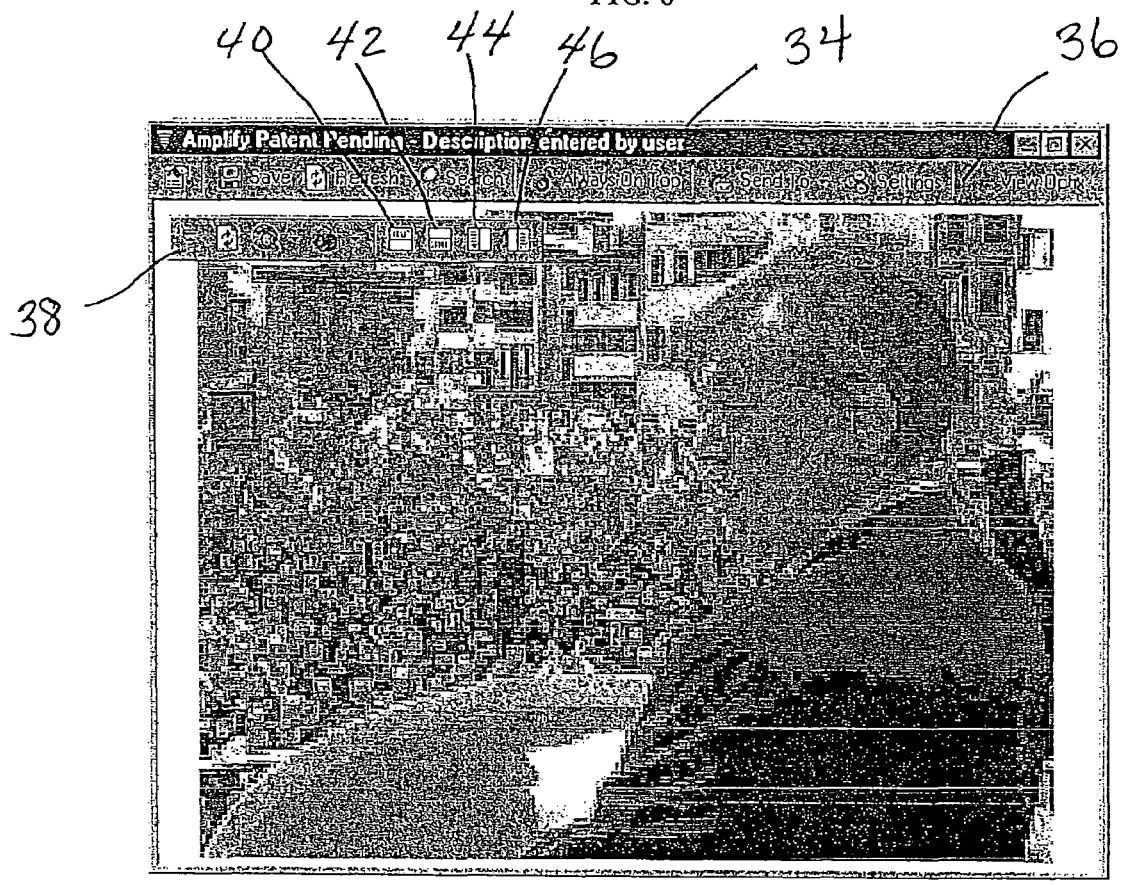
FIG. 6 is an image of a Custom Selection Window having a single image content item.

Referring to FIG. 6, the software then creates an independent browser window, the Custom Selection Window 34, containing only a relatively small toolbar, the Window Toolbar 36, and the custom selection of the content item 18 selected by the User. This allows the User to select and focus on desired content free from additional, and possibly distracting, content on the source page. The network location of the content item is retrieved from the (temporary) memory to which it was stored during the selection process.

The software preferably loads the content item into the Custom Selection Window 34 directly from the original (network) source of the content item identified during the selection process. It is intended that the term network source as used herein include any cached source that may be present on the network.

Preferably, the Custom Selection Window 34 is of a predetermined size and may be resized by the User in the known manner of resizing windows. Also, preferably, the content item 18 selected by the User is set to occupy specific percentages of the height and width of the window (other than the Window Toolbar 36), such as 100%. Thus, when the User adjusts the height or width (or both) of the Custom Selection Window 34, the browser application adjusts the dimensions of the content item 18 within the window proportionately. However, the system preferably maintains any original aspect ratio settings of the content item.

Certain content available on the World Wide Web, such as movies, animations and web casts, 3-D images and the like, may require that additional software be present on the User's computer. Such additional software includes external player programs (such as Microsoft's Windows Medial Player, Real Media's Real Player, Apple's Quicktime, and other similar media players), helper application, "applets", plug-ins, and other programs. The User would need to install this software prior to using the system of the invention for these types of content.

The software allows the User to have several instances of the Custom Selection Window 34 open at any given time, each window containing a different custom selection. If additional software is required to view a content item in a Custom Selection Window 34, such as a media player or applet, or the like, the additional software is preferably defined within the Custom Selection Window as an "embedded object", which allows multiple instances of the additional software to operate on the computing device at the same time. In this manner, the User can select and view several content items requiring the same additional software at the same time.

Inserting Additional Content Items into a Custom Selection Window

Figure 7:
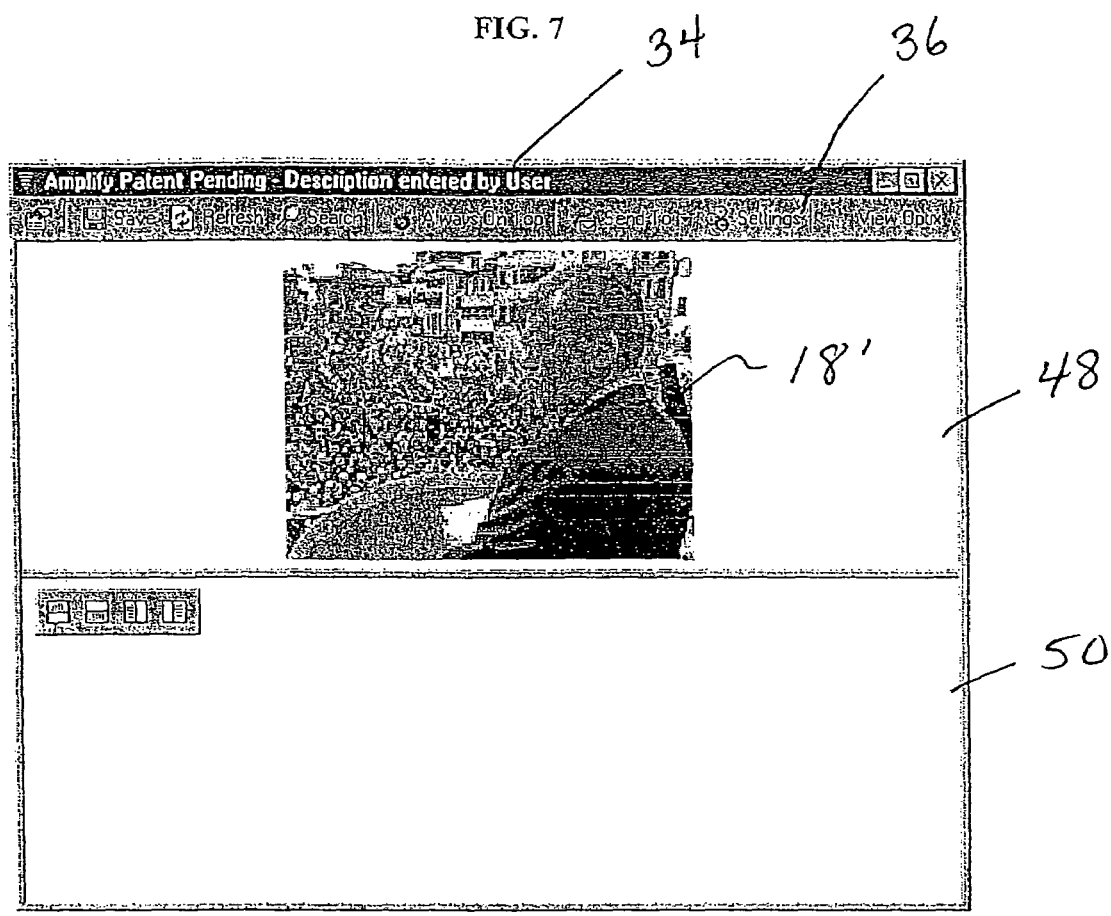
FIG. 7 is an image of a Custom Selection Window having a content item in a top frame and a blank bottom frame.

Referring to FIGS. 6 & 7, the software also allows the User to add additional content items to an existing Custom Selection Window 34. To do this, the User preferably first divides a Frame 37 of an existing content item 18 in the Custom Selection Window 34 to add a new frame to the window. The Frame Toolbar 38, which appears over the content item 18 in the Custom Selection Window 34, includes New Frame Bottom, New Frame Top, New Frame Right, and New Frame Left icons 40, 42, 44, 46 (or menu items) that add a new frame below, above, to the left or to the right, respectively, of the existing content item 18. The software preferably divides the frame 36 of the selected content item 18 into two, equal, sub-frames 48, 50, with one of the frames 48 occupied by the existing content item 18 and the other frame 50 blank. Then, the User selects an additional content item in the manner described above.

Figure 8:
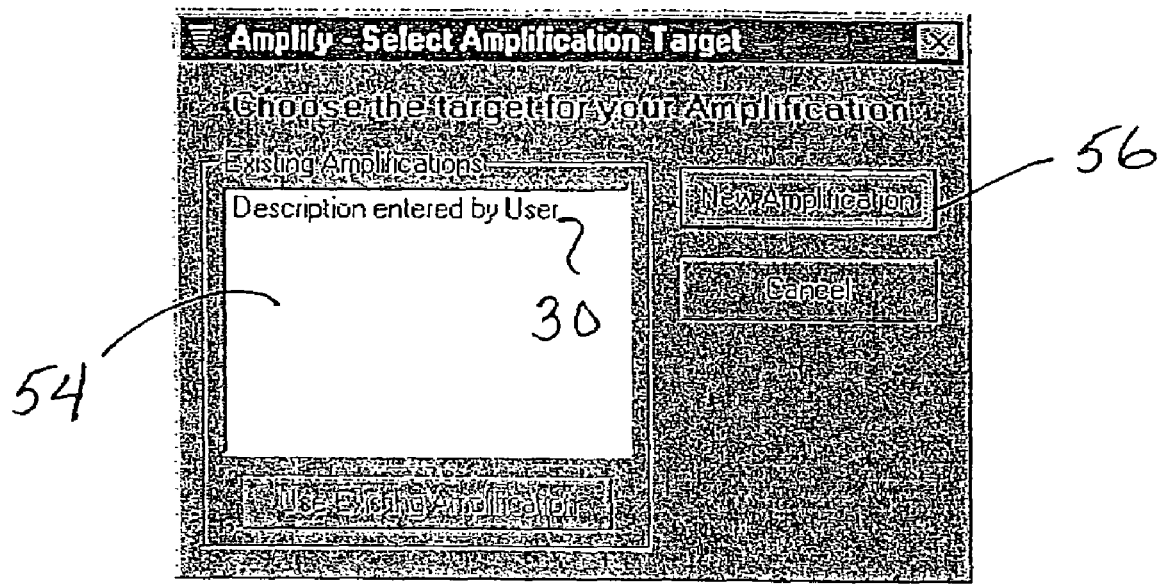
FIG. 8 is an image of the Select Target Window.

Referring to FIG. 8, upon the selection of an additional content item, the software determines whether there exist other, open Custom Selection Windows. If so, the software presents a Select Target Window 52, that displays an Open Window List 54 of all open Custom Selection Windows, which are preferably identified by the Description 30 entered by the User when creating the windows. Preferably, the User can select an open window from the Open Window List 54. The Select Target Window 52 also preferably provides a New Window 56 button, icon or menu item to allow the User to place the content item in its own Custom Selection Window, if desired.

Upon the selection of an open Custom Selection Window as the target, the software displays the selected Custom Selection Window 34, which includes the frame 48 occupied by the existing content item 18 and a blank frame 50 (as shown in FIG. 6). If the Custom Selection Window 34 contains more than one blank frame, the software then preferably pauses and prompts the User to select the blank frame in which to place the additional content item. The User can select the desired blank frame by clicking within the border of the frame. If the Custom Selection Window 34 contains only one blank frame then the software may automatically place the additional content item within that frame.

Figure 9:
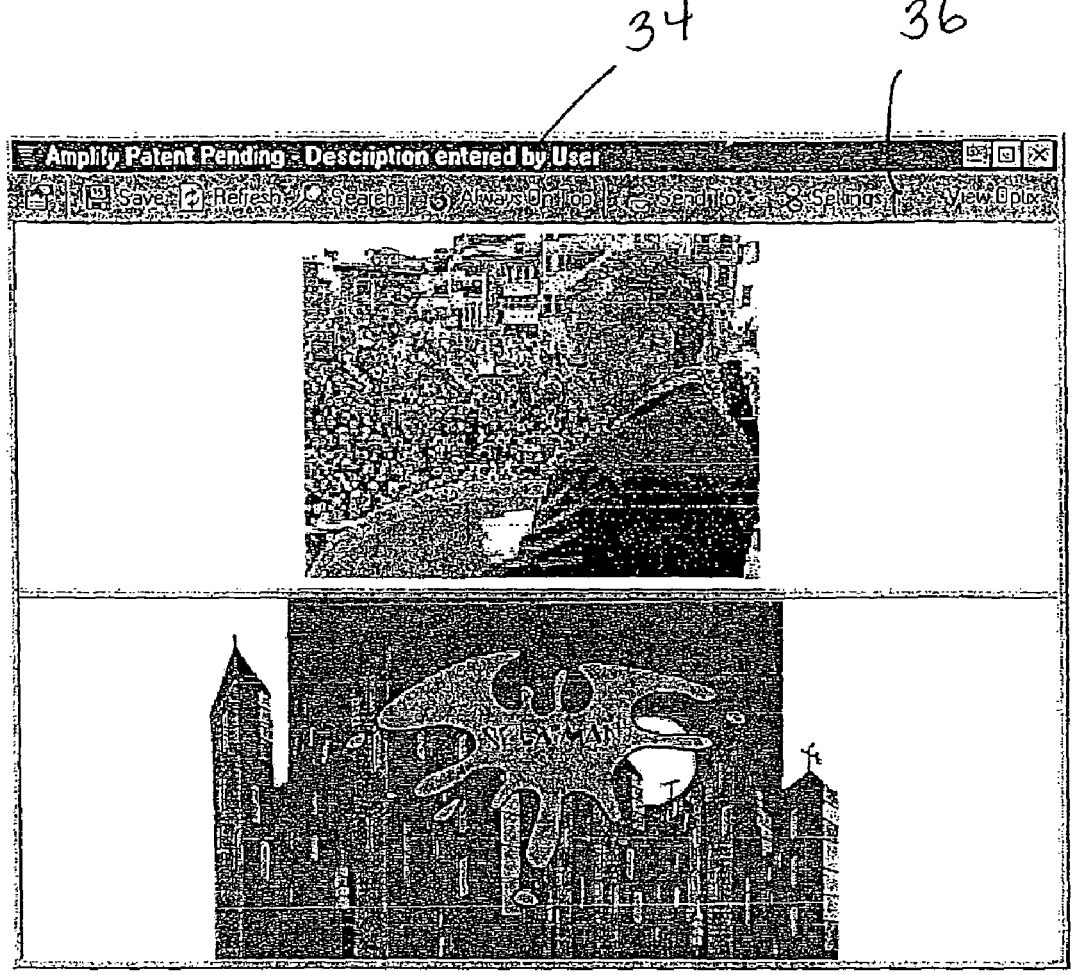
FIG. 9 is an image of a Custom Selection Window having an image content item in a top frame and an animation content item in a bottom frame.

Referring to FIG. 9, the software then displays the modified Custom Selection Window 34, which now contains both the first content item 18 (e.g., in the top frame 48) and the additional content item 58 (in the bottom frame 50).

Figure 10:
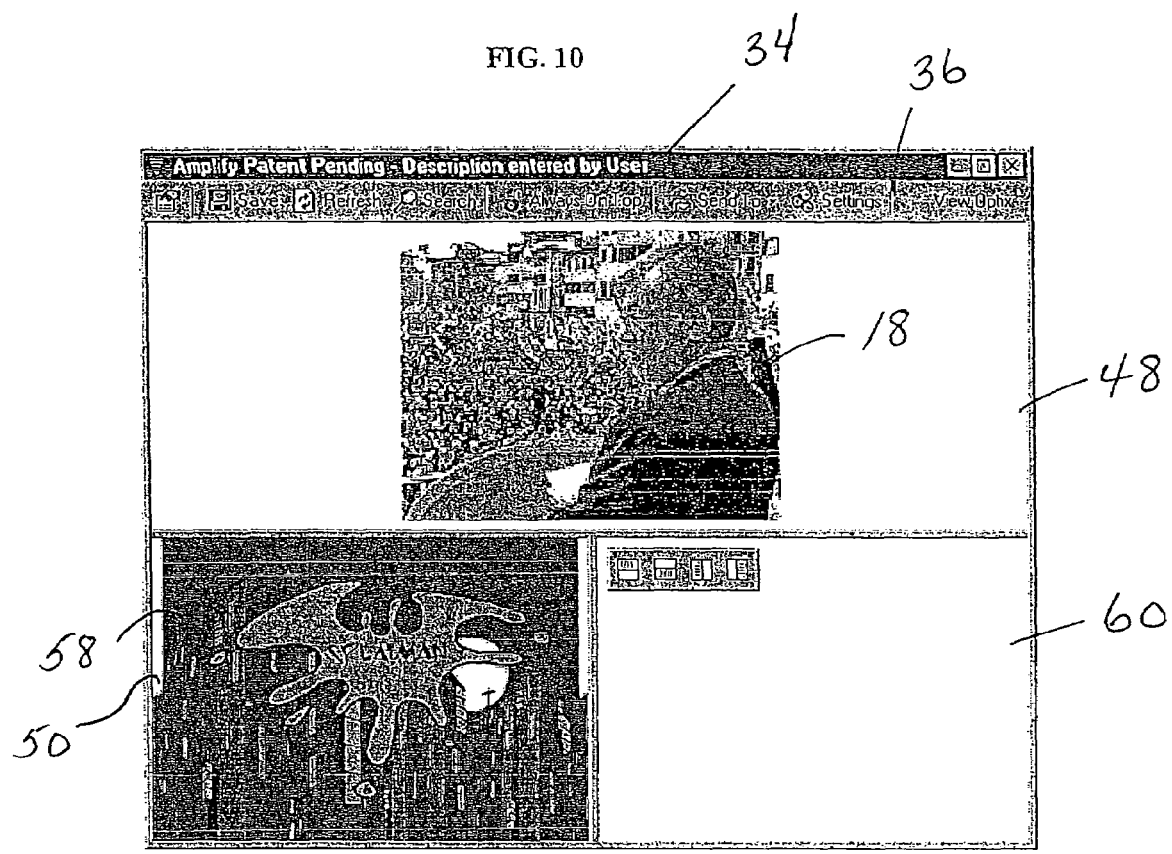
FIG. 10 is an image of a Custom Selection Window having a bottom frame divided into right and left frames.
Figure 11:
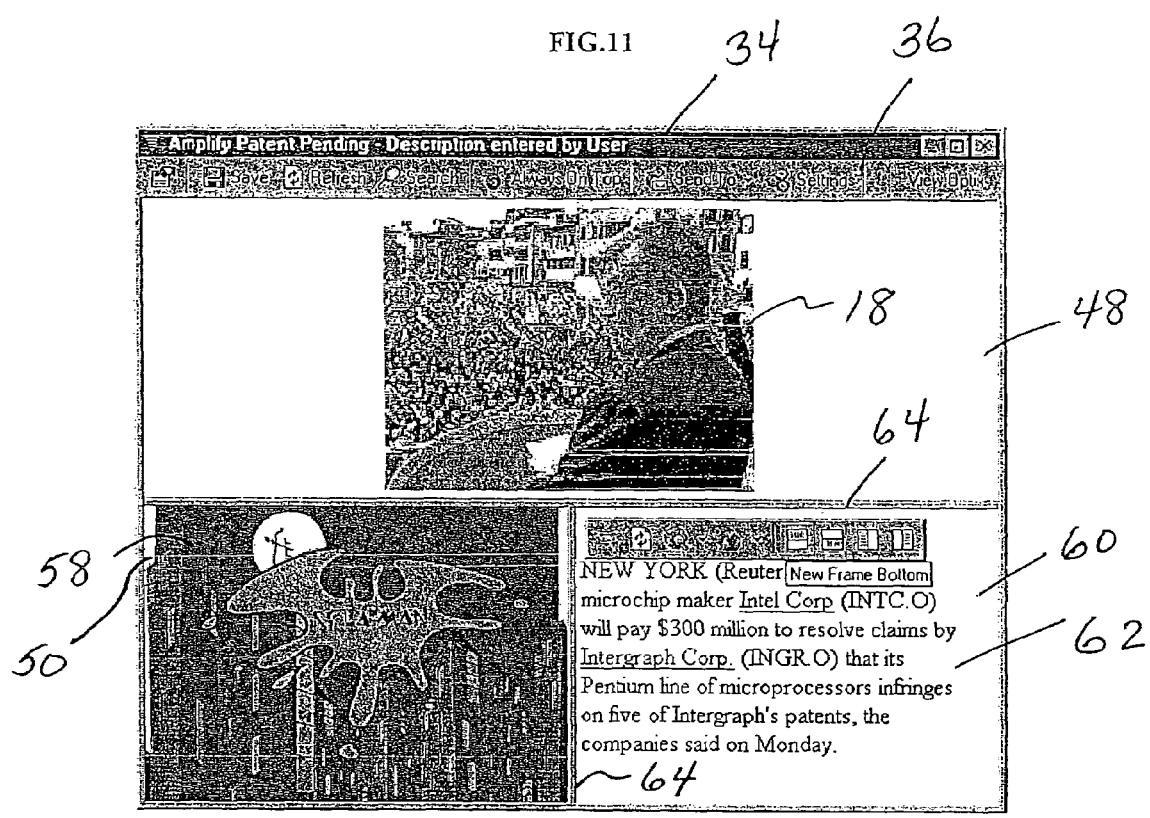
FIG. 11 is an image of a Custom Selection Window having an image content item in a top frame, having an animation content item in a left bottom frame and having a text content item in a right bottom frame.

Referring to FIGS. 10 & 11, the process can be repeated to populate the Custom Selection Window 34 with more content items. In this case, a new frame 60 is added to the right of the bottom frame 50. As above, the new frame 60 is added by selecting the New Frame Right icon 44 in the Frame Toolbar 38 (not shown) of the bottom frame 50 to add a frame to the right of the bottom frame 50. As shown, a text selection content item 62 can then be placed in the new frame 60 in the manner described above.

The software preferably defines the frames of the Custom Selection Window (in HTML) to collectively occupy specific percentages (e.g., 100%) of the height and width of the Custom Selection Window (not including the Window Toolbar 36). Further, as with a single content item, each of the several content items is preferably set to occupy specific percentages (e.g., 100%) of the height and width of its respective frame. The User may also preferably resize and rescale the frames in a Custom Selection Window by relocating a border between frames by clicking on and dragging a border 64 to a new location. When the frame border is relocated, the browser application resizes both of the content items within the frames that share that border 64, proportionately. However, the system preferably maintains any original aspect ratio settings of the content item. It can be appreciated that the ability to arrange, size and resize multiple content items within one independent browser page gives the User great flexibility when creating custom selections.

As a first step in creating the Custom Selection Window 34, the software first determines what type of content has been selected and determines whether there exists other open Custom Selection Windows. An example of the code for these steps is set for the in Table A.

TABLE A

```
' Public Sub Amplify(ByRef oSourceDocument As MSHTML.HTMLDocument, ByRef oAmplifyObject As Object)
    ' Parameters:
    '   oSourceDocument - An object reference to the document that the item being amplified originated from
    '   oAmplifyObject - An object reference to the item being amplified
    Public Sub Amplify(ByRef oSourceDocument As MSHTML.HTMLDocument, ByRef oAmplifyObject As Object)
        Dim xmlAmplifyItem As MSXML.DOMDocument
        ' Determine what type of content is being amplified
        Select Case TypeName(oAmplifyObject)
            Case "HTMLImg"
                Set xmlAmplifyItem = AmplifyHTMLImg(oSourceDocument, oAmplifyObject)
            Case "IHTMLTxtRange"
                Set xmlAmplifyItem = AmplifyIHTMLTxtRange(oSourceDocument, oAmplifyObject)
            Case "HTMLObjectElement"
                Set xmlAmplifyItem = AmplifyHTMLObjectElement(oSourceDocument, oAmplifyObject)
        End Select
        If Not xmlAmplifyItem Is Nothing Then
            ' If there is already an amplification window showing, then give
            ' the user the choice of using a new or existing window.
            If lAmplifyCount > 0 Then
                ' Show window choice form
                Dim oAmplifyForm As New Amplify.frmAmplify
                Load oAmplifyForm
                Set oAmplifyForm.AmplifyItem = xmlAmplifyItem
                Show WindowEx oAmplifyForm.hWnd
                Set oAmplifyForm = Nothing
            Else
                ' No windows existed, create a new one
                Dim oAmplification As New Amplify.Amplification
                oAmplification.Load
                oAmplification.AddItem xmlAmplifyItem
                Set oAmpliftcation = Nothing
            End If
        End If
        Set xmlAmplifyItem = Nothing
    End Sub
```

The software then defines certain parameters of the content item, such as the source page or document of the content item and the file name of the content item. An example of this step, for an image content item, is set forth in Table B.

TABLE B

```
' Private Function AmplifyHTMLImg(ByRef oSourceDocument As MSHTML.HTMLDocument, ByRef oImage As MSHTML.HTMLImg) As MSXML.DOMDocument
    ' Parameters:
    '   oSourceDocument - An object reference to the document that the item being amplified originated from
    '   oImage - An object reference to the image being amplified
    ' Return Value:
    '   MSXML.DOMDocument object containing the xml structure of the image
    ' Private Function AmplifyHTMLImg(ByRef oSourceDocument As MSHTML.HTMLDocument, ByRef oImage As MSHTML.HTMLImg) As MSXML.DOMDocument
        Dim xmlImage As New MSXML.DOMDocument
        xmlImage.async = False
        LoadResXML xmlImage, "amplifyimage.xml"
        BuildSourceNode xmlImage.selectSingleNode("frame/source"), oSourceDocument
        With xmlImage.selectSingleNode("frame/image")
            .selectSingleNode("src").Text = oImage.src
            .selectSingleNode("alt").Text = oImage.alt
            .selectSingleNode("height").Text = oImage.Height
            .selectSingleNode("width").Text = oImage.Width
            '.selectSingleNode("mime-type").Text = oImage.mimeType
        End With
        Set AmplifyHTMLImg = xmlImage
        Set xmlImage = Nothing
    End Function
```

Then, the software launches a new browser application window and passes the XML structure of the image to the new window. An example of the code for this step, for an image content item, is set forth in Table C.

TABLE C

```
' Public Sub AddItem(ByRef oAmplifyItem As MSXML.DOMDocument)
    ' Parameters:
    '    oAmplifyItem - An object reference to the xml containing the structure of the item being amplified
    Public Sub AddItem(ByRef oAmplifyItem As MSXML.DOMDocument)
        ' Copy the xml to a local object for later use
        Set xmlItemWaiting = oAmplifyItem.documentElement.cloneNode(True)
        ' Set the item waiting flag
        bItem Waiting = True
        ' Check to see if the choose your target splash screen should be displayed
        IfCLng(GetSetting(REG_APP_NAME, REG_SECT_PREFERENCES, REG_KEY_TARGET_WINDOW_HINT 0)) = 0 Then
            frmChooseTarget.Show vbModeless, Me
        End If
    End Sub
```

Upon the creation of the new window, the software pauses to receive an indication from the User as to the desired location of the content item within the new window. As stated above, if there is only one possible (i.e., blank) frame for the content item, then the software may automatically insert the content item in that frame. An example of the code for this step is set forth in Table D.

TABLE D

```
' Private Sub Additem_Callback(ByRef oTargetWindow As MSHTML.HTMLWindow2, ByRef xmlItem As MSXML.IXMLDOMNode, Optional ByRef bSetDirty As Boolean = True)
    ' Parameters:
    '    oTargetWindow - An object reference to the target window for the item being amplified
    '    xmlItem - An object reference to the xml of the item being amplified
    '    bSetDirty (Optional, Default = True) - Boolean value indicating weather or not to set the dirty flag for the amplification
    Private Sub AddItem_Callback(ByRef oTargetWindow As MSHTML.HTMLWindow2, ByRef xmlItem As MSXML.IXMLDOMNode, Optional ByRef bSetDirty As Boolean = True)
        ' Determine what type of content is being amplified
        Select Case xmlItem.selectSingleNode("@type").Text
            Case "HTMLImg"
                Call AddHTMLImg(xmlItem, oTarget Window)
            Case "IHTMLTxtRange"
                Call AddIHTMLTxtRange(xmlItem, oTargetWindow)
            Case "HTMLObjectElement"
                Call AddHTMLObjectElement(xmlItem, oTargetWindow)
        End Select
        xmlAmplification.selectSingleNode("amplification/frames").appendChild xmlItem
        oAmplification.Dirty = bSetDirty
        bItemWaiting = False
    End Sub
```

In the code set forth in Table D, the software again determines the type of the content item and calls an appropriate function to populate the target frame with the content item. An example of the code to populate the target frame for an image content item is set forth in Table E.

TABLE E

```
' Private Sub AddHTMLImg(ByRef xmlImage As MSXML.IXMLDOMNode, ByRef oTarget Window As MSHTML.HTMLWindow2)
    ' Parameters:
    '    xmlImage - Object reference to the xml for the image being amplified
    '    oTarget Window - Object reference to the target window for the image
    Private Sub AddHTMLImg(ByRef xmlImage As MSXML.IXMLDOMNode, ByRef oTargetWindow As MSHTML.HTML Window2)
        Dim oImage As MSHTML.HTMLImg
        ' Load the html for the image into the target window
        oTargetWindow.navigate AMPLIFY_RES_PATH + "/html/amplifyimage.html"
        ' Waite for the window to finish loading
        DoEvents
        Do Until oTargetWindow.document.readyState "complete"
            DoEvents
```

TABLE E-continued

```
    Loop
    ' Set the base href of the window
    SetBaseHREF oTargetWindow.document, xmlImage.selectSingleNode("source")
    ' Get an object reference to the empty image loaded in the window
    Set oImage = oTargetWindow.document.getElementById("oImage")
    ' Set the image properties
    With xmlImage.selectSingleNode("image")
        oImagesrc = .selectSingleNode("src").Text
        oImagealt = .selectSingleNode("alt").Text
    End With
    ' Make the image visible
    oImage.Style.visibility = "visible"
    Set oImage = Nothing
End Sub
```

The XML structure of a content item preferably includes tags related to the network location and other aspects of the source of the content item such as the protocol (e.g., http), host (e.g., amplifytheweb.com), path (e.g., /images/), page (e.g., page.html), and query. For an image item, the XML structure also preferably includes tags related to the file name (e.g., image.jpeg), alternate information (e.g., "A JPEG image"), height and width. An example of the XML structure for an image content item is set forth in Table F.

TABLE F

```
<frame id=" " type="HTMLImg">
    <source>
        <protocol />
        <host />
        <path />

<query />
    </source>
    <image>
        <src />
        <alt />
        <height />
        <width />
        <mime-type />
        <scale>Y</scale>
    </image>
</frame>
```

The HTML code loaded into a frame includes instructions that define the appearance of the content item in the frame. An example of the HTML code the frame of an image content item is set forth in Table G.

TABLE G

```
<html>
    <head>
    <base id="oBaseHREF" href=""target="_blank">
    </head>
    <body leftmargin="2" topmargin="2" bottommargin="2" rightmargin="2" onresize="ResizeImage( );">
    <table cellpadding="0" cellspacing="0" border="0" height="100%" width="100%">
    <tr>
        <td align="center" valign="middle">
            <img id="oImage" border="0" style="visibility:hidden;" onload="SetupImage( );"
onmouseover="ShowImageToolbar( );" onmouseout="HideImageToolbar(false);" galleryimg="no"><br>
        </td>
    </tr>
    </table>
    <button id="btnImageToolbar" onclick="ScaleImage( );" style="position:absolute;top:0px;left:0px;background-
color:buttonface;visibility:hidden;" onmouseout="HideImageToolbar(false);">
    </button>
    </body>
</html>
```

As discussed above, the software allows the User to divide frames of an open Custom Selection Window to insert additional content items into the window. An example of the code to divide a frame of a Custom Selection Window is set forth in Table H.

TABLE H

```
' Private Sub SplitFrame(ByRef oSplitFrame As MSHTML.HTMLFrameElement, ByRef sNewFrameLocation As String)
    ' Parameters:
    '   oSplitFrame - An object reference to the frame being split
    '   sNewFrameLocation - String containing the location of the new (blank) frame
    Private Sub SplitFrame(ByRef oSplitFrame As MSHTML.HTMLFrameElement, ByRef sNewFrameLocation As String)
        Dim oNew Frameset As MSHTML.IHTMLFrameSetElement
        Dim oReplaceFrame As MSHTML.HTMLFrameElement
        Dim oNewFrame As MSHTML.HTMLFrameElement
        oSplitFrame.Style.border = "0px"
        If sNewFrameLocation = "NewFrameTop" Or sNewFrameLocation = "NewFrameBottom" Then
            Set oNewFrameset = oDocument.createElement("<frameset rows=""50%,50%"">")
        Else
            Set oNewFrameset = oDocument.createElement("<frameset cols=""50%,50%"">")
        End If
        Set oReplaceFrame = oSplitFrame.parentElement.replaceChild(oNewFrameset, oSplitFrame)
        Set oNewFrame = oReplaceFrame.cloneNode(False)
        oNewFrame.id = "fraAmplify" + CStr((oDocument.frames.Length + 1))
        oNewFrame.src = "about:blank"
        If sNewFrameLocation = "NewFrameRight" Or sNewFrameLocation = "NewFrameBottom" Then
            oNewFrameset.appendChild oReplaceFrame
            oNewFrameset.appendChild oNewFrame
        Else
            oNewFrameset.appendChild oNewFrame
            oNewFrameset.appendChild oReplaceFrame
        End If
        Set oNewFrame = Nothing
        Set oReplaceFrame = Nothing
        Set oNewFrameset = Nothing
    End Sub
```

The HTML code that defines the frameset for a Custom Selection Window preferably defines the frames as predetermined percentages of the window. The code may also identify the Custom Selection Window by a unique Window Identifier. The code set forth in Table I below defines a frameset having a top and bottom frame for a Custom Selection Window having a Window Identifier of 579E3E1B-F2A9-42A3-91AC-1635B0A67D04.

TABLE I

```
<html>
    <head>
    </head>
    <frameset ><frameset rows="50%,50%"><frame src="amplification_view_frame.asp?amplification={579E3E1B-F2A9-42A3-91AC-1635B0A67D04}&frame=fraAmplify0" scrolling="no"><frame src="amplification_view_frame.asp?amplification={579E3E1B-F2A9-42A3-91AC-1635B0A67D04}&frame=fraAmplify1" scrolling="no"></frameset></frameset>
    </html>
```

An example of the HTML code for a frame for an image content item for the Custom Selection Window defined by the frameset defined by the code set forth in the above Table I is set forth below in Table J.

TABLE J

```
<html>
    <head>
    <base href="http://www.amplifytheweb.com/" target="_blank">
    <script language="JavaScript">
    <!--
    var lOriginalHeight = 54;
    var lOriginalWidth = 232;
    var bScaleImage = true;
    function GetImageRatio( ) {
        var dHeightRatio = 0.0;
        var dWidthRatio = 0.0;
        if (document.body.clientHeight <= 20 || document.body.clientWidth <= 20) {
            dHeightRatio = 1;
            dWidthRatio = 1;
        } else {
            dHeightRatio = lOriginalHeight / (document.body.clientHeight − 4);
            dWidthRatio = lOriginalWidth / (document.body.clientWidth − 4);
        }
        return dWidthRatio > dHeightRatio ? dWidthRatio : dHeightRatio;
    }
    function ResizeImage( ) {
        if (!bScaleImage) {
            return;
        }
        var dRatio = 0.0;
        dRatio = GetImageRatio( );
        oImage.style.height = Math.round(lOriginalHeight / dRatio);
        oImage.style.width = Math.round(lOriginalWidth / dRatio);
    }
    function ScaleImage( ) {
        bScaleImage = !bScaleImage;
        if (bScaleImage) {
            HideImageToolbar(true);
            ResizeImage( );
        } else {
            HideImageToolbar(true);
            oImage.style.height = '';
            oImage.style.width = '';
        }
    }
    //-->
    </script>
    </head>
    <body leftmargin="2" topmargin="2" bottommargin="2" rightmargin="2" onresize="ResizeImage( );">
    <table cellpadding="0" cellspacing="0" border="0" height="100%" width="100%">
    <tr>
        <td align="center" valign="middle">
            <img id="oImage" src="image.jpeg" alt=" " onload="ResizeImage( );"><br>
        </td>
    </tr>
    </table>
    </body>
</html>
```

An example of the HTML code for a frame for an MPEG movie content item for the Custom Selection Window defined by the frameset defined by the code set forth in the above Table I is set forth below in Table K.

TABLE K

```
<html>
    <head>
    <base href="http://www.amplifytheweb.com/" target="_blank">
    </head>
    <body leftmargin="1" topmargin="1" bottommargin="1" rightmargin="1" bgcolor="#000000">
    <OBJECT ID="oWindowsMedia" width="100%" height="100%" classid="CLSID:22d6f312-b0f6-11d0-94ab-
0080c74c7e95"
        codebase="http://activex.microsoft.com/activex/controls/mplayer/en/nsmp2inf.cab#Version=6,4,7,1112" standby=" "
            onmouseover="this.ShowControls=1;" onmouseout="this.ShowControls=0;">
        <param name="ShowControls" value="0" >
        <param name="AutoStart" value="1">
        <param name="AutoSize" value="0" >
```

TABLE K-continued

```
        <param name="AnimationAtStart" value="False">
        <param name="AutoRewind" value="False">
        <param name="baseUrl" value=" ">
        <param name="FileName" value="movie.mpeg">
        <param name="PlayCount" value="1">
        <param name="Rate" value="1">
    </OBJECT>
    </body>
    </html>
```

The code set forth below in Table L defines a frameset for a Custom Selection Window having a top row of one frame and a bottom row of two frames.

TABLE L

```
<html>
    <head>
    </head>
    <frameset ><frameset rows="50%,50%"><frame src="amplification_view_frame.asp?amplification={579E3E1B-
F2A9-42A3-91AC-1635B0A67D04}&frame=fraAmplify0" scrolling="no"><frameset cols="50%,50%"><frame
src="amplification_view_frame.asp?amplification={579E3E1B-F2A9-42A3-91AC-1635B0A67D04}&frame=fraAmplify1"
scrolling="no"><frame src="amplification_view_frame.asp?amplification={579E3E1B-F2A9-42A3-91AC-
1635B0A67D04}&frame=fraAmplify2" scrolling="no"></frameset></frameset></frameset>
    </html>
```

The Custom Selection Window defined by the frameset set forth above in Table L can contain the image content item (as defined by the code of Table J) in the frame of the top row, an MPEG movie content item in the left frame of the bottom row, and a text content item in the right frame of the bottom row. An example of the HTML code for a text content item comprising the text "This is the text selected by the user." is set forth in Table M.

TABLE M

```
<html>
    <head>
    <base href="http://www.amplifytheweb.com/" target="_blank">
    </head>
    <body leftmargin="0" topmargin="0" bottommargin="0" rightmargin="0" onload="document.body.scroll='auto';">
    <table height="100%" align="center">
    <tr>
        <td valign="middle">
            <span>This is the text selected by the user.</span>
        </td>
    </tr>
    </table>
    </body>
    </html>
```

Frame Toolbar

Figure 12:
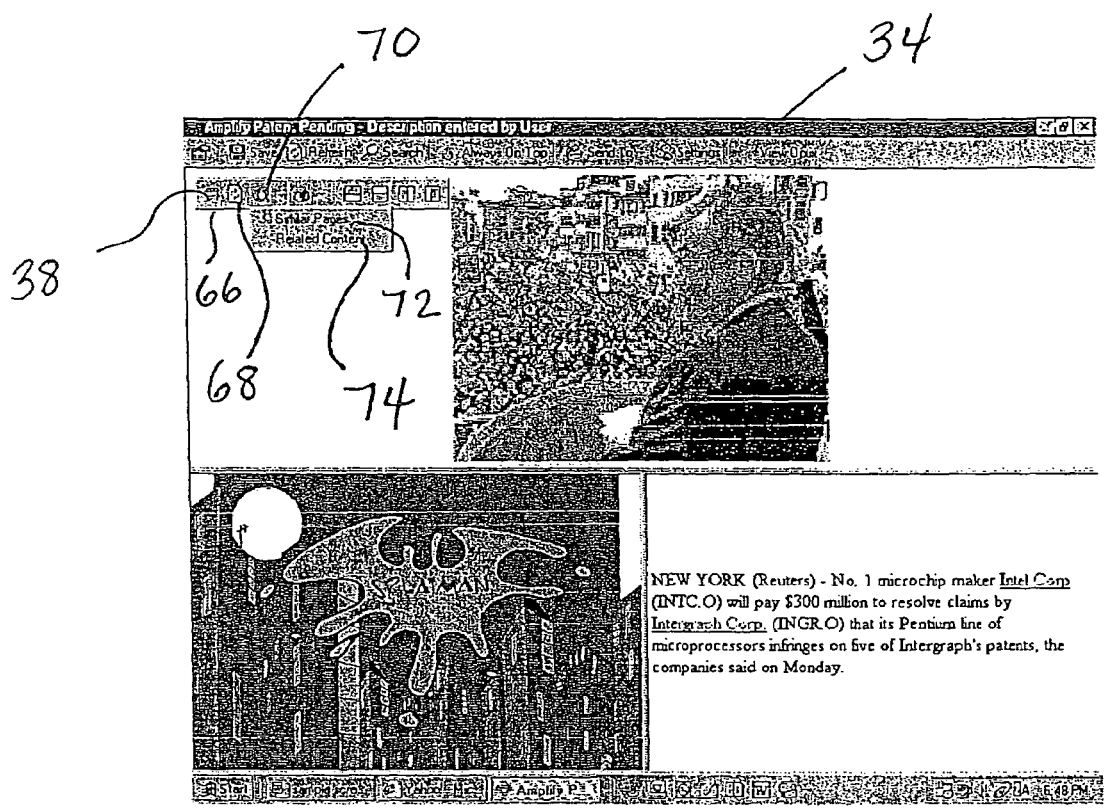
FIGS. 12 and 13 are images of a Custom Selection Window as in FIG. 11, showing a Frame Toolbar in the top frame.

Referring to FIG. 12, the Frame Toolbar 38 preferably appears as an overlay to the content item 18 within the frame and only appears when the User directs the mouse pointer over the display area or frame of the content item (i.e., on a "mouseover" event). In this manner, the Frame Toolbar 38 will disappear when the pointer exits the display area or frame. Thus, the Frame Toolbar 38 does not ordinarily cover or otherwise obscure the content item 18 located within the frame.

Select Content Item (Frame Toolbar)

The Frame Toolbar 38 preferably includes a Select Content Item 66 icon to select the content item 18 located within the respective frame and place the content item in a new Custom Selection Window in a manner similar to selecting content from an original source page. Thus, using this function, the User can pick desired content items out of an existing Custom Selection Window.

Refresh (Frame Toolbar)

In addition, the Frame Toolbar 38 preferably includes a Refresh 68 menu item or icon to reload the content item in the respective frame. To refresh a content item, the software first determines which frame the User has chosen to reload. An example of the code to make this determination is set forth in Table N.

TABLE N

```
' Private Sub Reload(Optional ByRef oTargetFrame As MSHTML.HTMLFrameElement)
    ' Parameters:
    '   oTargetFrame (Optional) - An object reference to a specific frame to be reloaded
    Private Sub Reload(Optional ByRef oTargetFrame As MSHTML.HTMLFrameElement)
        ' If a target frame was passed in, then only reload that frame
        ' otherwise reload all frames
        If Not oTargetFrame Is Nothing Then
            PopulateFrames oAmplification.DOM.selectNodes("amplification/frames/frame[@id='" + oTargetFrame.id +
"']")
        Else
            PopulateFrames oAmplification.DOM.selectNodes("amplification/frames/frame")
        End If
    End Sub
```

Then the code set forth in Table O calls the code set forth in Table P for each frame being reloaded.

TABLE O

```
Private Sub PopulateFrames(xmlFrames As MSXML.IXMLDOMNodeList)
    Dim i As Long
    For i = 0 To xmlFrames.Length – 1
        AddItem_Callback oDocument.frames(xmlFrames.Item(i).selectSingleNode("@id").Text), xmlFrames.Item(i),
False
    Next i
End Sub
```

TABLE P

```
' Private Sub AddItem_Callback(ByRef oTargetWindow As MSHTML.HTMLWindow2, ByRef xmlItem As
MSXML.IXMLDOMNode, Optional ByRef bSetDirty As Boolean = True)
    ' Parameters:
    '   oTargetWindow - An object reference to the target window for the item being amplified
    '   xmlItem - An object reference to the xml of the item being amplified
    '   bSetDirty (Optional, Default = True) - Boolean value indicating weather or not to set the dirty flag for the
amplification
    Private Sub AddItem_Callback(ByRef oTargetWindow As MSHTML.HTMLWindow2, ByRef xmlItem As
MSXML.IXMLDOMNode, Optional ByRef bSetDirty As Boolean = True)
        ' Determine what type of content is being amplified
        Select Case xmlItem.selectSingleNode("@type").Text
            Case "HTMLImg"
                Call AddHTMLImg(xmlItem, oTargetWindow)
            Case "IHTMLTxtRange"
                Call AddIHTMLTxtRange(xmlItem, oTargetWindow)
            Case "HTMLObjectElement"
                Call AddHTMLObjectElement(xmlItem, oTargetWindow)
        End Select
        xmlAmplification.selectSingleNode("amplification/frames").appendChild xmlItem
        oAmplification.Dirty = bSetDirty
        bItemWaiting = False
    End Sub
```

Search (Frame Toolbar)

Referring to FIG. 12, the Frame Toolbar 38 preferably includes a Search 70 icon which allows the User to perform a search for content related to the content item in the frame. The Search icon 70 preferably provides a drop-down menu having a Similar Pages 72 menu item and a Related Content 74 menu item. Upon selection of either the Similar Pages 72 or Related Content 74 search menu items, the software opens a new browser window and queries an Internet search engine (e.g., google.com) with a search command using certain search parameters. The Similar Pages 72 menu item performs a search for web pages related to the domain name of the source of the content item in the frame. The search command for the Similar Pages 72 menu item is, for example: "http://www.google.com/search?q=related: www.amplifytheweb.com/", where "www.amplifytheweb.com" is the domain name of the source of the content item in the frame.

The Related Content 74 menu item performs a search of the domain of the source of the content item of the frame for items related to the Keywords of the Custom Selection Window. The search command for the Related Content 74 menu item is, for example: "http://www.google.com/search?g=Keyword1%20Keyword2+site:www.amplifytheweb.com", where "Keyword1" and "Keyword2" are the Keywords entered by the user for the Custom Selection Window.

The result of the search is an independent browser window containing "hits" returned by the search engine, which should be relevant to the selected content or source of the content. As is common, the hits are typically in the form of short descriptions of the search results accompanied by hypertext links, or universal resource locators (i.e., url's), which lead to web pages.

Examples of the code for the Similar Pages 72 and Related Content 74 menu items are set forth below in Tables Q and R, respectively.

TABLE Q

```
Private Sub FrameToolbar_SearchForSimilarPages(oSourceFrame As MSHTML.HTMLFrameElement)
    With xmlAmplification.selectSingleNode("amplification/frames/frame[@id='" + oSourceFrame.id + "']/source")
        LaunchBrowser SEARCH_PAGE + "related:" + .selectSingleNode("host").Text + "/" +
.selectSingleNode("page").Text
    End With
End Sub
```

TABLE R

```
Private Sub FrameToolbar_SearchThisSite(oSourceFrame As MSHTML.HTMLFrameElement)
    LaunchBrowser SEARCH_PAGE + Keywords + "+site:" +
oAmplification.DOM.selectSingleNode("amplification/frames/frame[@id='" + oSourceFrame.id + "']/source/host").Text
End Sub
```

Delete Frame (Frame Toolbar)

The Frame Toolbar 38 also preferably includes a Delete menu item (not shown) that is operable to delete the associated frame from the Custom Selection Window. Preferably, upon the deletion of a frame, the "parent" frame, that is the frame from within the deleted frame was originally created, is resized to occupy the space previously occupied by the parent frame and the deleted frame. In addition, as discussed above the content item within the resized parent frame is resized (i.e., expanded) accordingly.

GoTo This Site, GoTo This Page

Figure 13:
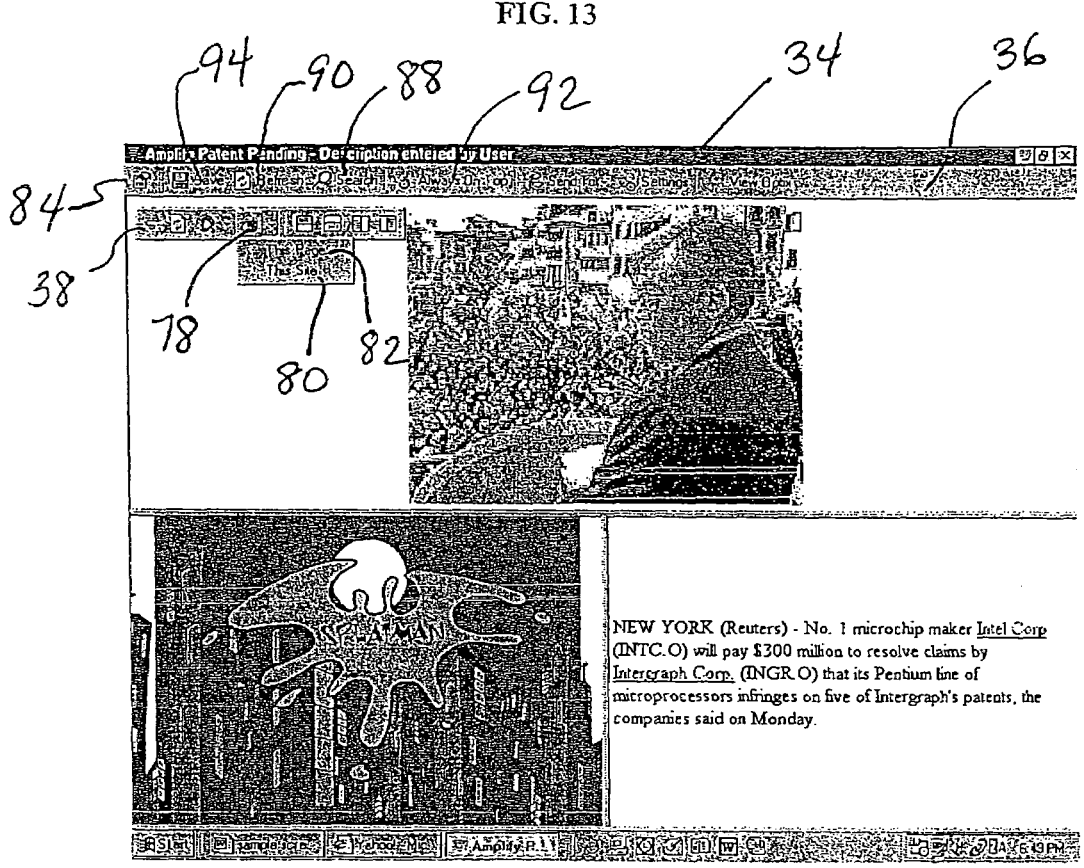

Referring to FIG. 13, the Frame Toolbar 38 also preferably includes a GoTo 78 icon that presents a drop-down menu having a This Site 80 menu item and a This Page 82 menu item. The This Site 80 menu item opens a new browser window that loads the main page of the domain of the content item in the frame. The This Page 82 menu item opens a new browser window that load the page from which the content item of the frame was selected. Thus, the system provides a quick and convenient means to find and view the source of selected content items.

Properties (Window Toolbar)

The Window Toolbar 36 includes a Window Properties 84 icon that displays the Properties Window 28 (see FIG. 5) to allow the User to modify the Description 30 and the Keywords 32.

Search (Window Toolbar)

The Window Toolbar 36 also includes a Search 88 icon that performs a search of the World Wide Web base upon the Keywords 32. An example of the search command invoked by the Search 76 icon of the Window Toolbar 36 is "http://www.google.com/search?q=Keyword1%20Keyword2."

Refresh (Window Toolbar)

The Window Toolbar 36 also preferably includes a Refresh 90 icon that reloads all of the content items of a Custom Selection Window 34 with one click. The example code set forth in Tables N, O & P above will reload all of the content items of a Custom Selection Window.

Always On Top

The Window Toolbar 36 also includes an Always On Top 92 icon, which, when selected, will retain the Custom Selection Window 34 as the top window on the computing device irrespective of whether the User selects another window, such as another program, as the active window. With this function, the User can quickly and conveniently select and focus on a desired content item, such as a streaming video, and ensure that the content item is always visible even if the User is working with another program. As mentioned above, the User can resize and relocate the Custom Selection Window 34 to view other programs, as desired.

Save

A Save 94 icon of the Window Toolbar 36 saves the Custom Selection Window 34 for later use. Preferably a Window Definition of the Custom Selection Window 34 is saved in memory of the computing device of the User (e.g., RAM or on a hard drive) and/or on a remote Server accessible via the Internet or other network. Preferably the content items of a Custom Selection Window are not themselves saved on the computing device of the User or on the Server, but only the Window Definition, which Window Definition contains the particulars of the Custom Selection Window and of the content items therein. Preferably, the Window Definition is in the form of an XML document containing a unique Window Identifier, a frameset and specific information for each frame.

Preferably, upon saving a new Window Definition, the software on the computing device of the User or the Server assigns a unique Window Identifier to the Custom Selection Window which is saved with or otherwise associated with the Window Definition. As discussed below, the Window Identifier is used to recreate the Custom Selection Window at a later time. For non-text content items, the Window Definition does not include the actual content items, but does include information regarding the source and identity of the content item sufficient to access or recreate the content item. Specifically, for non-text content items, the Window Definition preferably includes information identifying the source of the content item, including the domain name, path and file name, and includes identifying information and parameters of any media player or external application (or the like) required to display or play the content item. For text content items, the Window Definition may include the string of text selected by the User, or may include information identifying the source of the text and coordinates specifying the beginning and end points of the text. If entered by the User, the Window Definition also includes the Keywords 30. The example of the XML code set forth in Table S below is a Window Definition having a video content item, a text content item and an image content item.

TABLE S

```
<amplification>
    <guid>{7DAED7EF-FC90-4CF7-91C6-8886F5BF5C4F}</guid>
    <height>360</height>
    <width>643</width>
    <description>New Amplification</description>
    <keywords></keywords>
    <frameset>
        <frameset cols="50%,50%"><frameset rows="57%,43%"><frame id="fraAmplify3"/><frame
id="fraAmplify1"/></frameset><frameset rows="30%,70%"><frame id="fraAmplify2"/><frame
id="fraAmplify0"/></frameset></frameset></frameset><frames><frame id="fraAmplify0" type="HTMLObjectElement">
        <source>
            <protocol>http:</protocol>
            <host>www.msnbc.com</host>
            <path>/m/mw/</path>
            vw.htm
            <query></query>
        </source>
        <object type="MEDIAPLAYER">
            <class-id>CLSID:22d6f312-b0f6-11d0-94ab-0080c74c7e95</class-id>
            <code-
base>http://activex.microsoft.com/activex/controls/mplayer/en/nsmp2inf.cab#Version=6,4,7,1112</code-base>
            <standby>Loading Microsoft Media Player compnents . . . </standby>
            <params><param name="AnimationAtStart">False</param><param
name="AutoRewind">False</param><param name="baseUrl"></param><param
name="FileName">http://www.msnbc.com/m/mw/s/msnbc/asx.asp?er=http://www.msnbc.com/m/mw/s/msnbc/sorry.asf&b
=&bu=&vu=&pu=mms://od-msnbc.msnbc.com/msnbc/video/promo/100/promo3.asf&cu=mms://od-
msnbc.msnbc.com/msnbc/video/commercials/100/ad_intertainer_04.asf&akid=472002</param><param
name="PlayCount">1</param><param name="Rate">1</param></params>
        </object>
    </frame><frame id="fraAmplify1" type="IHTMLTxtRange">
        <source>
            <protocol>http:</protocol>
            <host>www.ncodev.com</host>
            <path>/</path>

<query></query>
        </source>
        <content>
            <![CDATA[<IMG height=10 src="images/dots.gif" width=4><B> NCODE</B> is
the leading
software engineering firm to provide <I>integration services</I> and <I>custom
application development</I> merging legacy technologies and cutting edge
engineering tools to create the most powerful business applications. <BR>]]>
        </content>
    </frame><frame id="fraAmplify2" type="HTMLImg">
        <source>
            <protocol>http:</protocol>
            <host>www.ncodev.com</host>
            <path>/</path>

<query></query>
        </source>
        <image>
            <src>http://www.ncodev.com/images/phrase_2.gif</src>
            <alt></alt>
            <height>54</height>
            <width>232</width>
            <mime-type/>
            <scale>1</scale>
        </image>
    </frame><frame id="fraAmplify3" type="IHTMLTxtRange">
        <source>
            <protocol>http:</protocol>
            <host>www.ncodev.com</host>
            <path>/</path>

<query></query>
        </source>
        <content>
            <![CDATA[<IMG height=10 src="images/dots.gif" width=4> Our entire team is
committed to
transforming our clients' businesses utilizing a range of industry leading
applications and custom software solutions to meet any specific need and
business challenge. We mold technology to optimize your business processes and
ultimately <I>maximize your bottom line.</I><BR>]]>
        </content>
    </frame></frames>
</amplification>
```

Figure 14:
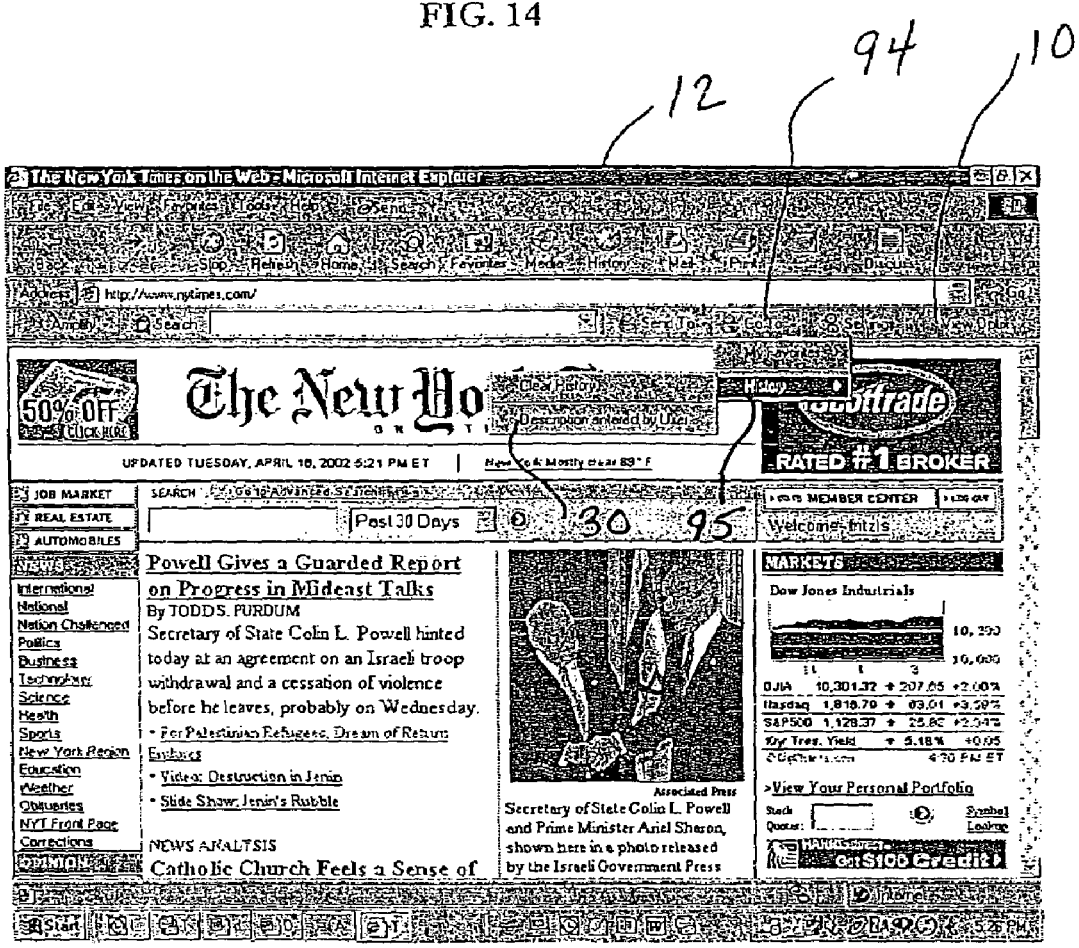
FIG. 14 is an image of the (Go To) History menu item of the Main Toolbar.

Referring to FIG. 14, the Main Toolbar 10 includes a GoTo 94 icon, that presents a History 95 menu item list, that in turn presents a Most Recently Used (MRU) List 96 of Custom Selection Windows, in preferably chronological order of use. Preferably, the windows are identified in the MRU List 96 by their Descriptions 30. The MRU List 96 is preferably limited to a predetermined number of windows, for example the last 20 used, such that the MRU List 96 is a dynamic list providing convenient access to recently used Custom Selection Windows. The User may recreate a Custom Selection Window from the MRU List 96 by clicking on the Description for the window. Upon selection of a Custom Selection Window from the MRU List 96, the software locates and retrieves the Window Definition from the memory device of the computing device or from the Server using the unique Window Identifier, recreates the Custom Selection Window and loads the content items directly from the original source of each item, as recorded in the Window Definition.

Send To Favorites

Figure 15:
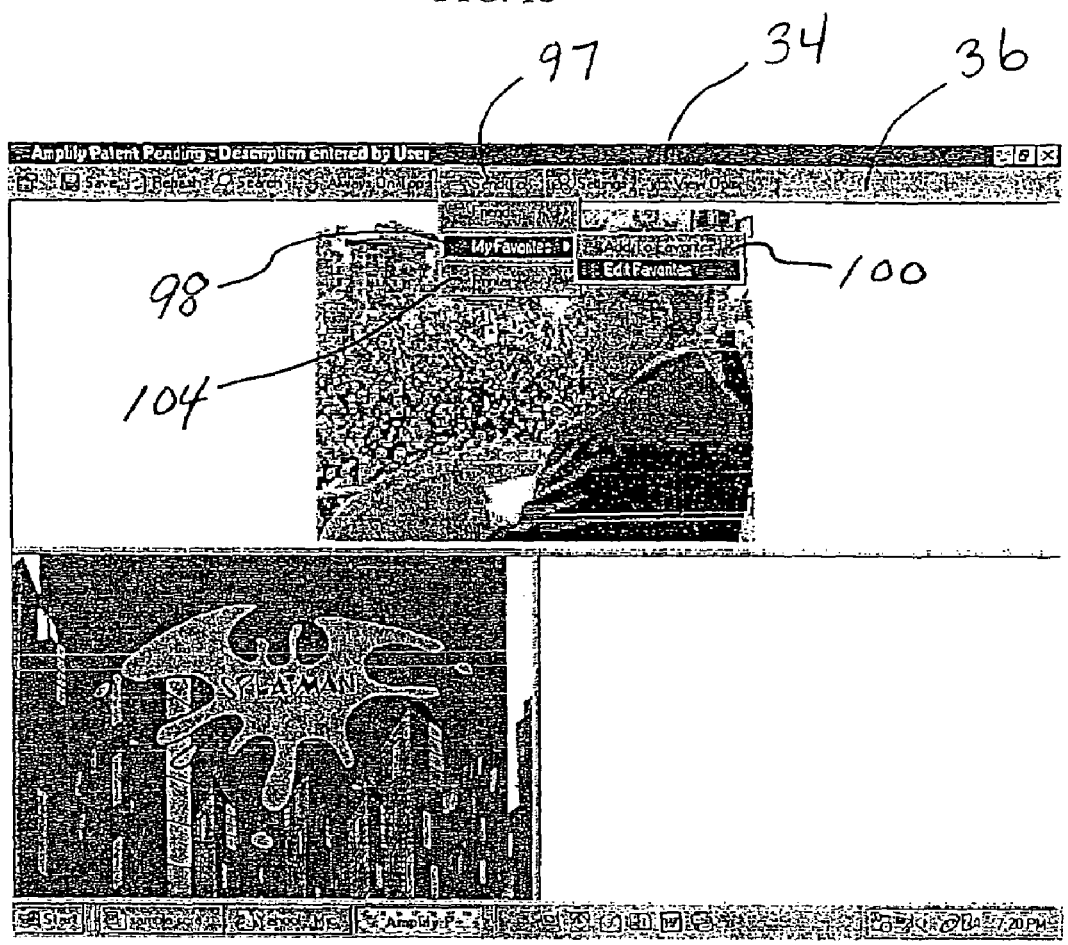
FIG. 15 is an image of the (Send To) Favorites menu item of the Window Toolbar.
Figure 16:
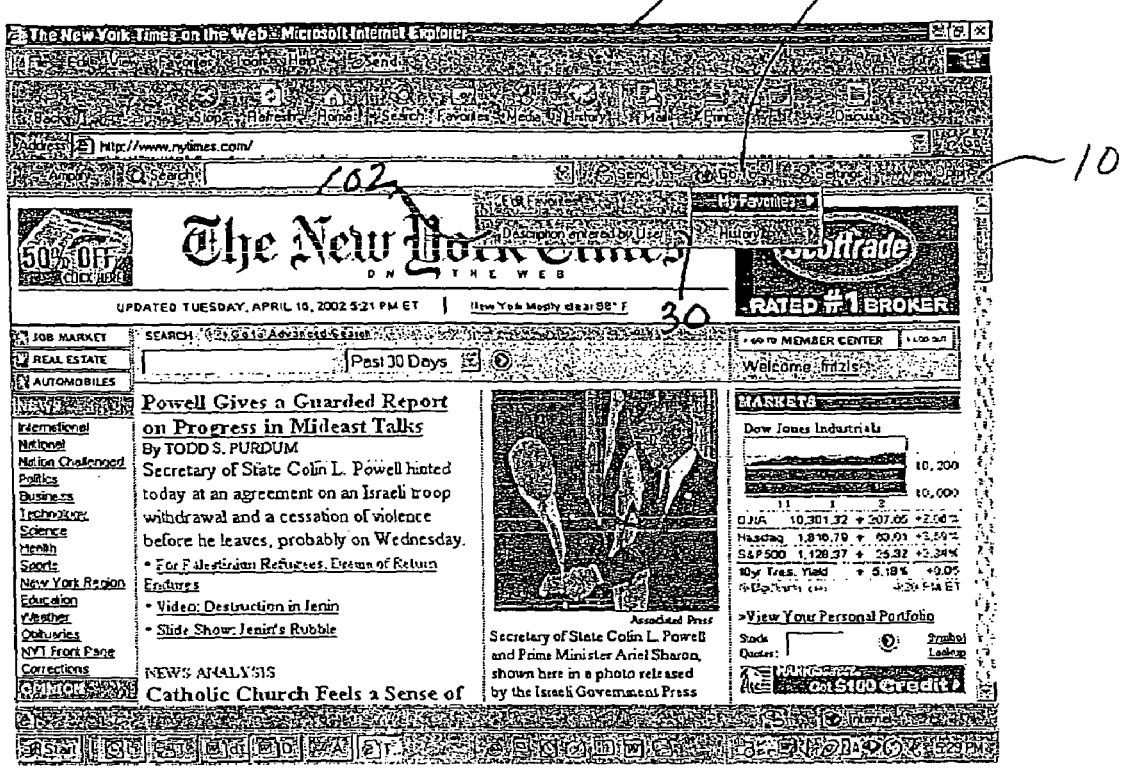
FIG. 16 is an image of the (Go To) Favorites menu item of the Main Toolbar.

Referring to FIGS. 15 & 16, the Window Toolbar 36 includes a Send To 97 icon, that presents a Favorites 98 menu item, that in turn presents an Add to Favorites 100 menu item. The Add to Favorites 100 menu item saves the Custom Selection Window in a Favorites List 102 that is accessible via the GoTo 94 icon of the Main Toolbar 10. As with the MRU List 96, the software stores the Window Definition of each Custom Selection Window in the Favorites List 102 on the computing device and preferably on the Server. Also, as with the MRU List 96, the Custom Selection Windows in the Favorites List 102 are preferably identified by the Description 30. However, in contrast to the MRU List 96, the Favorites List 102 preferably remains the same until the User adds or deletes a Custom Selection Window from the list. Thus, the Custom Selection Windows in the Favorites List 102 will always be available to the User regardless of other windows which the User may have created and saved.

As with the MRU List 96, upon selection of a Custom Selection Window from the Favorites List 102, the software locates and retrieves the Window Definition from the memory device of the computing device of the User or from the Server using the unique Window Identifier, recreates the Custom Selection Window and loads the content items directly from the original source of each item, as recorded in the Window Definition.

Dynamic Favorites List

The Favorites List 102 can be modified, dynamically, as the User navigates (or "surfs") the World Wide Web. In particular, Matching Custom Selection Windows containing content items from the domain of the source currently displayed in the browser application of the User can be highlighted or segregated in the Favorites List 102. For example Matching Custom Selection Windows in the list can be grouped together in a sub-list (not shown) segregated from other Custom Selection Windows in the list. Alternatively, the Matching Custom Selection Windows in the list can be highlighted by limiting the display of the Favorites List 102 to only the Matching Custom Selection Windows, or can be highlighted visually, by color or in some other visual manner. Alternatively, the Favorites List 102 can be presented in an order that highlights the Matching Custom Selection Windows, such as with the Matching Custom Selection Windows at the top of the list. It can be appreciated that any other similar method of dynamically highlighting Matching Custom Selection Windows in the Favorites List 102 is within the scope of the invention.

To dynamically modify the Favorites List 102 according to the domain of a source currently displayed in the browser application, software on the computing device of the User monitors the currently displayed source and compares the domain of the current source to the domains of content items stored in the Window Definitions used to create the Favorites List 102. The software then modifies the Favorites List 102 in one of the above manners, or a similar manner, to highlight Matching Custom Selection Windows.

Send To Printer (Window Toolbar & Frame Toolbar)

Referring to FIG. 15, the Send To icon 97 of the Window Toolbar 36 preferably includes a Printer menu item 104 that sends the Custom Selection Window to a printer available to the computing device of the User. Similarly, the Frame Toolbar 38 also preferably includes a Send to Printer Function (not shown) which allows the user to send the content item of one frame to the printer.

Send To Recipient

Figure 17:
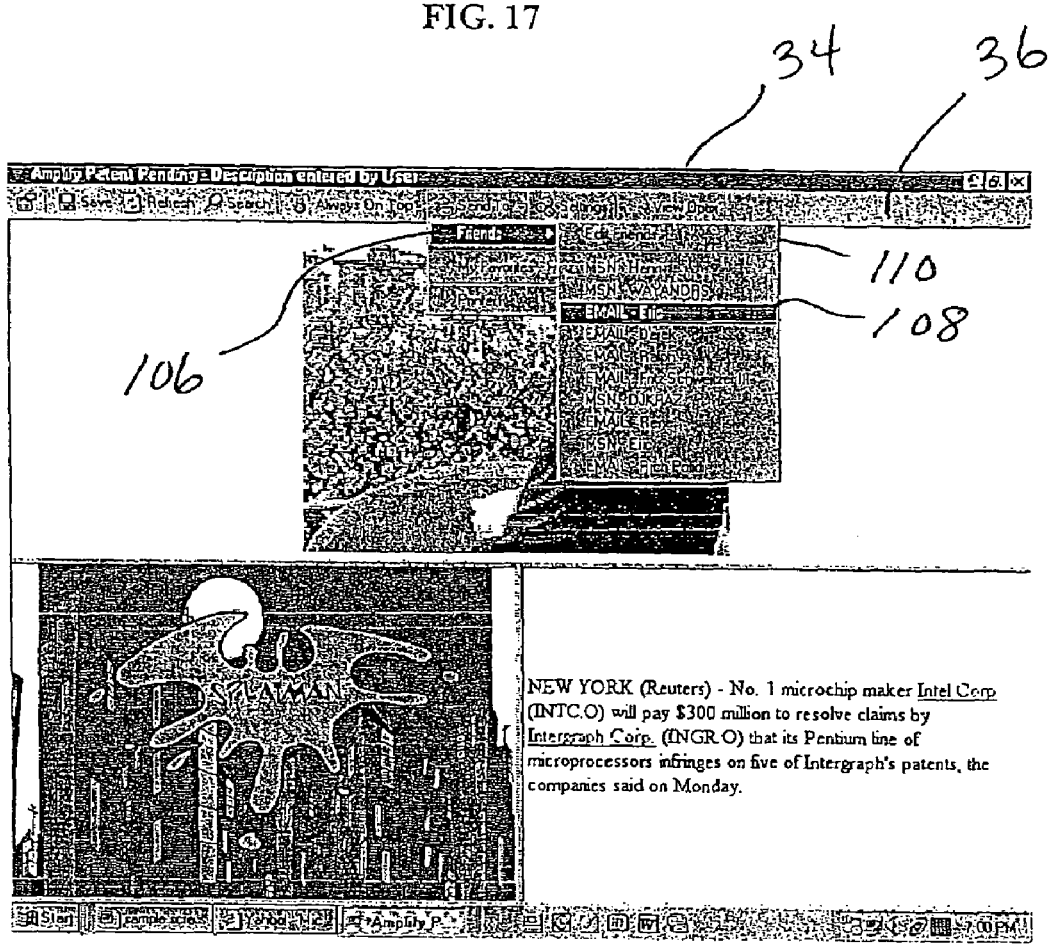
FIG. 17 is an image of the (Send To) Recipients menu item of the Window Toolbar.
Figure 18:
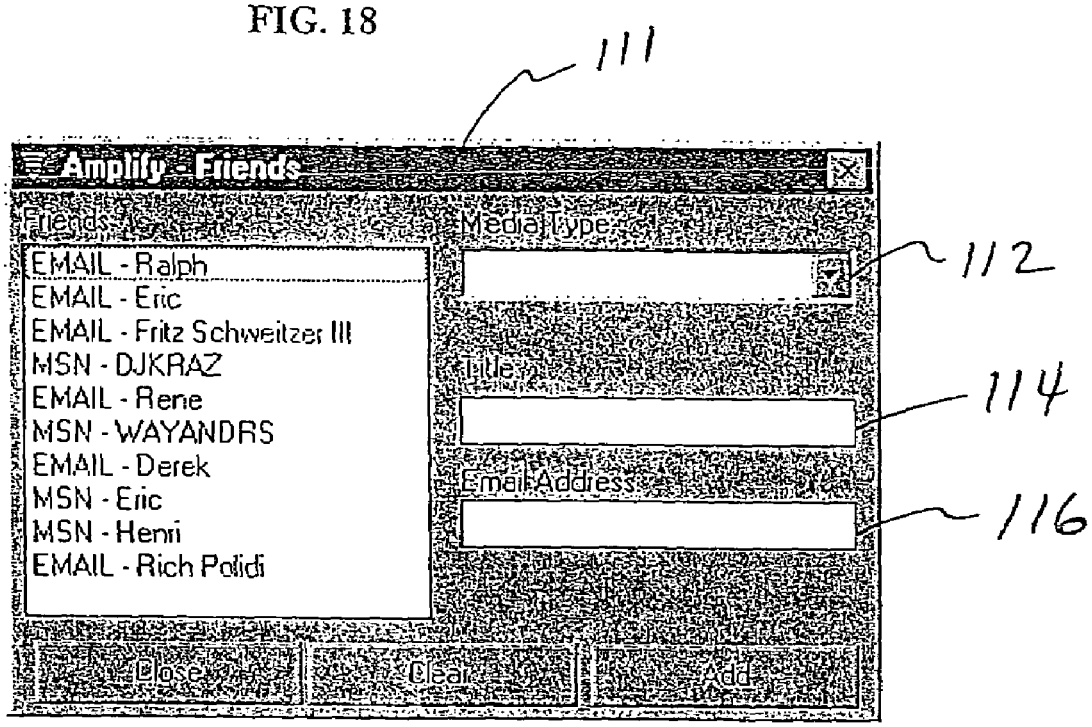
FIG. 18 is an image of the Edit Recipients dialog window.

Referring to FIGS. 17 & 18, the Send To icon 97 of the Window Toolbar 36 also includes a Recipients 106 menu item (shown as "Friends" in the drawings) that presents a List of Recipients 108 to which Custom Selection Windows may be sent by email, instant message or another type of electronic communication method. Preferably, the Recipients 106 menu item provides a means to enter (or modify) the Electronic Address of a Recipient of a Custom Selection Window, such as the Edit Recipients 110 menu item which presents the dialog window 111 of FIG. 18. Preferably, for each Recipient, the User can enter the Electronic Communication Method 112 (e.g., EMAIL), a descriptive Recipient Name 114 and the Electronic Address 116 of the Recipient (e.g., email_address@domain.com).

When a Recipient is chosen from the List of Recipients 108, the software on the computing device of the User sends the Window Definition of the Custom Selection Window (comprising an XML document of the type set forth above in Table S) to the Server. The Window Definition is stored on the Server along with the Window Identifier (which is assigned at that time, if one has not been assigned yet).

After receipt of the Window Definition, the Server sends an electronic message to the Recipient at the Electronic Address of the Recipient via electronic mail, instant messaging program, or other electronic means, as appropriate. The electronic message sent to the Recipient contains a hypertext link, or universal resource locator (url) containing the Window Identifier, which link leads back to the Server.

It may be preferable that the electronic message is sent to the Recipient by the Server. However, the electronic message may also be sent to the Recipient by a communication application on the computing device of the User. In either case, the electronic message includes a link to the Server, which link contains the unique Window Identifier. If the electronic message is sent by the User, both the Server and the computing device of the User must have the unique Window Identifier. (See "Create Link" below).

The presence of the Keywords in the Window Definition provide an important function by allowing the creator of the Custom Selection Window to provide targeted words to search for related content on the web. As a part of the Window Definition, the Keywords are attached to the Custom Selection Window and remain with the Custom Selection Window when it is saved (or sent to the Favorites List), and travel with the Custom Selection Window when the Custom Selection Window is accessed by a Recipient.

It should be noted that the electronic message sent to the Recipient does not contain the content items themselves, but only a link to the Server. As opposed to prior methods of sending entire content items to a recipient, the present invention greatly reduces the time and bandwidth required to send an electronic message to another to share content over a network such as the Internet. Moreover, the present invention overcomes the limitations of electronic communications methods by sending an electronic message containing a link used to re-create the content in a browser application.

Upon receiving the electronic message, the User can recreate the Custom Selection Window by selecting, or clicking on, the hypertext link in the electronic message. When the Recipient selects the link within the electronic message, the computing device of the Recipient activates a browser application that sends a request to the Server, which request contains the unique Window Identifier of the Custom Selection Window. The Server locates the Window Definition of the Custom Selection Window using the Window Identifier embedded within the link and responds with an Initial Recipient Web Page.

The Initial Recipient Web Page has code that attempts to detect whether the Recipient has installed the software required to create Custom Selection Windows. In one embodiment, the Initial Recipient Web Page attempts to detect the presence of the software by attempting to initialize certain components or objects of the software. If the software is detected on the Recipients computing device, then the Initial Web Page passes the Window Identifier to the software which then creates a Custom Selection Window as defined by the Window Definition, which window has the full functionality provided by the software, including the Window and Frame Toolbars.

Recipient Window

Figure 19:
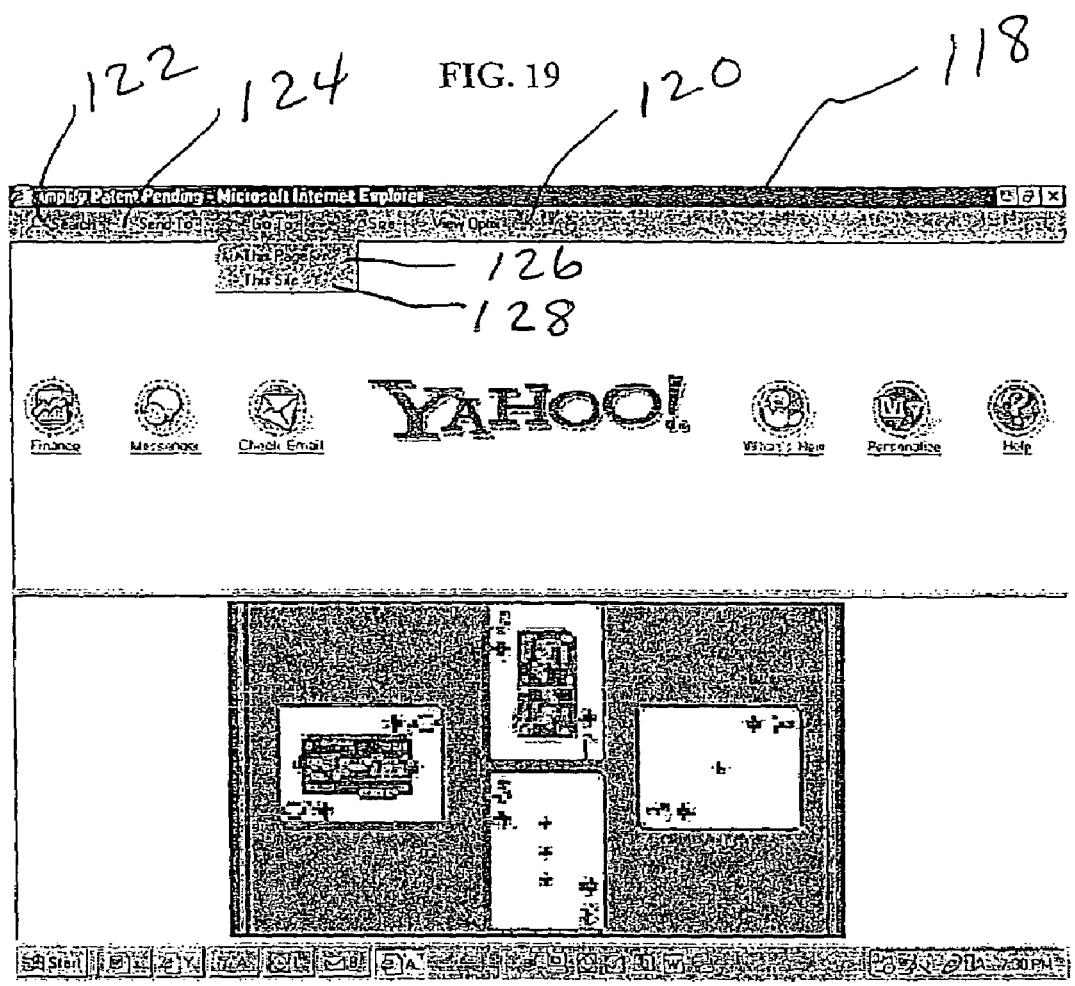
FIG. 19 is an image of the Recipient Window.

Referring to FIG. 19, if the software is not detected, then the Initial Recipient Web Page includes code to open a new browser window, the Recipient Window 118, having dimensions defined in the Window Definition and to retrieve a Recipient Toolbar 120 from the Server and to populate the new window with the Recipient Toolbar 120. Then the browser calls a page to create the frameset for the Recipient Window 118, according to the Window Definition. Each frame within a frameset then calls a page to populate the frame. Preferably a standard browser application can create the Recipient Window 118 without the additional software required to initially create and send the Custom Selection Window. Therefore the User is free to transmit access to the custom selection to any other computing device on the Internet or other network having a browser application.

As with the Custom Selection Window 34, preferably the Recipient Window 118 is configured to load the content items therein via the browser application on the computing device of the Recipient directly from the respective original sources of the content. Thus, by employing the browser application on the computing device of the Recipient to retrieve and load the content items, the system of the present invention avoids the content type and size limitations of electronic messaging systems, as discussed above.

Examples of Server-side code to create the frameset and individual frames for a Recipient Window are set forth in Table T & U, respectively.

TABLE T

```
<!--#INCLUDE FILE="scripts/common.asp"-->
<SCRIPT LANGUAGE=vbscript RUNAT=Server>
Sub FramesetXMLToHTML(oFramesetXML)
    Output "<frameset "
    If Not oFramesetXML.selectSingleNode("@cols") Is Nothing Then
        Output "cols=""" & oFramesetXML.selectSingleNode("@cols").text & """"
    ElseIf Not oFramesetXML.selectSingleNode("@rows") Is Nothing Then
        Output "rows=""" & oFramesetXML.selectSingleNode("@rows").text & """"
    End If
    Output ">"
    For i = 0 To oFramesetXML.childNodes.length – 1
        'Output oFramesetXML.childNodes(i).nodeName & vbCrLf
        Select Case UCase(oFramesetXML.childNodes(i).nodeName)
            Case "FRAME"
                Output "<frame src=""amplification_view_frame.asp?amplification=" &
sAmplGUID & "&frame=" & oFramesetXML.childNodes(i).selectSingleNode("@id").text & """ scrolling=""no"">"
            Case "FRAMESET"
                FramesetXMLToHTML oFramesetXML.childNodes(i)
        End Select
    Next
    Output "</frameset>"
End Sub
</SCRIPT>
<%
Dim sAmplGUID
    sAmplGUID = Request.QueryString("amplification")
If Not Len(sAmplGUID) > 0 Then
    Response.End
End If
Dim lAmplHeight
    lAmplHeight = 0
Dim lAmplWidth
    lAmplWidth = 0
Dim sAmplDescription
    sAmplDescription = " "
Dim sAmplKeywords
    sAmplKeywords = " "
Dim oAmplFramesetXML
Set oAmplFramesetXML = Server.CreateObject("MSXML2.DOMDocument")
Dim oConn, oRS, sSQL
Set oConn = Server.CreateObject("ADODB.Connection")
Set oRS = Server.CreateObject("ADODB.Recordset")
```

TABLE T-continued

```
oConn.Open CONN_STRING
sSQL = "amplification_sel_sp @ampl_guid = '" & sAmplGUID & "'"
oRS.Open sSQL, oConn, 3
lAmplHeight = oRS("ampl_height")
lAmplWidth = oRS("ampl_width")
sAmplDescription = oRS("ampl_description")
sAmplKeywords = oRS("ampl_keywords")
oAmplFramesetXML.loadXML oRS("ampl_frameset")
oRS.Close
oConn.Close
Set oRS = Nothing
Set oConn = Nothing
%>
<html>
<head>
</head>
<% FramesetXMLToHTML(oAmplFramesetXML.documentElement) %>
</html>
<%
Set oAmplFramesetXML = Nothing
%>
```

TABLE U

```
<!--#INCLUDE FILE="scripts/common.asp"-->
<%
Dim sAmplGUID
    sAmplGUID = Request.QueryString("amplification")
Dim sFrameID
    sFrameID = Request.QueryString("frame")
If Not Len(sAmplGUID) > 0 Or Not Len(sFrameID) > 0 Then
    Response.End
End If
Dim sFrameType
    sFrameType = " "
Dim sSourceProtocol
    sSourceProtocol = " "
Dim sSourceHost
    sSourceHost = " "
Dim sSourcePath
    sSourcePath = " "
Dim sSourcePage
    sSourcePage = " "
Dim sSourceQuery
    sSourceQuery = " "
Dim oConn, oRS, oRS2, sSQL
Set oConn = Server.CreateObject("ADODB.Connection")
Set oRS = Server.CreateObject("ADODB.Recordset")
Set oRS2 = Server.CreateObject("ADODB.Recordset")
oConn.Open CONN_STRING
sSQL = "ampl_frame_sel_sp " _
    & "@fram_ampl_guid = '" & sAmplGUID & "', " _
    & "@fram_id = '" & sFrameID & "'"
oRS.Open sSQL, oConn, 3
If Not oRS.EOF Then
    sFrameType = oRS("fram_type")
    sSourceProtocol = oRS("fram_source_protocol")
    sSourceHost = oRS("fram_source_host")
    sSourcePath = oRS("fram_source_path")
    sSourcePage = oRS("fram_source_page")
    sSourceQuery = oRS("fram_source_query")
End If
oRS.Close
Select Case sFrameType
    Case "HTMLImg"
        sSQL = "ampl_fram_htmlimg_sel_sp " _
            & "@himg_ampl_guid = '" & sAmplGUID & "', " _
            & "@himg_fram_id = '" & sFrameID & "'"
        oRS.Open sSQL, oConn, 3
        If Not oRS.EOF Then
%>
<html>
<head>
<base href="<%= sSourceProtocol & "//" & sSourceHost & sSourcePath %>" target="_blank">
<script language="JavaScript">
<!--
```

TABLE U-continued

```
var lOriginalHeight = <%= oRS("himg_height") %>;
var lOriginalWidth = <%= oRS("himg_width") %>;
var bScaleImage = <% If oRS("himg_scale") = 1 Then %>true<% Else %>false<% End If %>;
function GetImageRatio( ) {
    var dHeightRatio = 0.0;
    var dWidthRatio = 0.0;
    if (document.body.clientHeight <= 20 || document.body.clientWidth <= 20) {
        dHeightRatio = 1;
        dWidthRatio = 1;
    } else {
        dHeightRatio = lOriginalHeight / (document.body.clientHeight - 4);
        dWidthRatio = lOriginalWidth / (document.body.clientWidth - 4);
    }
    return dWidthRatio > dHeightRatio ? dWidthRatio : dHeightRatio;
}
function ResizeImage( ) {
    if (!bScaleImage) {
        return;
    }
    var dRatio = 0.0;
    dRatio = GetImageRatio( );
    oImage.style.height = Math.round(lOriginalHeight / dRatio);
    oImage.style.width = Math.round(lOriginalWidth / dRatio);
}
function ScaleImage( ) {
    bScaleImage = !bScaleImage;
    if (bScaleImage) {
        HideImageToolbar(true);
        ResizeImage( );
    } else {
        HideImageToolbar(true);
        oImage.style.height = '';
        oImage.style.width = '';
    }
}
//-->
</script>
</head>
<body leftmargin="2" topmargin="2" bottommargin="2" rightmargin="2" onresize="ResizeImage( );">
<table cellpadding="0" cellspacing="0" border="0" height="100%" width="100%">
<tr>
    <td align="center" valign="middle">
        <img id="oImage" src="<%= oRS("himg_src") %>" alt="<%=oRS("himg_alt") %>"
onload="ResizeImage( );"><br>
    </td>
</tr>
</table>
</body>
</html>
<%
        End If
        oRS.Close
    Case "IHTMLTxtRange"
        sSQL = "ampl_fram_ihtmltxtrange_sel_sp "_
            & "@txrg_ampl_guid = '" & sAmplGUID & "', "_
            & "@txrg_fram_id = '" & sFrameID & "'"
        oRS.Open sSQL, oConn, 3
        If Not oRS.EOF Then
%>
<html>
<head>
<base href="<%= sSourceProtocol & "//" & sSourceHost & sSourcePath %>" target="_blank">
</head>
<body leftmargin="0" topmargin="0" bottommargin="0" rightmargin="0" onload="document.body.scroll='auto';">
<table height="100%" align="center">
<tr>
    <td valign="middle">
        <span><%= oRS("txrg_content") %></span>
    </td>
</tr>
</table>
</body>
</html>
<%
        End If
        oRS.Close
    Case "HTMLObjectElement"
        sSQL = "ampl_fram_htmlobjectelement_sel_sp" _
            & "@oblm_ampl_guid = '" & sAmplGUID & "', "_
```

TABLE U-continued

```
                & "@oblm_fram_id = '" & sFrameID & "'"
            oRS.Open sSQL, oConn, 3
            If Not oRS.EOF Then
%>
<html>
<head>
<base href="<%= sSourceProtocol & "//" & sSourceHost & sSourcePath %>" target="_blank">
</head>
<body leftmargin="1" topmargin="1" bottommargin="1" rightmargin="1" bgcolor="#000000">
<%
                    Select Case oRS("oblm_type")
                        Case "MEDIAPLAYER"
%>
<OBJECT ID="oWindowsMedia" width="100%" height="100%" classid="<%= oRS("oblm_class_id") %>"
        codebase="<%= oRS("oblm_code_base") %>" standby="<%= oRS("oblm_standby") %>"
        onmouseover="this.ShowControls=1;" onmouseout="this.ShowControls=0;">
    <param name="ShowControls" value="0">
    <param name="AutoStart" value="1">
    <param name="AutoSize" value="0">
<%
                            sSQL = "ampl_fram_oblm_params_sel_sp" _
                                & "@parm_ampl_guid = '" & sAmplGUID & "', "

& "@parm_fram_id = '" & sFrameID & "'"
                            oRS2.Open sSQL, oConn, 3
                            Do While Not oRS2.EOF
%>
    <param name="<%= oRS2("parm_name") %>" value="<%= oRS2("parm_value") %>">
<%
                                oRS2.MoveNext
                            Loop
                            oRS2.Close
%>
</OBJECT>
<%
                        Case "SHOCKWAVEFLASH"
%>
<OBJECT ID="oShockwaveFlash" height="100%" width="100%" classid="<%= oRS("oblm_class_id") %>"
codebase="<%= oRS("oblm_code_base") %>" standby="<%= oRS("oblm_standby") %>">
<%
                            sSQL = "ampl_fram_oblm_params_sel_sp " _
                                & "@parm_ampl_guid = '" & sAmplGUID & "', "

& "@parm_fram_id = '" & sFrameID & "'"
                            oRS2.Open sSQL, oConn, 3
                            Do While Not oRS2.EOF
%>
    <param name="<%= oRS2("parm_name") %>" value="<%= oRS2("parm_value") %>">
<%
                                oRS2.MoveNext
                            Loop
                            oRS2.Close
%>
</OBJECT>
<%
            End Select
%>
</body>
</html>
<%
        End If
        oRS.Close
    End Select
    oConn.Close
    Set oRS2 = Nothing
    Set oRS = Nothing
    Set oConn = Nothing
%>
```

Recipient Toolbar

Referring to FIG. 19, the Recipient Toolbar 120, includes icons to Search 122, Send To Printer 124, Goto This Page 126, and GoTo This Site 128, which initiate functions similar to those functions provided by the Window Toolbar 36, to allow the User to search the World Wide Web for content related to the content in the Recipient Window 118, to print the Recipient Window, or to open another browser window with either the source web page containing the content item or the web site of the domain of the source web page. The Recipient Toolbar also preferably includes a refresh icon (not shown) to reload the window.

Importantly, the Window Definition preferably passes the Keywords to the Recipient Window 118 such that the Keywords follow the custom selection and such that the Recipient can use the Keywords to search for related content. The Search 122 function of the Recipient Toolbar 36 preferably invokes a search command similar to that of the Window Toolbar 36. In particular, the search command may be "http://www.google.com/search?q=Keyword1%20Keyword2."
Thus, the creator of the original Custom Selection Window can provide important targeted Keywords for the Recipient to use in performing searches of the World Wide Web for related content items.

Portability

The system of the present invention is preferably compatible with several different computing platforms, such as Microsoft Windows-based and Apple computers, internet appliances, personal digital assistants (PDAs, such as the Palm Pilot, and the like), and other computing platforms, such that custom selections can be shared among various computing devices. Further, certain items of User-defined attribute information, such as the User's MRU List, Favorites and the Recipients List, are preferably portable amongst various computing devices of the User. The software accomplishes this function by transmitting the attribute information to the Server and storing the information along with the unique User Identifier. The User's attribute information is preferably retrieved using the User Identifier when the User first launches the browser. Thus, the system provides a consistent and familiar experience regardless of which computing device the User chooses.

Tracking

The system also provides a highly accurate and flexible means to track content viewed and shared by Users and Recipients. The Server is contacted whenever a custom selection is saved, or sent to or chosen from the Favorites List, when a custom selection is sent to a Recipient using an electronic message, and when a Recipient views a received custom selection. During each of these actions, the custom selection is uniquely identified to the Server by the Window Identifier, which Server contains the Definition of the custom selection. Therefore, in the case of custom selections of a User's Favorites List, the system can track and compile statistics regarding what content items have been selected, what content items are selected in the same window, the number of times a selected item (or group of items) is viewed, and the frequency of viewing. Such statistics can be compiled along with the unique User Identifier to track such information with respect to a particular User, or can be compiled "blind" without regard to a particular User. Importantly, this tracking can be accomplished whether the two images are on the same site or different sites.

For custom selections shared with others, the system can also track and compile statistics on what content items (or groups) are shared with others (and by whom), the number of times a Recipient views a selection, the frequency of viewing, and the chosen method of messaging. As an example, the system can track statistics regarding a User viewing (and likely comparing) images of two products side-by-side in a custom selection, and can track statistics about any sharing of that custom selection. As a further example, the system can track viewing and sharing activities of diverse custom selections containing two or more content items from different network domains (e.g., different web retailers) and can track such activity according to groups or sets of network domain, such as diverse custom selections containing content items from a network domain of web retailer A and from a network domain of web retailer B.

Further, the system does not rely on pre-placed tracking devices, such as "cookies" or "web bugs." The tracking capability of the present invention is based on the content items themselves, in their unaltered format. Moreover, the tracking capability of the system is highly targeted in that it is able to track viewing and transferring access to specific content items, whereas traditional tracking methods such as cookies and web bugs typically only track views of entire web pages. Further, since communication with the Server is required for certain actions, such as saving, saving and retrieving, the tracking capabilities of the system cannot be circumvented. Therefore, the system provides a very reliable, highly targeted and flexible tracking system.

It can be appreciated that the system provides a convenient method for a User to create, view, modify, print and save custom groupings of image and text content items available on web pages and other sources, to search for other related content, and to transfer access to such selections with others, which method is effected in a manner which avoids the limitations of electronic communications methods, which reduces the time and bandwidth required to share the custom groupings via electronic messages, and which provides for highly accurate and flexible tracking of such content viewing and sharing.

Create Link

Figure 20:
FIG. 20 is an image of a Custom Selection Window showing the Create Link Window Toolbar menu item.
Figure 21:
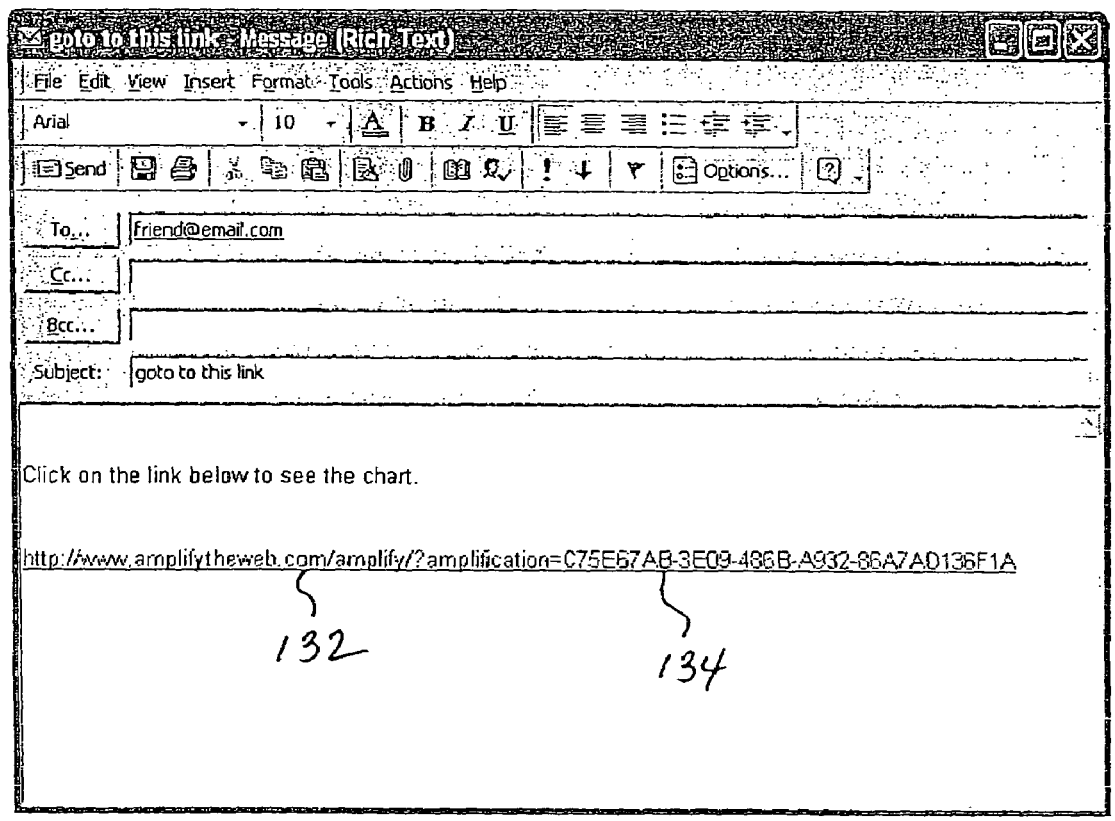
FIG. 21 is an image of an electronic messaging application message containing a Link to a Custom Selection Window.

Referring to FIGS. 20 and 21, the Window Toolbar 36 of the Custom Selection Window 34 preferably includes a Link Creation 130 icon (depicted in the drawing as "Copy Link") which, when selected, loads or copies a hypertext Link 132 for the associated Custom Selection Window into the "Clipboard" memory or other similar user-accessible memory of the computing device. As discussed above, the hypertext Link 132 for the Custom Selection Window is preferably in the form of a complete uniform resource locator (url) leading to the Server and includes a unique Window Identifier 134 assigned to the particular Custom Selection Window. In the example depicted in FIG. 21, the Window Identifier is located in a query string, specifically after string "?amplification=", however the Window Identifier may be located in another portion of the query string.

Since the hypertext Link 132 is loaded or copied to the Clipboard memory, the User can easily and conveniently "paste" the Link 132 in an otherwise familiar manner into other documents or windows, such as the body of an electronic mail message, a word processing document, an instant message or any other location where information present in Clipboard memory may be pasted. Then that document or message may be transmitted to others (or may be saved) for sharing access to the Custom Selection Window, or for other purposes.

An example of a portion of code suitable for this feature is as follows:
Clipboard.SetText AMPLIFY_URL_VIEW+Mid$(oAmplification.GUID,
>2,_Len(oAmplification.GUID)−2)

The Link Creation 130 icon is preferably operable to initiate the assignment of the Window Identifier. As discussed above, the Window Identifier may also be assigned by the computing device of the User and/or by the Server when the Custom Selection Window is saved for the first time.

System Area Icon

Figure 22:
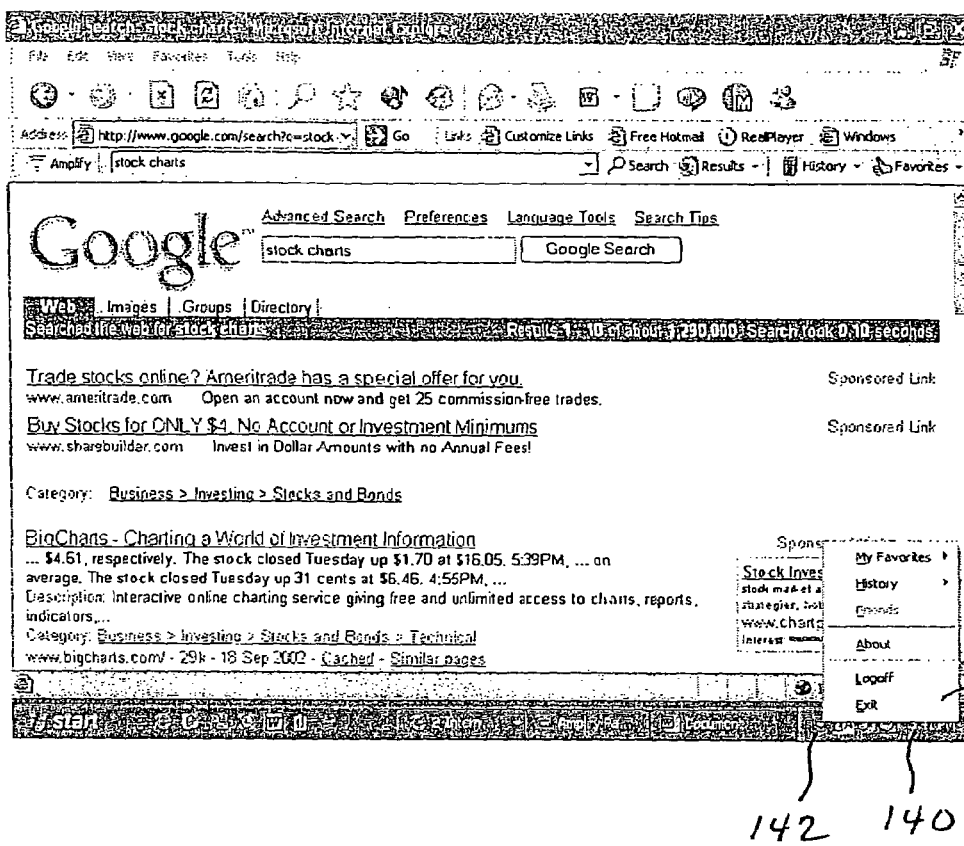
FIG. 22 is an image of a System Area Icon and System Area Menu.

Referring to FIG. 22, the software preferably adds a System Area Icon 140 in a System Area 142 of the user interface (e.g., the "System Tray" in Windows™). The System Area Icon 140 is preferably not dependent upon the presence of a running instance of the browser application and is preferably always present and active. The System Area Icon 140, when selected, provides a System Area Menu 144 providing access to the MRU List (i.e., History) and/or the Friends List. Thus, the System Area Icon 140 provides quick and easy access to these features at all times, irrespective of whether a browser application is running on the computing device of the User at the time.

A portion of code suitable to implement this feature of the invention is as follows:

Shell NotifyIcon NIM_ADD, nidSysTray
   Search Results List

Figure 23:
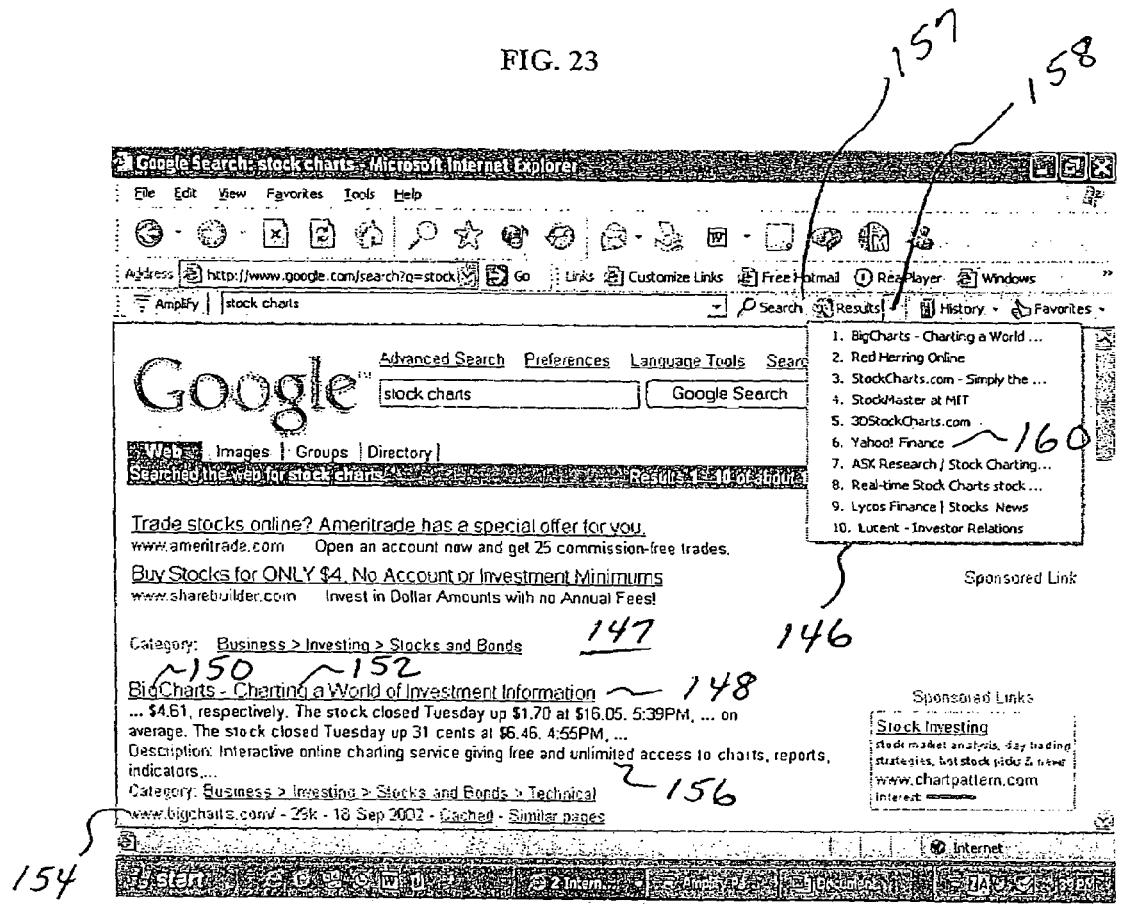
FIG. 23 is an image of a Return To Search Results icon and a condensed Search Results List.

Referring to FIG. 23, another feature of the software provides a Search Results List 146 that displays results of the last search of the Internet or other network sources, for example the results from an Internet search engine. The User may navigate to the results from the Search Results List 146 until the results are overwritten by a successive search, or until the browser from which the search was conducted is closed.

A search of the Internet (or of an intranet or other network or local source) preformed with a search engine or similar means often produces a result that is presented in a predetermined, consistent format on a Search Results Page 147 containing a list of result items or "hits" 148. The individual result items are usually spaced from one another on the page such that each hit is visually distinguishable from the others. The layout of the web page containing the result items is defined by a formatting language, such as Hypertext Markup Language (HTML).

Each result item on a Search Results Page 147 typically includes a Descriptive Hypertext Link 150 comprised of a descriptive text portion 152 displayed in plain English and an underlying raw url (which is hidden from the User). A result item may also include a Raw Hypertext Link 154 comprised of a displayed raw url. There may also be further descriptive text 156 associated with the result item which may be inactive.

As is known, the User can access a resource associated with the result item listed on the Search Results Page 147 by selecting (i.e., clicking on) one of the hypertext links. With prior systems and methods, to access another result item on the Search Results Page 147, the User must then return to the Search Results Page 147 using the "Back" command of the browser. However, this may require several (or many) steps, especially if the User has navigated far from the original Search Results Page 147. Further, in certain situations, the User may be unable to return to the original Search Results Page 147 and may have to perform another search.

The Main Toolbar 10 preferably contains a Return to Search Results icon 157 that reloads the last Search Results Page 147 and a Search Results List icon 158 that produces the condensed Search Results List 146 containing a predetermined number (for example the first 10) of Results Items 160 obtained from a search. The text of the Results Items 160 is preferably obtained only from the displayed descriptive text portion 152 of the associated Descriptive Hypertext Link 150 of the particular search result item. To limit the amount of space required for the Search Results List 146, the number of characters displayed for each Results Item 160 may be limited to a predetermined amount, for example 10 characters. As shown, an ellipsis or other visual indicator can be added to the Results Item 160 when the displayed descriptive text portion 152 is greater than the predetermined number of characters.

The content of the Search Results List 146 preferably remains unchanged until another search is conducted. Thus, after performing a search and navigating to one of the results, the User need not return to the Search Results Page 147 to navigate to other results on the Search Results List 146. Instead, the User may access the Search Results List 146 from the Main Toolbar 10 and select the desired Results Item 160. Alternatively, the User can reload the Search Results Page 147 by selecting the Return To Search Results Page icon 157. It can be appreciated that this provides a significant advantage both in the amount of time required to access different Results Items 154 and the guaranteed ability to select different Results Items 154.

In the formatting code of a typical Search Results Page 147 (i.e., HTML), the results items are separated by and/or enclosed within predetermined anchors or tags. In the example provided in Table V below, the results items are preceded by the paragraph tag "<p>" which is followed by a hypertext reference tag, namely "<a href=". The hypertext reference tag defines the Descriptive Hypertext Link 150, including the descriptive text portion 152 and the underlying raw url. In the example of Table V, the underlying raw url of the first result item is <http://www.bigcharts.com> and the descriptive text portion 152 is "BigCharts—Charting a World of Investment Information".

TABLE V

```
<
<p><a href=http://www.bigcharts.com/>BigCharts - Charting a World of Investment
Information</a><br><font size=-1> <b> . . . </b> edged up 0.2 percent. Volume amounted to 1.77 billion
on the NYSE and<br>
to 1.78 billion on the Nasdaq <b>Stock</b> Market. Market breadth was <b> . . . </b>
<br><span class=f><font size=-1>Description:</font></span> Interactive online charting service giving
free and unlimited access to <b>charts</b>, reports, indicators, . . . <br><span class=f>Category: </span>a
class=fl
href=http://directory.google.com/Top/Business/Investing/Stocks_and_Bonds/Technical/?il=1>Business&
nbsp;> Investing > Stocks and Bonds > 
Technical</a><br><font color=#008000>www.bigcharts.com/ - 29k - 22 Sep 2002 - </font><a class=fl
href=http://216.239.39.100/search?q=cache:X0rgDaCZIpsC:www.bigcharts.com/+stock+charts&hl=en&
ie=UTF-8>Cached</a> - <a class=fl href=/search?hl=en&lr=&ie=UTF-8&oe=UTF-
8&q=related:www.bigcharts.com/>Similar pages</a></font>
<p><a href=http://www.redherring.com/>Red Herring Online</a><br><font size=-1><span
class=f><font size=-1>Description:</font></span> On-line version of professional magazine. News and
reviews focusing on technology, analysis, and research . . . <br><span class=f>Category: </span><a
class=fl href=http://directory.google.com/Top/Computers/Software/Business/E-Commerce/Business-to-
Business/On-Line-
Resources/?il=1>Computers > Software >  . . .  > E-
Commerce > Business-to-Business > On-Line-Resources</a><br><font
color=#008000>www.redherring.com/ - 43k - 22 Sep 2002 - </font><a class=fl
href=http://216.239.39.100/search?q=cache:zvXzurh2cc8C:www.redherring.com/+stock+charts&hl=en&
```

TABLE V-continued ie=UTF-8>Cached</a> - <a class=fl href=/search?hl=en&lr=&ie=UTF-8&oe=UTF-8&q=related:www.redherring.com/>Similar pages</a></font>
>

In the example provided in Table W below, the results items are separated by the anchor or tag "<span class=i>" which is followed by a hypertext reference tag, namely "<a onclick=", that defines the Descriptive Hypertext Link 150, including the descriptive text portion and the underlying raw url. In the example of Table W, the underlying raw url of the first result item is <http://stocks.tradingcharts.com> and the descriptive text portion 152 is "Free stock price charts quotes".

TABLE W

<
<span class=i><a onclick="Co('1')"
href="/r?ck_sm=384408da&ref=20080&uid=37acedd422c60529&r=http%3A%2F%2Fstocks.
tradingcharts.com%2F" onMouseOver="status='http://stocks.tradingcharts.com/'; return
true;">Free <b>stock</b> price <b>charts</b> quotes</a>   <span id="ct1"
class=y></span>
</span><br>
Free <b>stock</b> quotes and <b>charts</b> for nearly every North American exchange. . . . Free
<b>stock</b> price <b>charts</b> <b>stock</b> price quotes The source for free <b>stock</b>
market price quotations <b>charts</b>. We chart thousands of stocks . . . <br>
<span class=x>
stocks.tradingcharts.com/
• <a
href="/sites/search/web?pg=q&stype=stext&q=like:http://stocks.tradingcharts.com/&dq=stock+c
harts" class=x>Related pages</a> 
• <a
href="http://jump.altavista.com/trans.go?urltext=http://stocks.tradingcharts.com/&language=en"
class=x>Translate</a>
<br><a
href="http://jump.altavista.com/more_from_site.go?q&stype=stext&Translate=on&sc=off&q=st
ock+charts&si=16afb37d31cb3a91&kl=XX" class=x>More pages from
stocks.tradingcharts.com</a> 
</span>
<br><br clear=left>
<blockquote>
<span class=i><a
onclick="Co('2')"
href="/r?ck_sm=7a46c44c&ref=20080&uid=6ce68a7a4da1a1d2&r=http%3A%2F%2Fwww.trad
ingcharts.com%2F" onMouseOver="status='http://www.tradingcharts.com/'; return
true;"><b>Charts</b> Quotes From TradingCharts- <b>stock</b> market commodity futures
market quotations plus stocks commodities price <b>charts</b></a>   <span id="ct2"
class=y></span>
</span><br>
The source for free quotes and <b>charts</b> - over 30,000 <b>stock</b> market and
commodity futures . . . Free <b>charts</b> quotations <b>stock</b> market commodity futures
quotes price <b>charts</b> The source for free quotes <b>charts</b> . . . <br>
<span class=x>
www.tradingcharts.com/
• <a
href="/sites/search/web?pg=q&stype=stext&q=like:http://www.tradingcharts.com/&dq=stock+ch
arts" class=x>Related pages</a> 
• <a
href="http://jump.altavista.com/trans.go?urltext=http://www.tradingcharts.com/&language=en"
class=x>Translate</a>
<br><a
href="http://jump.altavista.com/more_from_site.go?q&stype=stext&Translate=on&sc=off&q=st
ock+charts&si=16afb37d31cb3a91&kl=XX" class=x>More pages from
www.tradingcharts.com</a> 
</span>
<br><br clear=left>
</blockquote>
<span class=i><a
onclick="Co('3')"
href="/r?ck_sm=8e6759d8&ref=20080&uid=694a35a5259ee060&r=http%3A%2F%2Fbigcharts.
marketwatch.com%2F" onMouseOver="status='http://bigcharts.marketwatch.com/'; return
true;">BigCharts - Charting a World of Investment Information</a>   <span id="ct3"
class=y></span>
</span><br>
Symbol/Keywords: Find Symbol New! --> major market indexes Sponsored By:<br>
<span class=x>
bigcharts.marketwatch.com/
• <a
href="/sites/search/web?pg=q&stype=stext&q=like:http://bigcharts.marketwatch.com/&dq=stock
+charts" class=x>Related pages</a>

TABLE W-continued

• <a
href="http://jump.altavista.com/trans.go?urltext=http://bigcharts.marketwatch.com/&language=e
n" class=x>Translate</a>
<br><a
hre="http://jump.altavista.com/more_from_site.go?q&stype=stext&Translate=on&sc=off&q=st
ock+charts&si=22a4278b83111819&kl=XX" class=x>More pages from
bigcharts.marketwatch.com</a> 
</span>
>

To create the Search Results List 146, the software analyzes each page or resource displayed within the browser application or other similar application of the computing device of the User, preferably when the page has completed loading, and compares the current page to a predetermined set of known search result pages. In particular, the software compares the first portion of the location of the current page or resource (i.e., the url), such as the domain and certain further arguments or strings, to a predetermined list of resource locations of known search results sources. For example, the first portion of a url for a search result page returned by the "google.com" Internet search engine is known to be <http://www.google.com/search?> and a similar first portion of the url for the "Alta Vista" search engine is <http://www.altavista.com/sites/search/web?>.

If the software determines the current page to be one of a known type of search results source, the software scans through the source code of the page to determine the results items displayed on the page. It can be appreciated that upon detection of a search result page, the format of that page is also determined. Therefore, the scan of the source code is conducted according to the known format of the detected search results page.

The software scans the source code of a detected search result page for an indicator of a results item such as a predetermined combination of tags. Specifically, the software scans the source code for the first occurrence of a predetermined separator tag, such as a text formatting tag, where the next tag (i.e., the first child tag) is a resource reference tag, such as a hypertext reference tag. For example, for the source code set forth in Table V, the software scans the code for the first instance of the "<p>" tag where the next tag is the "<a href=" tag. For the source code set forth in Table W, the software scans for the first instance of the "<span class=i>" tag where the next tag is the "<a onclick=" tag.

Upon detection of an occurrence of the predetermined combination of tags, the software parses the resource information of the associated resource reference tag to determine the descriptive text portion and the underlying resource location (url) for the resource. The descriptive text portion of the resource reference tag is added to the Search Results List 146 and the resource location is stored in memory of the computing device and associated with the item added to the Search Results List 146. This process is repeated until the Search Results List 146 is filled with a predetermined number of results items, for example 10, or until the software scans through the entire page.

Compose Message

Figure 24:
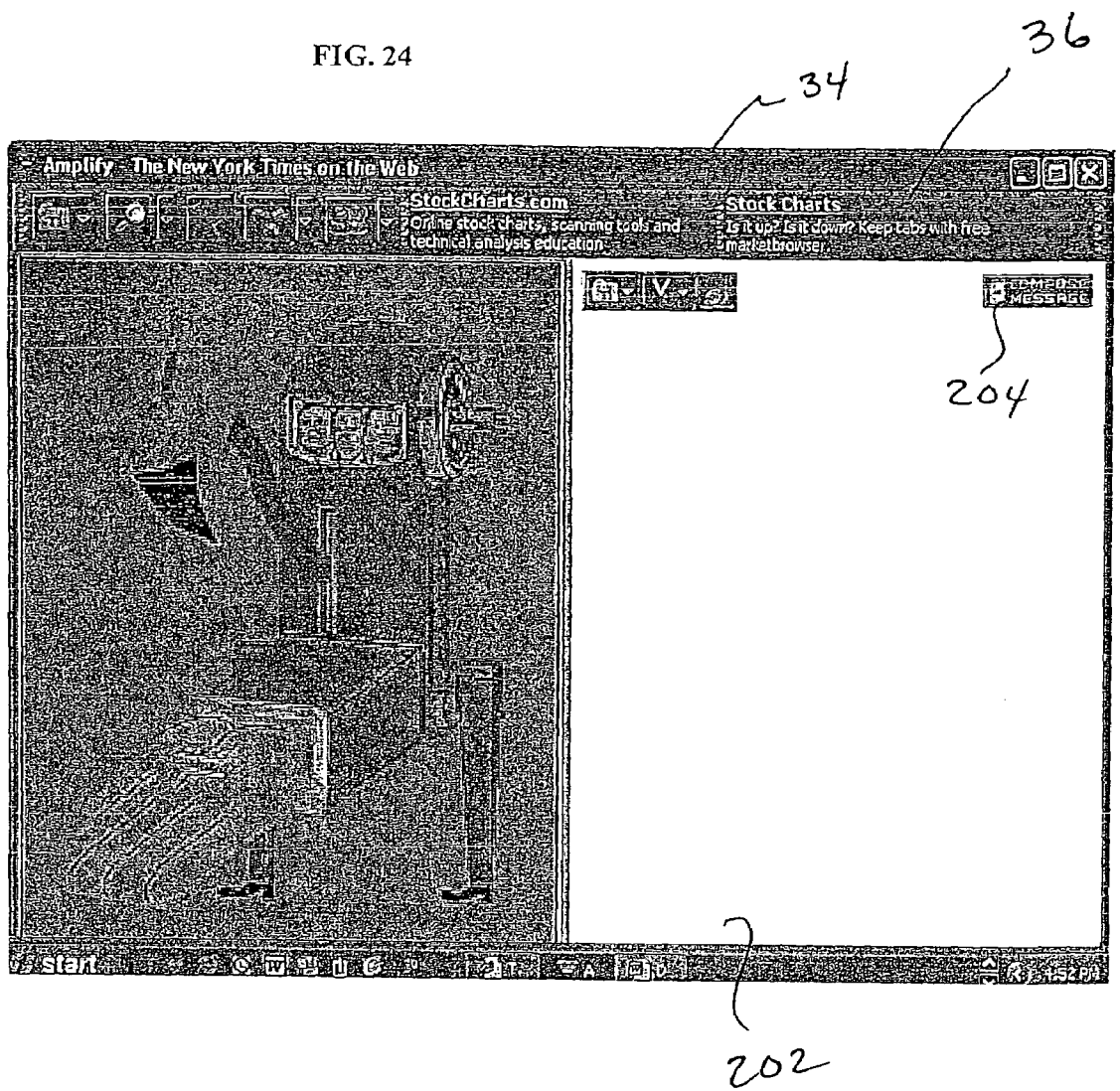
FIG. 24 is an image of a Custom Selection Window with a frame showing the Compose Message icon.
Figure 25:
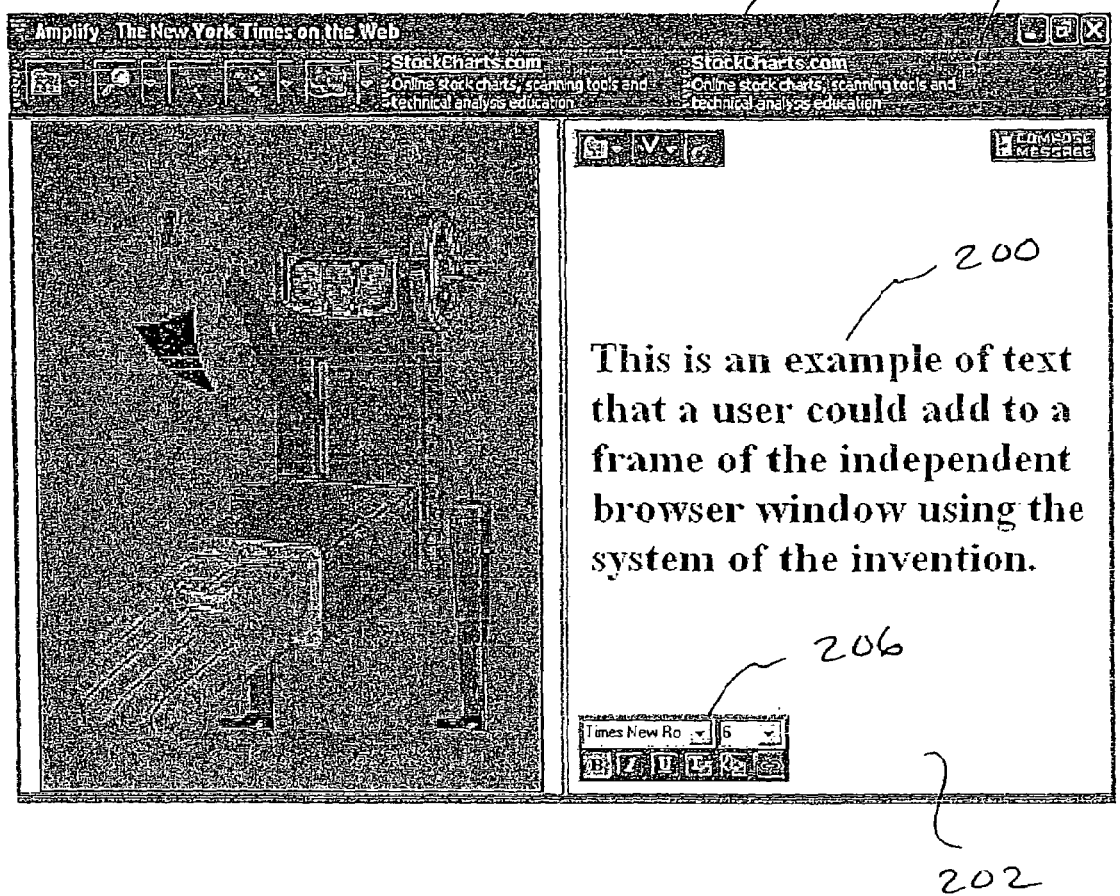
FIG. 25 is an image of the Custom Selection Window of FIG. 24 showing text input by a user within the frame.

Referring to FIGS. 24 and 25, the system also provides a means for a user to add a Text Message 200 to a frame 202 of a Custom Selection Window 34. To enter a Text Message 200, the User may first create a new frame 202 as described above and then select a Compose Message icon 204 displayed within or otherwise associated with the frame 202. Then, the User inputs the message preferably by typing the message on a keyboard of the User's computing device.

Preferably, the system provides a means to select various fonts and pitch sizes for the Text Message 200, such as via a Typeface Selection pop-up 206 depicted within the frame.

The system adds the Text Message 200, along with the typeface instructions, to the code for the frame 202 of the Custom Selection Window 34, preferably in HTML format, or another suitable format. Thus, the Text Message 200 will travel with the Custom Selection Window 34 when it is saved, recalled, transmitted or received, as described above.

Figure 26:
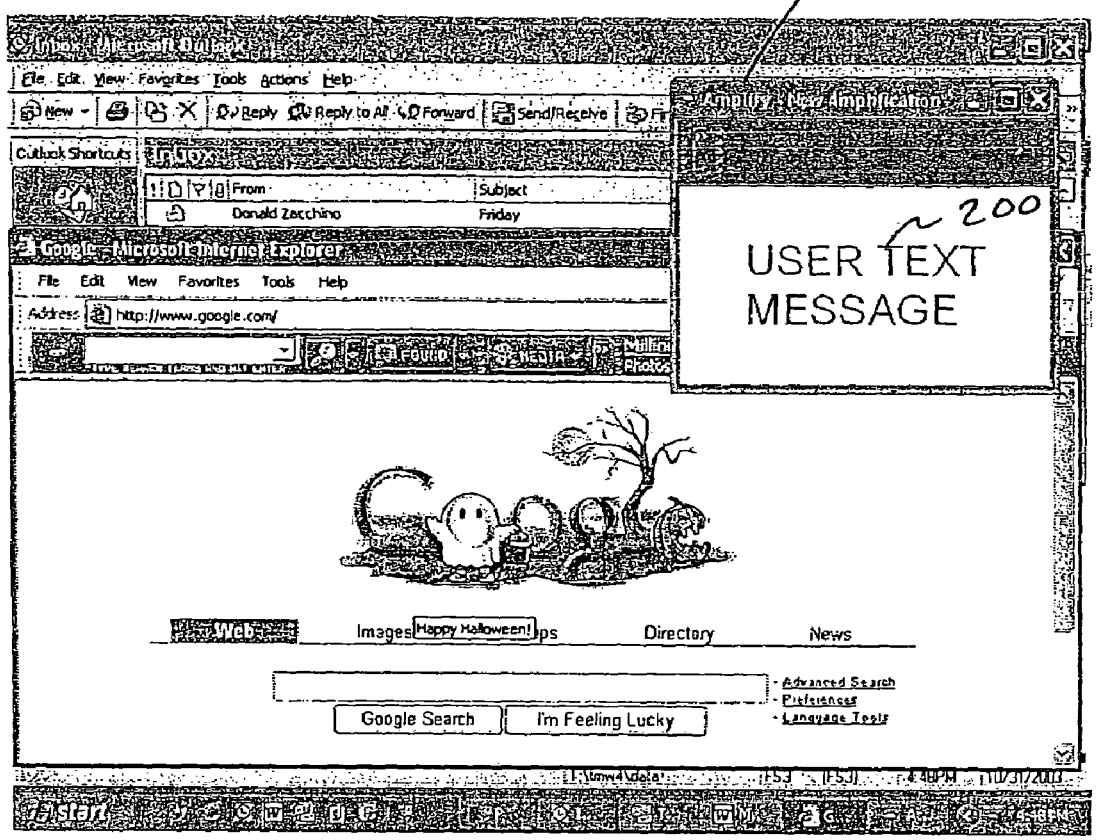
FIG. 26 is an image of a Text Message within a Custom Selection Window which is always on top of other windows.

Referring to FIG. 26, it is expected that a User would usually populate a Custom Selection Window 34 with at least one content item before adding a text message. However, a User may create a Text Message 200 in a Custom Selection Window 34 having only one area or frame, or as the first created frame.

To create such a Custom Selection Window 34, the User selects a "New Amplification" menu item provided by the software, which creates a blank or empty Custom Selection Window 34. Then, the User may add a Text Message 200 to the Window 34, as discussed above.

To enhance the visibility or appearance of the Text Message 200, the system enables the User to select from various background colors and text colors from a Tools menu icon that appears within the frame when the User directs a pointing device over the frame. Further, as discussed previously, the system provides a menu to always display the Custom Selection Window 34 on top of all other windows, regardless of which window is currently active. Thus, the Compose Message feature of the invention provides a convenient method to place notes on the desktop of the computing device of the User and to save and share such notes with others.

An example of the code for this feature is set forth in Table X.

TABLE X

```
' Private Sub EditToolbar_LockEdit( )
' Parameters:
'     None
Private Sub EditToolbar_LockEdit( )
   ' If there is no active frame, then cancel
   If oEditFrame Is Nothing Then
      Exit Sub
   End If
   Dim spnEdit As MSHTML.HTMLSpanElement
   ' get a reference to the object which facilitates editing
   Set spnEdit =
oDocument.frames(oEditFrame.Id).Document.getElementById("spnText")
   ' clear any selections
   oDocument.frames(oEditFrame.Id).Document.selection.empty
   ' hide the font toolbar
   HideFontToolbar True
   ' disabled editing
   If Not spnEdit Is Nothing Then
      spnEdit.contentEditable = "false"
```

TABLE X-continued

```
    End If
    Set spnEdit = Nothing
    Set oEditFrame = Nothing
End Sub
' Private Sub EditToolbar_UnLockEdit( )
' Parameters:
'     None
Private Sub EditToolbar_UnLockEdit( )
    ' if there is content waiting to be placed in a frame, then cancel
    If bItem Waiting Then
        Exit Sub
    End If
    ' if there is a frame currently being edited, then lock it before proceding
    If Not oEditFrame Is Nothing Then
        Call EditToolbar_LockEdit
    End If
    Dim spnEdit As MSHTML.HTMLSpanElement
    ' setup the frame for editing
    If xmlAmplification.selectSingleNode("amplification/frames/
frame[@id = "' +
EditToolbar.ActiveFrame.Id +"']") Is Nothing Then
        Dim xmlTxtRange As New MSXML.DOMDocument
        xmlTxtRange.async = False
        LoadResXML xmlTxtRange, "amplifytxtrange.xml"
        xmlTxtRange.selectSingleNode("frame/@id").Text =
EditToolbar.ActiveFrame.Id
        AddItem_Callback
oDocument.frames(EditToolbar.ActiveFrame.Id).Document.parentWindow,
xmlTxtRange.documentElement
        Set xmlTxtRange = Nothing
    End If
    DoEvents
    ' get a reference to the object which facilitates editing
    Set spnEdit =
oDocument.frames(EditToolbar.ActiveFrame.Id).Document.getElementById("spnText")
    ' enable editing
    spnEdit.contentEditable = "true"
    ' show the font toolbar
    ShowFontToolbar EditToolbar.ActiveFrame
    ' set a reference to the frame being edited
    Set oEditFrame = EditToolbar.ActiveFrame
    ' set focus to the edit frame
    Call spnEdit.focus
    Set spnEdit = Nothing
End Sub
```

Targeted Advertisements

The system also provides the ability to display targeted advertisements in the Main Toolbar 10 of the browser application 12 and, optionally in the Window Toolbar 36 of the Custom Selection Window 34.

Targeting information may be obtained by the software from one or more of the following: the second-level domain of one of the content items displayed in a Custom Selection Window 34 or main browser window, the Keywords associated with a Custom Selection Window 34, the text contained in a text message created by the User via the Compose Message feature, or the text contained in a selected content item in the Custom Selection Window 34.

Advertisements are contained in a database on a server and the advertisements are associated with predetermined targeting information. Targeting information is obtained from the computing device of the User and transmitted to a server which determines an appropriate associated advertisement using the predetermined associations between the targeting information and the advertisements. The associated advertisement is then transmitted to the User and displayed on the User's computing device.

Each advertisement is preferably associated with a plurality of targeting information items. For example, Advertisement 1 could be associated with Keyword 1, Keyword 2 and Keyword 3. Further, each association between an advertisement and a targeting information item is given a weight. For example, the associations between Advertisement 1 and Keyword 1, Keyword 2 and Keyword 3 may be given weights of 15, 10 and 50, respectively. Thus, the associations and weightings may be as follows:

Advertisement 1, Keyword 1, weight 15
Advertisement 1, Keyword 2, weight 10
Advertisement 1, Keyword 3, weight 50

Other associations and weights may be as follows:

Advertisement 2, Domain 1, weight 50
Advertisement 2, Keyword 4, weight 25
Advertisement 3, Domain 2, weight 25
Advertisement 3, Keyword 1, weight 50
Advertisement 4, Keyword 5, weight 10
Advertisement 4, Domain 3, weight 20

To select an advertisement to display, the system first determines a set of associated advertisements, which are advertisements that are associated with the targeting information obtained from the user computing device. This is done by comparing the keywords, domains and text with the predetermined targeting information associated with the advertisements.

For example, in the example above, if the targeting information consisted of Keyword 1, Keyword 2 and Domain 1, then Advertisement 1, Advertisement 2 and Advertisement 3 would be selected from the pool of advertisements.

Next, the relative weight of each advertisement is determined by summing the weights of each association made for the advertisement.

In the present example, Advertisement 1 would have a weight of 25 (i.e., 15+10), Advertisement 2 and Advertisement 3 would each have a weight of 50.

Next, the advertisement to be displayed is selected from the associated advertisement by weighted random selection, where the relative weight of each advertisement is determined by the association weights as described above.

Where in the present example Advertisement 1, Advertisement 2 and Advertisement 3 have weights of 25, 50 and 50, the random selection is weighted 20% for Advertisement 1, and 40% for each of Advertisement 2 and Advertisement 3.

One method to perform the weighted random selection is to determine a random number selection range, for example from 1 to the sum of the relative weights of the associated advertisements. In the present example, the random number selection range would be from 1 to 125. Then, each advertisement is assigned a range of numbers within that random number selection range proportional to the relative weight of the advertisement. In the present example, Advertisement 1 would be associated with 1 through 25, Advertisement 2 with 26 through 75 and Advertisement 3 with 76 through 125.

Next, a random number is chosen from the random number selection range. The advertisement to which the selected random number applies is displayed in the appropriate location.

As can be appreciated, the present method of displaying advertisements provides for a high level of control over the selection of advertisements while providing a desirable degree of variance.

An example of the code for this feature is set forth in Table Y.

TABLE Y

```
ALTER  Procedure banner_que_get_weighted_sp
           @lctn_id int,
           @instance_guid uniqueidentifier = null,
           @window_guid uniqueidentifier = null,
           @keywords varchar(250) = null,
           @domain varchar(250) = null
as
begin
           set nocount on
           -- create temp table to store keywords
           create table #keywords (keyword varchar(50) primary key)
           -- create temp table for storing banner results
           create table #weighted_que (que_id int primary key, weight int)
           -- declare working variables
           declare @sum_weights int
           declare @random_num int
           declare @que_id int
           declare @pos int
           declare @num_chars int
           declare @work_start int
           declare @keyword varchar(50)
           set @pos = 0
           set @num_chars = len(@keywords)
           set @word_start = 0
           -- break apart keywords ( keywords are passed as a comma delimted list,
           -- this will place them in to the temp table as individual records.
           while (@pos <= @num_chars)
           begin
                if (substring(@keywords, @pos, 1) = ',')
                begin
                     set @keyword = ltrim(substring(@keywords, @word_start, @pos - @word_start))
                     if (not exists(select 1 from #keywords where keyword = @keyword))
                         insert into #keywords with (rowlock)
                         values (
                              @keyword
                         )
                     set @word_start = @pos + 1
                end
                else if (@pos = @num_chars)
                begin
                     set @keyword = ltrim(substring(@keywords, @word_start, (@pos - @word_start) + 1))
                     if (not exists(select 1 from #keywords where keyword = @keyword))
                         insert into #keywords with (rowlock)
                         values (
                              @keyword
                         )
                end
                set @pos = @pos + 1
           end
           -- get banners based on keywords and domains, then store them in the temp banner results table
           insert into #weighted_que with (rowlock)
           select
                a.que_id,
                sum(isnull(b.kywd_weight, 0)) + sum(isnull(c.domn_weight, 0))
           from
                banner_que a with (nolock)
                left outer join banner_que_keywords b with (nolock) on
                     b.kywd_que_id = a.que_id and
                     b.kywd_weight > 0 and
                     exists(select 1 from #keywords with (nolock) where keyword = b.kywd_word)
                left outer join banner_que_domains c with (nolock) on
                     c.domn_que_id = a.que_id and
                     c.domn_weight > 0 and
                     c.domn_key = @domain
           where
                a.que_lctn_id = @lctn_id and
                a.que_start_date < CURRENT_TIMESTAMP and
                a.que_end_date > CURRENT_TIMESTAMP and
                a.que_active = 1
           group by
                a.que_id
           -- remove any banners from the temp results table that don't have a weight
           delete from #weighted_que with (rowlock)
           where
                isnull(weight, 0) <= 0
```

TABLE Y-continued

```
    -- if there were no keyword or domain matches then get base weighted banners
    if ((select count(*) from #weighted_que) = 0)
    begin
        insert into #weighted_que with (rowlock)
        select
            a.que_id,
            a.que_weight
        from
            banner_que a with (nolock)
        where
            a.que_lctn_id = @lctn_id and
            a.que_start_date < CURRENT_TIMESTAMP and
            a.que_end_date > CURRENT_TIMESTAMP and
            a.que_active = 1 and
            a.que_weight > 0
    end
    -- Generate Random Number.
    set @random_num = ((select sum(weight) from #weighted_que with (nolock)) * Rand( )) + 1
    -- GET RANDOM WAITED BANNER
    select top 1
        @que_id = b.que_id
    from
        (
        select
            a.que_id,
            (
                select   sum(weight)
                from     #weighted_que c with (nolock)
                where    c.que_id <= a.que_id
            ) weight_sum
        from
            #weighted_que a with (nolock)
        ) b
    where
        b.weight_sum >= @random_num
    order by
        b.weight_sum
    -- Get details of banner for display
    select
        a.que_id,
        b.bnr_id,
        b.bnr_name,
        isnull(b.bnr_img_path, '') bnr_img_path,
        isnull(b.bnr_text_1, '') bnr_text_1,
        b.bnr_text_1_color,
        b.bnr_text_1_bold,
        b.bnr_text_1_italic,
        b.bnr_text_1_font,
        b.bnr_text_1_size,
        b.bnr_text_1_underline,
        isnull(b.bnr_text_2, '') bnr_text_2,
        b.bnr_text_2_color,
        b.bnr_text_2_bold,
        b.bnr_text_2_italic,
        b.bnr_text_2_font,
        b.bnr_text_1_size,
        b.bnr_text_2_underline,
        isnull(b.bnr_alt_text, '') bnr_alt_text,
        a.que_display_time
    from
        banner_que a with (nolock)
            inner join banners b with (nolock) on
            b.bnr_id = a.que_bnr_id
    where
        a.que_id = @que_id
    -- Add 1 to the display count of the banner
    insert into banner_requests with (rowlock)
    values (
        @instance_guid,
        @window_guid,
        @keywords,
        @domain,
        @que_id,
        CURRENT_TIMESTAMP
    )
    declare @que_display_count int
    declare @current_display_count int
    set @que_display_count = (select_que_display_count from banner_que with (nolock) where
que_id = @que_id)
```

TABLE Y-continued

```
        set @current_display_count = (select count(*) from banner_requests with (nolock) where
rqst_que_id = @que_id)
        -- if the banner has hit display limit, then disable the banner for performance reasons
        if (@que_display_count <= @current_display_count) and (not @que_display_count = 0)
        begin
            update banner_que with (rowlock)
            set
                que_active = 0
            where
                que_id = @que_id
        end
        --cleanup temp tables
        drop table #weighted_que
        drop table #keywords
end
```

As can be appreciated, the system and method of the invention provides convenient means to create, view, modify, save and share custom groupings of image and text content items available on web pages and other sources along with text messages composed by the user. The system also allows a user to easily transfer access to the custom grouping to others through various means of electronic communication.

Assisted Content Selection

Figure 27:
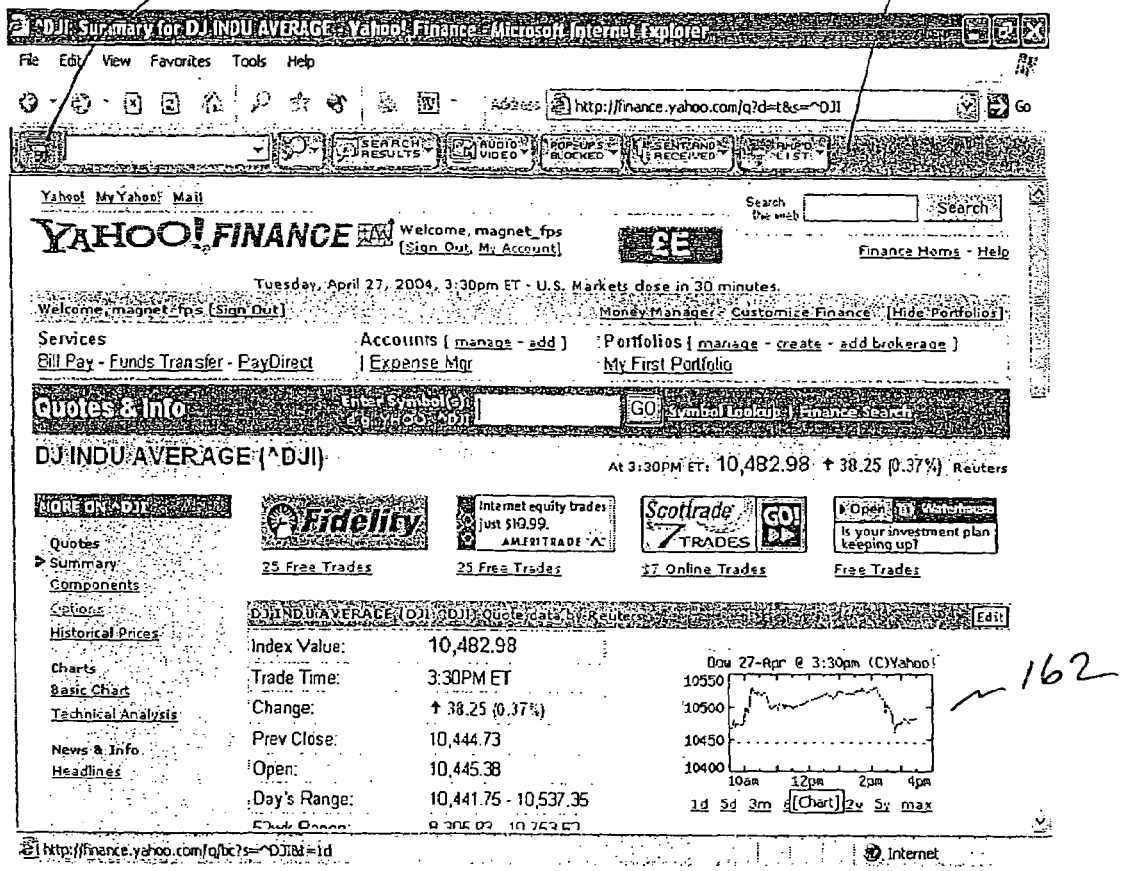
FIG. 27 is an image of an Internet browser application showing a temporary border around a content item.

Referring to FIG. 27, the Assisted Content Selection feature of the system provides the user with a high degree of certainty, control and advance notice of the content items that are to be selected. Preferably, the Assisted Content Selection function may be turned on (or off) by the user with the selection (click) of an activation icon 160 on the Main Toolbar 10.

When the Assisted Content Selection feature is active, a distinctive, temporary (HTML) border 162 appears around any content item 18 over which the point device, such as a mouse is placed (i.e., on a mouseover event). Preferably, the border is dashed and is a visually distinctive color, such as green or yellow. The border lasts only as long as the mouse is over a content item, and disappears when the mouse exits the area of the content item.

Preferably, the borders for different types of content items are visually distinctive from one another. For example, if the content item is an HTML table or a cell in an HTML table, the border may be green, and if the content item is an image item or a text item, etc., the border may be yellow. In this manner, the user can quickly and accurately determine not only which content item will be selected but also the type of content item.

The Assisted Content Selection feature is particularly useful when selecting HTML tables, rows and/or cells, and content items within those cells. A particular content item within a cell may be accurately selected by activating the Assisted Content Selection feature and directing the mouse over the content item until a yellow border appears around the desired content item, at which time the user may select the identified content item with a "right click," as described above or with a "left click."

A right click will produce the standard drop down menu 22 and a Select Content Item Function 20 of FIG. 3 as described above in Selecting Content Items. A left click will bypass the standard drop down menu 22 and Select Content Item Function 20 and will proceed according to the subsequent steps as described above in Selecting Content Items and Inserting Additional Content Items Into a Custom Selection Window.

It should be noted that when the Assisted Content Selection feature is active, a left click on a hypertext item will select the content item and will not activate the hypertext link. In other words, this feature intercepts the user input which would ordinarily activate the hypertext link. When the feature is deactivated, normal hypertext linking is re-established. This can be advantageous when trying to select content items having hypertext links.

Figure 28:
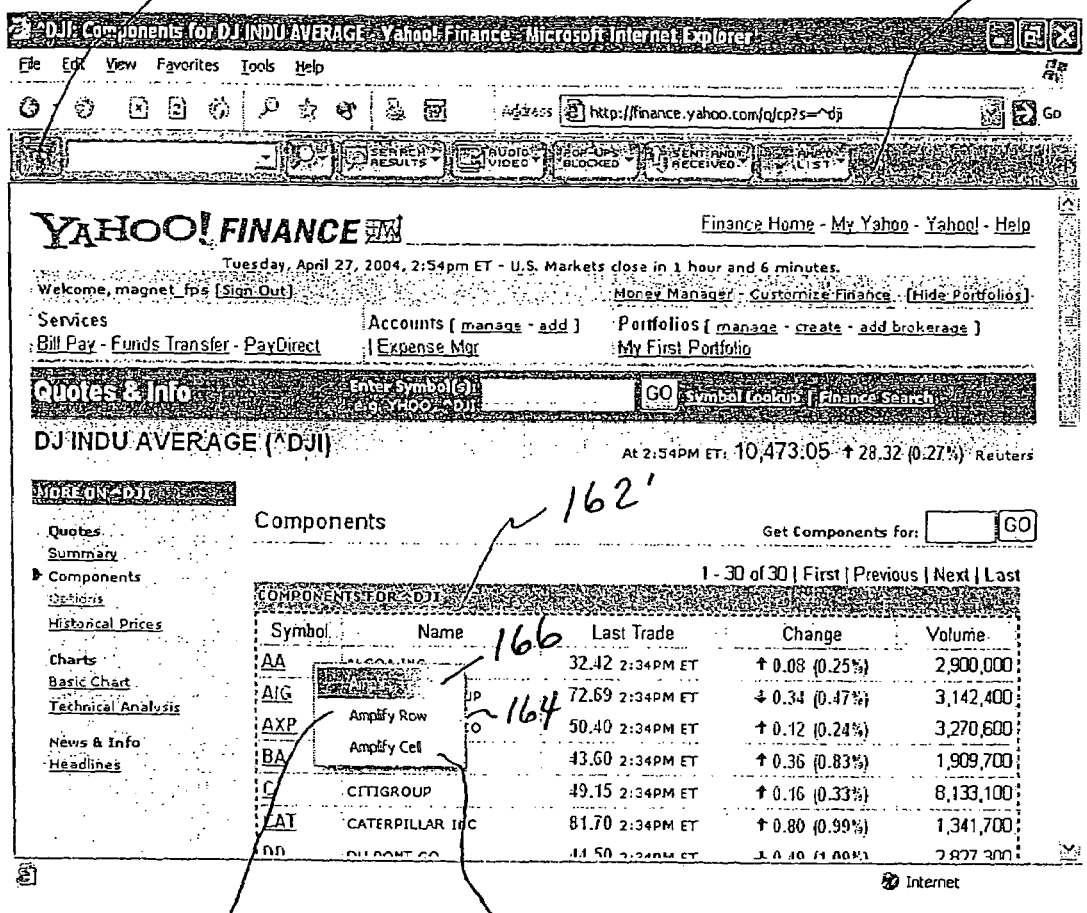
FIG. 28 is an image of an Internet browser application showing a temporary border around an HTML table.
Figure 29:
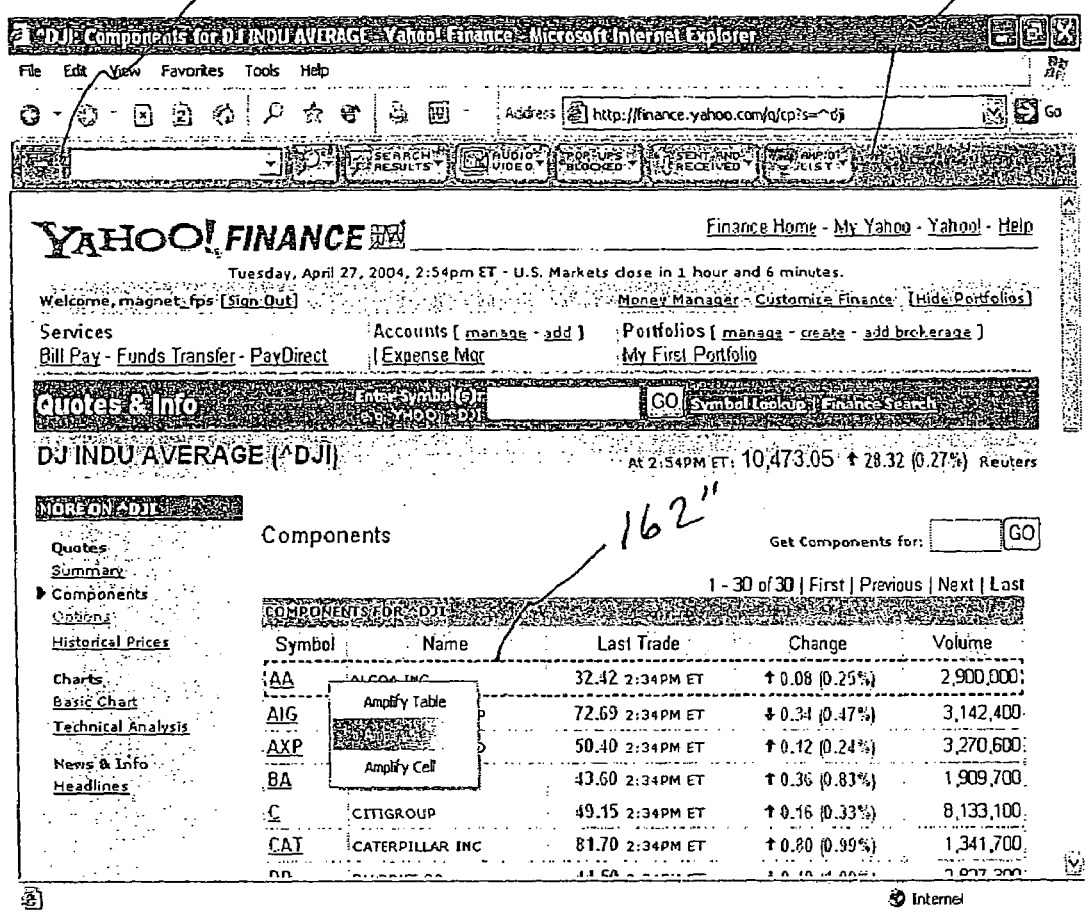
FIG. 29 is an image of an Internet browser application showing a temporary border around a row of an HTML table.
Figure 30:
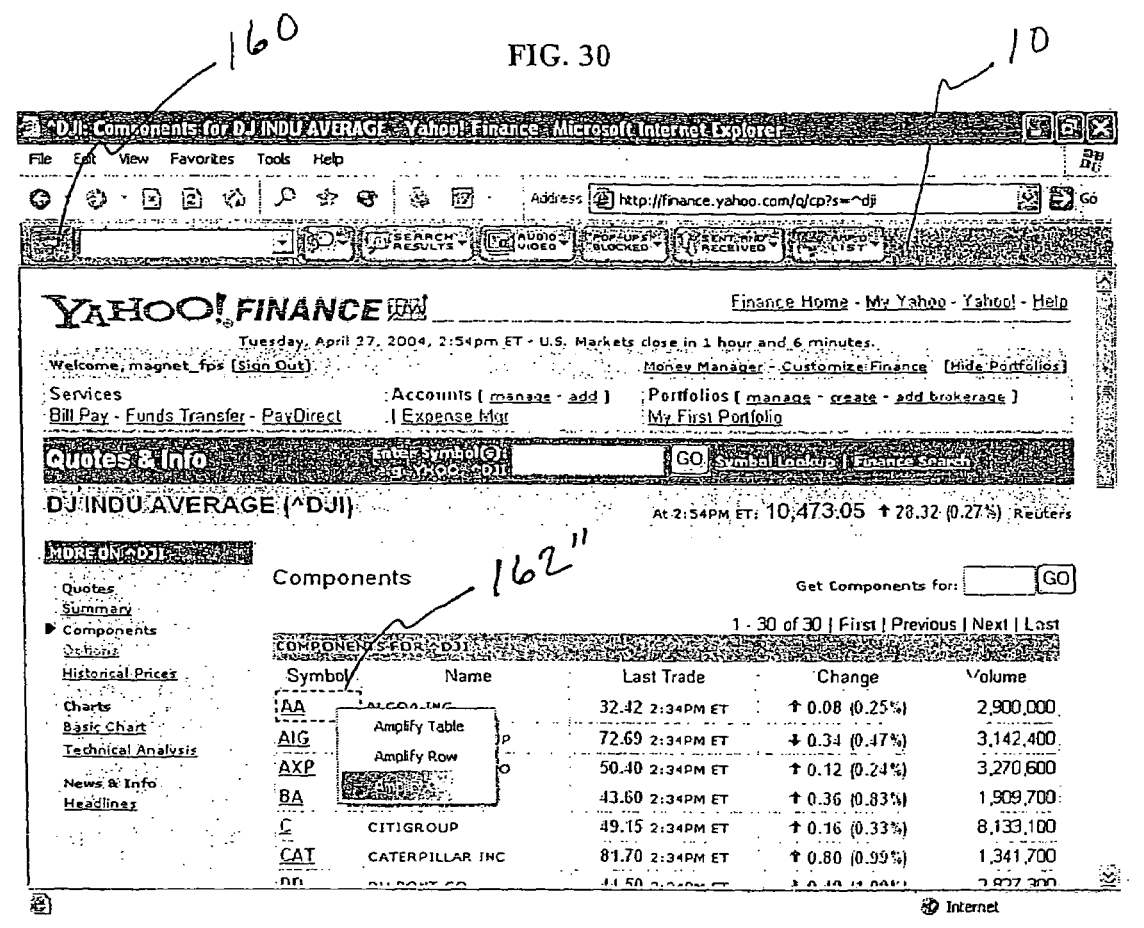

Referring to FIGS. 28-30, a cell in which the content item is located may be selected by directing the mouse into an open region (e.g., white space) of the cell until a green border appears around the cell. The entire table may be selected by directing the mouse to a top portion of the table until a green border appears around the entire table.

Preferably, if the user selects a cell or table content item using the Assisted Content Selection feature, the system prompts the user to select the entire table, the entire row or just the current cell. Preferably, the prompt is in the form of a pop-up menu 164 having menu options for "Amplify Table" 166, "Amplify Row" 168 and "Amplify Cell" 170, or the like. When the user mouses over the "Select Table" menu option, a temporary border 162' is placed around the entire table. Similarly, when the user mouses over the "Select Row" or "Select Cell" menu options, a temporary border 162", 162'" is placed around the entire row or cell, respectively. Thus, the user is provided with a real-time, clear visual representation of the table components to be selected. When the "Select Row" option is chosen, a border is placed around all of the cells of the row such that the border defines a periphery of the row.

Referring to FIG. 31, when the Assisted Content Selection feature is used to select tables and table rows/cells, the formatting of the table rows/cells is preserved and is replicated in the Custom Selection Window. This formatting is maintained because, using this feature, the object defining the selected content item is identified and the properties of the object are used to create an identical or similar object in the Custom Selection Window.

Thus, when a table, row or cell is placed in a Custom Selection Window, the content items within the cells (in addition to the entire table and rows) are also selected and have the same properties as in the original table. For example, the content items have the same formatting and hypertext links as in the original table.

Preferably, the system also provides the ability to choose a number of rows within a table, where such rows may or may not be adjacent to one another. This additional feature is preferably invoked by depressing an alternate function key, such as [ALT] or [CTRL] while right (or left) clicking to select the table row. In this case, the system places a border around the selected row and prepares to accept another row selection. The border around the selected row will remain during and after the selection of the next row such that the user can easily determine the rows that have been selected. The process may be repeated to select multiple rows for placement in a Custom Selection Window. Preferably, the rows are placed in adjacent rows in a table in the Custom Selection Window. However, the properties, such as formatting and hyperlinking, remain unchanged from the original table. A similar method may be used to select multiple cells from one or more tables and/or multiple tables from a source.

An example of code suitable for this feature is set forth in Table Z.

TABLE Z

```
Private Sub oDocument_onreadystatechange( )
    Select Case oDocument.readyState
        Case "complete"
            DocumentComplete
        Case "interactive"
            bDocumentComplete = False
            bDocumentInteractive = True
        Case Else
            bDocumentComplete = False
            bDocumentInteractive = False
    End Select
    ' If the border object hasn't been inserted yet, and the document body exists, insert the border
object
    If Not bHasBorderDiv And Not oDocument.body Is Nothing Then
        bHasBorderDiv = True
        oDocument.body.insertAdjacentHTML "afterBegin", "<div id=""dvAmpBorder""
style=""position:absolute;display:none;border:2px dashed yellow;z-index:999999""></div>"
    End If
End Sub
Private Sub oDocument_onmouseover( )
    If Not bDocumentInteractive Or bAmplifyDialogVisible Then
        Exit Sub
    End If
    Dim oObject As MSHTML.HTMLGenericElement
    Set oObject = oDocument.parentWindow.event.srcElement
    ' If we are not in amplify mode or the border object has not been loaded yet, skip highlight
    If Not frmToolband.AmplifyMode = 1 Or Not bHasBorderDiv Then
        GoTo SkipHighlight
    ' If the event object is the current object, then skip highlight
    ElseIf oDocumentWindow.event.srcElement Is oCurrentElement Then
        GoTo SkipHighlight
    ' If the event object is the border object then skip highlight
    ElseIf oDocumentWindow.event.srcElement.id = "dvAmpBorder" Then
        GoTo SkipHighlight
    End If
    ' If we have a current element, then call mouseout on it
    If Not oCurrentElement Is Nothing Then
        Call oCurrentElement_onmouseout
    End If
    ' unsupported objects so skip highlight
    Select Case oObject.tagName
        Case "INPUT", "OBJECT", "EMBED", "APPLET", "AREA"
            GoTo SkipHighlight
    End Select
    ' set a reference to the new object
    Set oCurrentElement = oObject
    ' highlight the new object
    HighlightElement oCurrentElement
Cleanup:
    Set oObject = Nothing
End Sub
Private Sub oDocument_onmouseout( )
    ' if the event's source is the current object
    If oDocumentWindow.event.srcElement Is oCurrentElement Then
        ' if there is a target object
        If Not oDocumentWindow.event.toElement Is Nothing Then
            ' if the target is not the border div
            If Not oDocumentWindow.event.toElement.id = "dvAmpBorder" Then
                Call oCurrentElement_onmouseout
            End If
        Else
            Call oCurrentElement_onmouseout
        End If
    End If
End Sub
Private Sub oCurrentElement_onmouseout( )
    ' if the amplify menu is visible, then quit
    If bAmplifyMenuVisible Then
        Exit Sub
    End If
```

TABLE Z-continued

```
' if the highlighted element is the current element then call mouseout on the highlight element
If oHighlightElement Is oCurrentElement Then
    Call oHighlightElement_onmouseout
End If
bSelectStart = False
oCurrentElement.onclick = Nothing
Set oCurrentElement = Nothing
End Sub
Private Sub oHighlightElement_onmouseout( )
    Dim oBorderDiv As MSHTML.HTMLDivElement
    Set oBorderDiv = oDocument.getElementById("dvAmpBorder")
    oBorderDiv.Style.display = "none"
    oBorderDiv.onclick = Nothing
    Set oHighlightElement = Nothing
End Sub
Private Sub HighlightElement(oElement As MSHTML.HTMLGenericElement)
    On Error GoTo ReportError
    Dim oBorderDiv As MSHTML.HTMLDivElement
    If oHighlightElement Is oElement Then
        GoTo Cleanup
    End If
    If Not oHighlightElement Is Nothing Then
        Call oHighlightElement_onmouseout
    End If
    Set oBorderDiv = oDocument.getElementById("dvAmpBorder")
    Select Case UCase$(oElement.tagName)
        Case "TR"
            oBorderDiv.Style.border = "2px dashed green"
            oBorderDiv.Style.Width = CStr(oElement.offsetWidth + 2) + "px"
            oBorderDiv.Style.Height = CStr(oElement.offsetHeight + 2) + "px"
            oBorderDiv.Style.Left = CStr(GetDocLeft(oElement) - 3) + "px"
            oBorderDiv.Style.Top = CStr(GetDocTop(oElement) - 3) + "px"
        Case "BODY"
            oBorderDiv.Style.border = "2px dashed yellow"
            oBorderDiv.Style.Width = CStr(oElement.clientWidth - 1) + "px"
            oBorderDiv.Style.Height = CStr(oElement.clientHeight - 1) + "px"
            oBorderDiv.Style.Left = "0px"
            oBorderDiv.Style.Top = "0px"
        Case "TABLE", "TD"
            oBorderDiv.Style.border = "2px dashed green"
            oBorderDiv.Style.Width = CStr(oElement.offsetWidth + 2) + "px"
            oBorderDiv.Style.Height = CStr(oElement.offsetHeight + 2) + "px"
            oBorderDiv.Style.Left = CStr(GetDocLeft(oElement) - 3) + "px"
            oBorderDiv.Style.Top = CStr(GetDocTop(oElement) - 3) + "px"
        Case Else
            oBorderDiv.Style.border = "2px dashed yellow"
            oBorderDiv.Style.Width = CStr(oElement.offsetWidth + 2) + "px"
            oBorderDiv.Style.Heigbt = CStr(oElement.offsetHeight + 2) + "px"
            oBorderDiv.Style.Left = CStr(GetDocLeft(oElement) - 3) + "px"
            oBorderDiv.Style.Top = CStr(GetDocTop(oElement) - 3) + "px"
    End Select
    oBorderDiv.Style.display = "block"
    Set oHighlightElement = oElement
Cleanup:
    Exit Sub
ReportError:
    ReportError "HighlightElement( )", Err
    Err.Clear
    GoTo Cleanup
End Sub
```

Referring to Table Z, to create the temporary borders described above, when a web page first loads in the browser application, the program preferably creates a transparent Border Object in the page. The Border Object is preferably created last in the HTML source such that it lies over all other objects of the page. On a mouseover event, the Border Object is relocated to the absolute position of the moused-over content item and is resized such that the border of the Border Object closely surrounds the content item. The border of the Border Object is set to the appropriate color, depending on the type of content item, and the Border Object is unhidden. This creates the border around the content item.

When the mouse exits the content item, the Border Object is hidden once again thereby removing the border. When the mouse then enters a new content item, the process repeats—relocating the Border Object, resizing the Border Object, setting the border attributes (color), and unhiding the Border Object to place a border around the next content item. Since this method of dynamically placing borders around selected content items does not modify the content item, the method does not substantially alter or move the content items of the page as the mouse is moved around the page from item to item and does not substantially decrease the performance of the users computing device.

To enable the user to select a plurality of content items at once, such a number of rows or several tables, the system may create several Border Objects, either upon loading of the page, or as needed, such that temporary borders may be placed around several items simultaneously.

Instead of using a transparent Border Object, the temporary border can be created by modifying a border property of the content item itself to give the content item a border of the appropriate type and color. If the content item already has a border, the original border is stored and replaced by the temporary border on a mouseover event. When the mouse exits, the original border is replaced.

In this alternate method, to create the peripheral border around a row of a table, the system places the border on the left, top and bottom of the left-most cell of the row, on the top and bottom of the intermediate cells, and on the right, top and bottom of the right-most cell. This is effected by stepping through and modifying the properties of the cells from left to right until the right-most cell is reached.

Upon selection of a content item using this method, the entire highlighted content item, as defined by its format language (HTML) tag pair is selected by the system. For example, for a table cell, all of the content between the "<td>" and "</td>" tags is selected by the system; for an entire table, all of the content between the "<table>" and "</table>" tags is selected. No extraneous content outside the tags of the highlighted content item is selected. Therefore, the user is able to accurately and conveniently select a desired content item amongst other non-desired content items.

Dynamic Content Display

The Dynamic Content Display feature of the system provides a means to maintain fresh content in the Custom Selection Window. This is particularly useful when the selected content item is expected to change on a periodic basis. Examples of such changing content items are news headlines and stock quotes, which after a period of time become stale.

Typically, such changing content items are located in a fixed place (e.g., a particular table cell) in a content section (e.g., body) of the same network source (e.g., web page). However, the value of the content item changes periodically. Taking the example of the stock quote, a particular quote may be permanently located in a certain table cell of a certain web page, but the value of the quote is changed every minute. Also, headlines may be permanently located in a certain table, but are updated twice daily.

The Dynamic Content Display feature of the system identifies the location of the selected content within the network source such that the system can re-locate, retrieve and display the updated content item in the Custom Selection Window as often as directed. The update is triggered by predetermined events, such as the re-loading of the Custom Selection Window, the refreshing of the Custom Selection Window or the refreshing of a particular frame, or another predetermined event. Refreshing the entire Custom Selection Window or a particular frame can be initiated manually, as described above or can be set to occur automatically via the Auto Refresh feature of the system.

The system creates an Element Address for the content item within the web page by first identifying the object which defines the selected content item (e.g., a table cell), then identifying the parent object of the selected object (e.g., the table), then determining the location of the selected object within the parent object (e.g., cell 0, row 0) and then determining the location of the parent object within the web page (e.g., table 0). Given the (simplified) web page shown in Example 1 below, the selected content item would have an Element Address of: table[0]/tr[0]/td [0].

EXAMPLE 1

```
<!—BEGIN HTML—>
  <html>
  <head></head>
  <body>
  <table>
  <tr>
    <td>This is the td to be amp'd</td>
  <ltr>
  </table>
  </body>
  </html>
<!--END HTML-→
```

Or, given the alternate web page and selected content item shown in Example 2 below, the selected content item would have an Element Address of: table[1]/tr[1]/td[0].

EXAMPLE 2

```
<!—BEGIN HTML—>
  <html>
  <head></head>
  <body>
  <table>
  <tr>
    <td></td>
  </tr>
  </table>
  <table>
  <tr>
    <td></td>
  </tr>
  <tr>
    <td>This is the td to be amp'd</td>
  </tr>
  </table>
  </body>
  </html>
<!—END HTML—>
```

A sample of code suitable to generate the Element Address when selecting a content item is set forth below in Table AA.

TABLE AA

' Set the child element to the current element to begin generating the element address
  Set oChildElement = oCurrentElement
' Get the parent element of the child element
  Set oParentElement = oChildElement.parentElement
' Loop until we get to the body tag

TABLE AA-continued

```
Do While Not oChildElement.tagName = "BODY"
    ' Get a collection of all sibling elements with the same tag name as the child
element
    Set oElements = oParentElement.children.tags(oChildElement.tagName)
    ' Loop through each sibling
    For i = 0 To oElements.length - 1
        ' if the current sibling is the child element we are searching for then
record it's address (tagname[index])
        If oElements(i) Is oChildElement Then
            ' if the parent element is the body tag and the child element's tag
name is div,
            '   then we have to subtract 1 from the index due to the perforated
border element (div) added for the new way of amping
            If oParentElement.tagName = "BODY" And oChildElement.tagName
                    = "DIV" Then
                sPath = oChildElement.tagName + "[" + CStr(i - 1) + "]" + "/" +
sPath
            Else
                sPath = oChildElement.tagName + "[" + CStr(i) + "]" + "/" + sPath
            End If
            ' We found the child element we were looking for so no point in looping
through the rest
            Exit For
        End If
    Next i
    ' Set the child element to the parent element (move up a level in the DOM
heirarchy)
    Set oChildElement = oParentElement
    ' Get the new parent element
    Set oParentElement = oChildElement.parentElement
    ' Start the process over
Loop
```

In the above code, the Child Element is initially set to the Current Element, that is, it is set to the selected content item. The subsequent process is repeated until the entire content section (i.e., Body) of the web page is examined.

First, the Sibling Elements of the Child Element are checked to determine the order of the Child Element amongst its siblings. This is done by comparing each Sibling Element to the Child Element, starting with the first, until a match is found, and counting the iterations. Then this location is recorded by adding it to the beginning of the Element Address (stored as "sPath") by inserting the tagname of the Child Element (e.g., tr) and its sibling order (e.g., [0]) in the leftmost portion of Element Address. Thus, the Element Address is built from right to left. Then, the Child Element and Parent Element are reset to move up one level in the DOM hierarchy. Specifically, the Child Element is reset to the previous Parent Element and the Parent Element is reset to the Parent Element of the new Child Element. Then the process is repeated starting with the step of comparing the Child Element to the Sibling Elements. When the "Body" tag is encountered at the beginning of the content section of the web page, the process ends and the Element Address is complete.

While in the present example the actual tag names and numerical sibling orders are used in the Element Address, it can be appreciated that other information or codes identifying such names and orders would also be suitable.

Upon re-loading or refreshing a content item, the Element Address is used to navigate through the source web page. To begin the process, the system first loads the entire web page into memory, except for images. Then the page is analyzed as described below.

A sample of code suitable to navigate through the web page using the Element Address to locate and load the selected content item is set forth below in Table AB.

TABLE AB

```
' Set the current element to the body tag
Set oElement = WebBrowser.WBCtrl.Document.body
' Loop while the length of the element path (address) is > 0
Do While Len(sPath) > 0
    ' If the element is nothing then there was an error retreiving the page
or the content address is no longer valid
    If oElement Is Nothing Then
        GoTo ContentError
    End If
    ' Disect the first tag name in the path
    j = InStr(1, sPath, "[") - 1
    sTemp = Left$(sPath, j)
    ' Remove the tag name from the path
    sPath = Mid$(sPath, j + 1)
    ' Disect the index of the first element in the path
    j = InStr(1, sPath, "]") - 1
    k = CLng(Mid$(sPath, 2, j - 1))
    ' Remove the index from the path
    sPath = Mid$(sPath, j + 3)
    ' Set the current element to the next element in the address
    Set oElement = oElement.children.tags(CVar(sTemp)).Item(k)
Loop
```

As shown in the above code, initially the Current Element is set to the Body tag. Then, the Element Address is parsed (from right to left) by sequentially stepping through the address setting the Current Element equal to the element identified in each section of the Element Address until the selected content item is reached. This effectively steps downward through the hierarchy of the tags in the page to the selected content item. As shown, this may be done by sequentially removing the leftmost tag and (index) in the Element Address until the Element Address has a length of zero. When the selected content item is reached, the value is extracted and displayed in the Custom Selection Window.

Preferably, the Dynamic Content Display feature of the system works in conjunction with the Assisted Content Selection feature such that the user can accurately and conveniently select desired content items (via Assisted Content Selection) and then maintain the freshness of those content items.

When creating the Element Address, the system may be required to account for the Border Object added to the web page by the Assisted Content Selection feature. Specifically, when the tag name of the Current Element is "div" and the Parent Element is the "Body" tag, then one unit is subtracted from the index to compensate for the presence of the Border Object in the displayed page. This Border Object will not be present in the page when the page is loaded into memory for purposes of navigating to the content item when re-loading or refreshing. Thus, the Border Object is not considered in creating the Element Address.

Auto Refresh

The Auto Refresh feature of the system provides a way for the user to direct the system to automatically refresh the content items in the Custom Selection Window on a periodic basis. Preferably, the Window Toolbar and Frame Toolbar have an icon which when selected produces a pop-up window through which the user may enable or disable the feature and may select the frequency of the refresh (e.g., daily, hourly, every 5 minutes, etc.).

When the Auto Refresh system is enabled, the system uses the system clock and the frequency set by the user to refresh (i.e., re-load) the content items in the Custom Selection Window.

The Auto Refresh feature preferably cooperates with the Dynamic Content Display feature to maintain current values of selected content items in the Custom Selection Window 34.

Height Slider

The system includes a Height Slider 300 which allows the user to adjust the height of the browser window within the Custom Selection Window 34 at any time to create more or less space in which to place content items.

Figure 32:
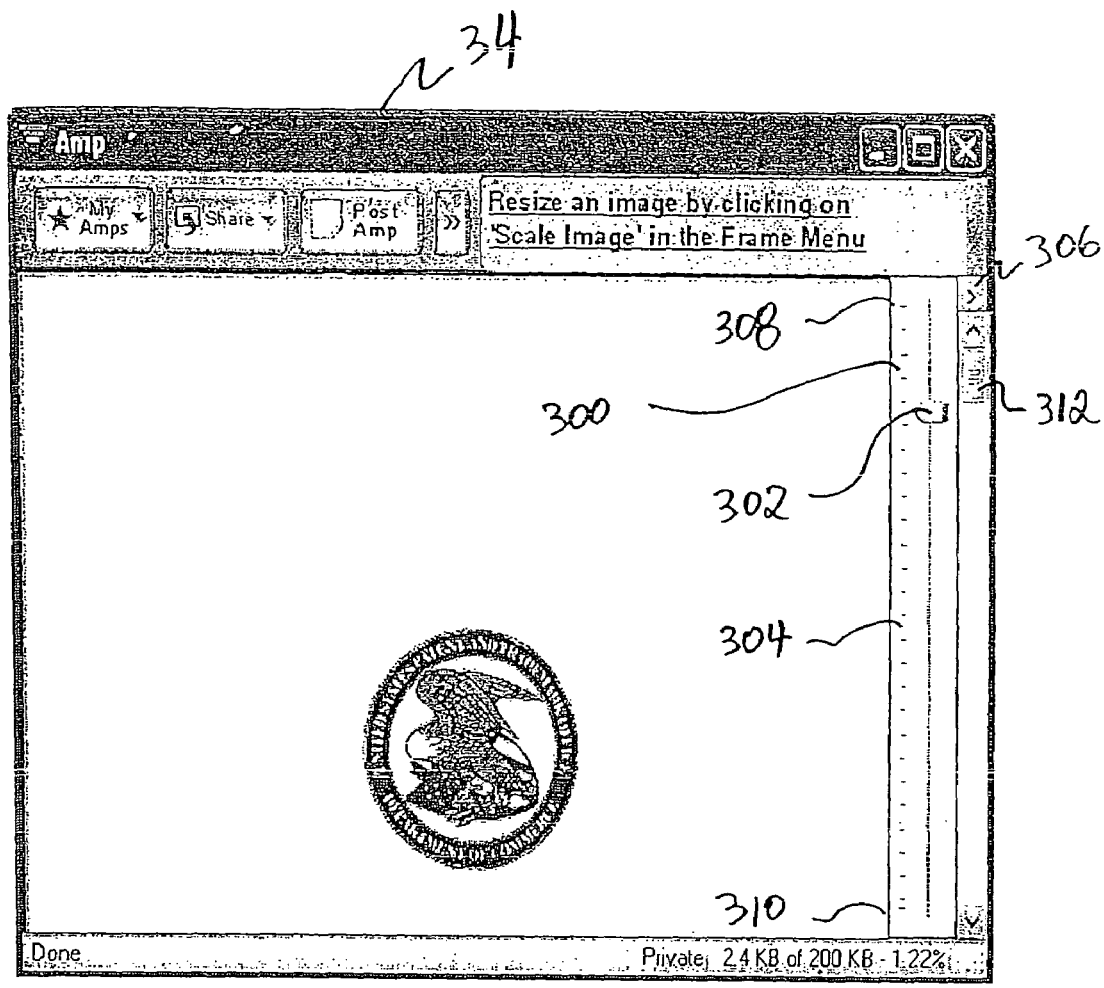
FIG. 32 is an image of a Custom Selection Window showing the Height Slider.

As shown in FIG. 32, the Height Slider 300 is preferably in the form of a slider graphic located along a vertical edge of the Custom Selection Window 34. The Height Slider 300 includes a Slider Button 302 and Gradations 304 along its length.

Moving the Slider Button 302 downward increases the height of the browser window within the Custom Selection Window 34 such that more content items may be added to the Custom Selection Window 34. When the height of the browser within the Custom Selection Window 34 is increased, such that the height of the browser window is greater than the height of the viewable window, a scroll bar button 312 is activated in the Custom Selection Window 34 to permit the user to scroll the visible window up and down through the browser window to view any desired content item. Thus, the user has the ability to adjust the height of the usable space (i.e., the browser window) within the Custom Selection Window 34.

Preferably, the Custom Selection Window 34 includes a Height Slider Activation Icon 306 which alternately hides and displays the Height Slider Button 302 and Gradations 304.

The topmost Gradation 308 in the Height Slider 300 indicates a minimum browser window height, which is equal to the current height of the visible window in the Custom Selection Window 34. The bottommost Gradation 310 indicates a maximum browser window height, which is preferably set to a predetermined multiple (e.g., 2.5 times) of the height of the Custom Selection Window 34.

The maximum value is re-set wherever the height of the Custom Selection Window 34 is adjusted by the user. However, if the current height of the browser window is greater than a re-calculated maximum height, the maximum height is set to the current height of the browser window. The height of the Custom Selection Window 34 and the visible window therein are not changed by the re-setting of the maximum height of the browser window.

The position of the Height Slider Button 302 along the Gradations 304 indicates the current height of the browser window relative to the minimum and the maximum.

Sample code suitable to recalculate the maximum height of the browser window is set forth in Table AC.

TABLE AC

```
This subroutine is called every time the amp window size is changed.
It is used to set the max and current values of the height slider.
Private Sub ResetHeightSlider( )
    ' temp var to hold the max height slider value
    Dim ITemp As Long
    ' determine the viewable height of the browser
    ' if the status bar is visible then account for it
    If StatusBar1.Visible Then
        ITemp = (Me.ScaleHeight – 47) – StatusBar1.Height
    Else
        ITemp = Me.ScaleHeight – 47
    End If
    ' set the max value to 2.5 times the viewable browser height
    ITemp = Round(ITemp * 2.5, 0)
    ' if the current height is greater than the new max height then
    ' set the new max height to the current height
    If WebBrowser1.Height – pcbBrowser.Height > ITemp Then
        ITemp = WebBrowser1.Height – pcbBrowser.Height
    End If
    ' set the max value of the height slider
    HeightSlider.Max = ITemp
    ' set the current value of the height slider
    Height Slider.Value = WebBrowser1.Height – pcbBrowser.Height
End Sub
' This subroutine is called every time the value of the height slider
changes.
' NOTE: The height of the amp window itself does not change during
this event.
Private Sub HeightSlider_Change( )
    ' set the height of the browser equal to the heightslider's value plus
    the viewable height of the browser
    WebBrowser1.Height = HeightSlider.Value + pcbBrowser.Height
End Sub
```

While the above examples have shown that tables and table cells, columns and rows may be selected using the Slide Bar 410, other types of objects, such as static images and dynamic images and other types of objects are also within the scope of the invention. Thus, it can be appreciated that the Enhanced Assisted Content Selection feature of the system provides means to accurately and conveniently select desired content items for placement in Custom Selection Windows.

Enhanced Assisted Content Selection

Referring to FIGS. 33-36, as an alternative to the pop-up menu 164 (shown in FIGS. 28-30), the Assisted Content Selection feature may include a Graphical Interface whereby the User may step up or down in a hierarchy of the current document to select a desired or preferred content item or group of content items.

As described above, this feature is preferably initially activated by selecting an activation icon 160 on the Main Toolbar 10 which produces a temporary HTML border 162 around the content item 18 over which the pointing device is currently located.

A right click, or another suitable predetermined function, produces an Assisted Content Selection Graphic Interface 400 operable to allow the user to step up and down in the hierarchy of the current document.

Figure 33:
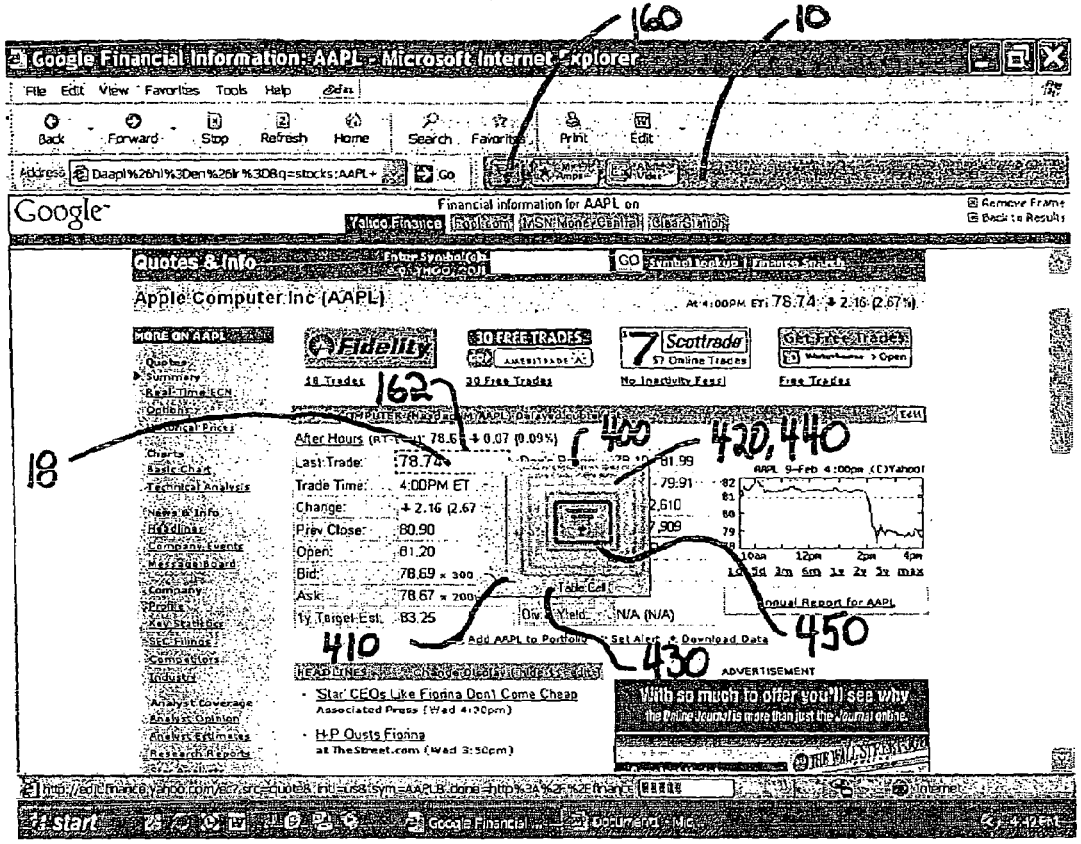
FIGS. 33-36 are images of an Internet browser application showing a Graphic Interface operable to step through a hierarchy of a network source.

As shown in FIG. 33, the Graphic Interface 400 preferably includes a Slide Bar 410 having a predetermined number of discreet positions between a first end position and a second end position, which discreet positions correspond to hierarchical positions in the source code (e.g., HTML) of the document. The Graphic Interface 400 may also include a Hierarchical Graphic 420 comprising a series of Concentric Graphics 440 (such as squares), one of which is highlighted or otherwise altered to indicate the relative hierarchical position of a currently selected content item 18.

In the first instance, an innermost Concentric Graphic 450 is highlighted to indicate the originally selected content item 18, which is preferably the lowermost position in the selectable hierarchy. It can be appreciated, however, that the ability to step downwardly from the originally selected content item 18 is within the scope of the present invention.

Further, the Graphic Interface 400 preferably includes a Text Label 430 which indicates a type of the currently selected content item 18, such as "Table Cell," as shown.

Figure 34:
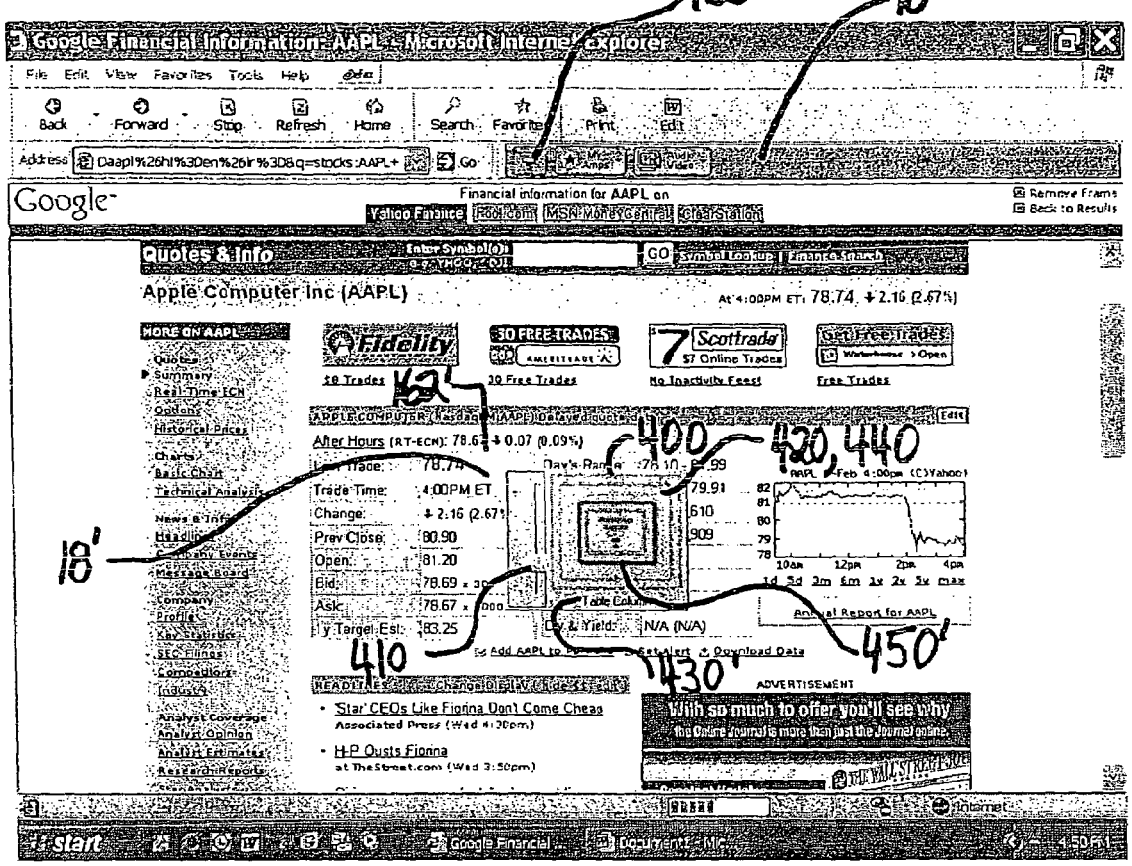

Referring to FIG. 34, when the Slide Bar 410 is moved to a second position, the selected content item 18' moves upwardly in the hierarchy of the document, preferably one step.

If the previously selected content item 18 was a table cell, the system preferably next selects the entire column that comprises the cell as the currently selected content item 18'. Since HTML pages typically do not include column objects or column tags, the system preferably determines the column by analyzing the document. The details of this analysis are set forth below.

Upon movement of the Slide Bar 410 to the second position, a temporary border 162' is placed around the currently selected item 18', such as the column shown. In addition, the Hierarchical Graphic 420 is changed to indicate the relative position of the currently selected content item 18'. Specifically, a second Concentric Graphic 450' is highlighted to indicate one step up from the originally selected content item. As discussed above, if the previously selected content item was a table cell, the next selected content item is preferably the column of the table cell, which may be a "virtual" object defined by the system of the present invention.

Further, the Text Label 430' is preferably altered to indicate the type of the currently selected content item 18', such as "Table Column."

At this point, or any point in the selection process, the user may select the currently selected content item 18' by clicking an area of the Graphic Interface 400 outside the Slide Bar 410 area, such as on the Hierarchical Graphic 420. Doing so initiates the procedure to add the selected content item to a new or existing Custom Selection Window as described above.

Figure 35:
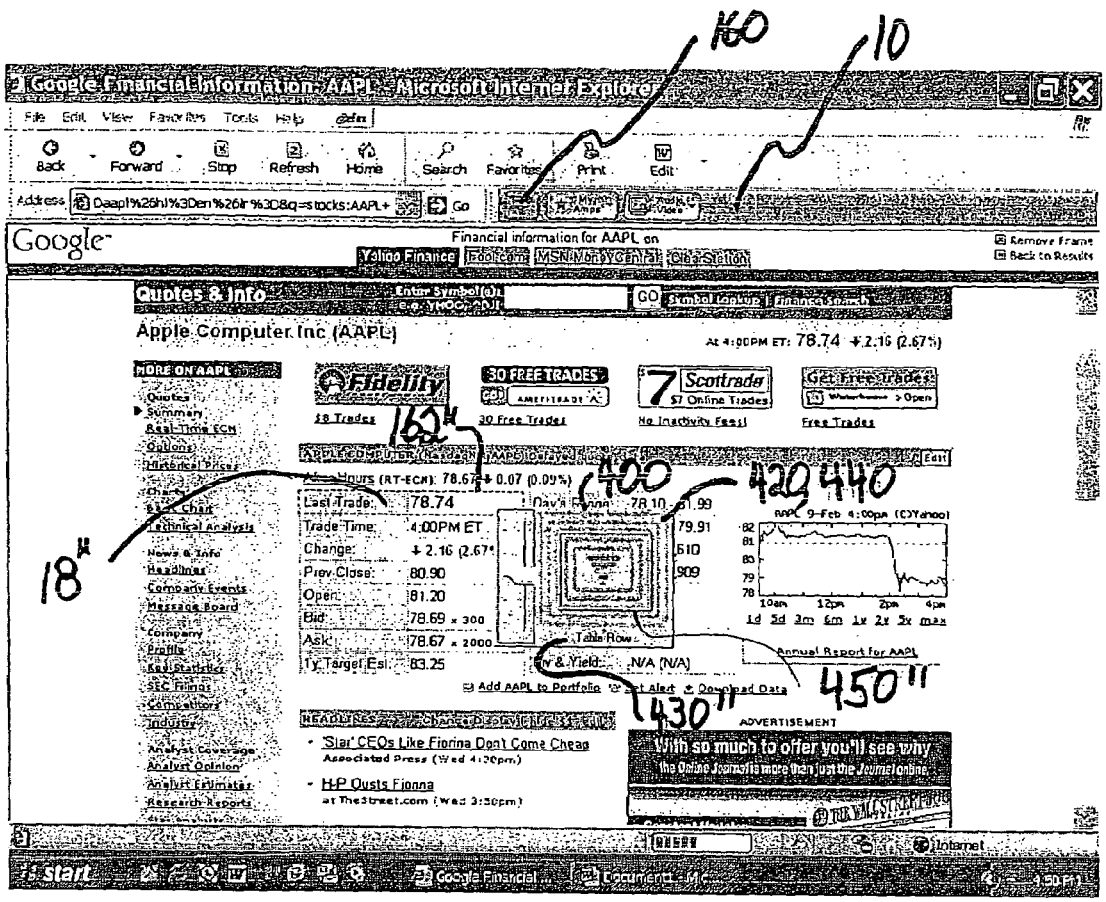
Figure 36:
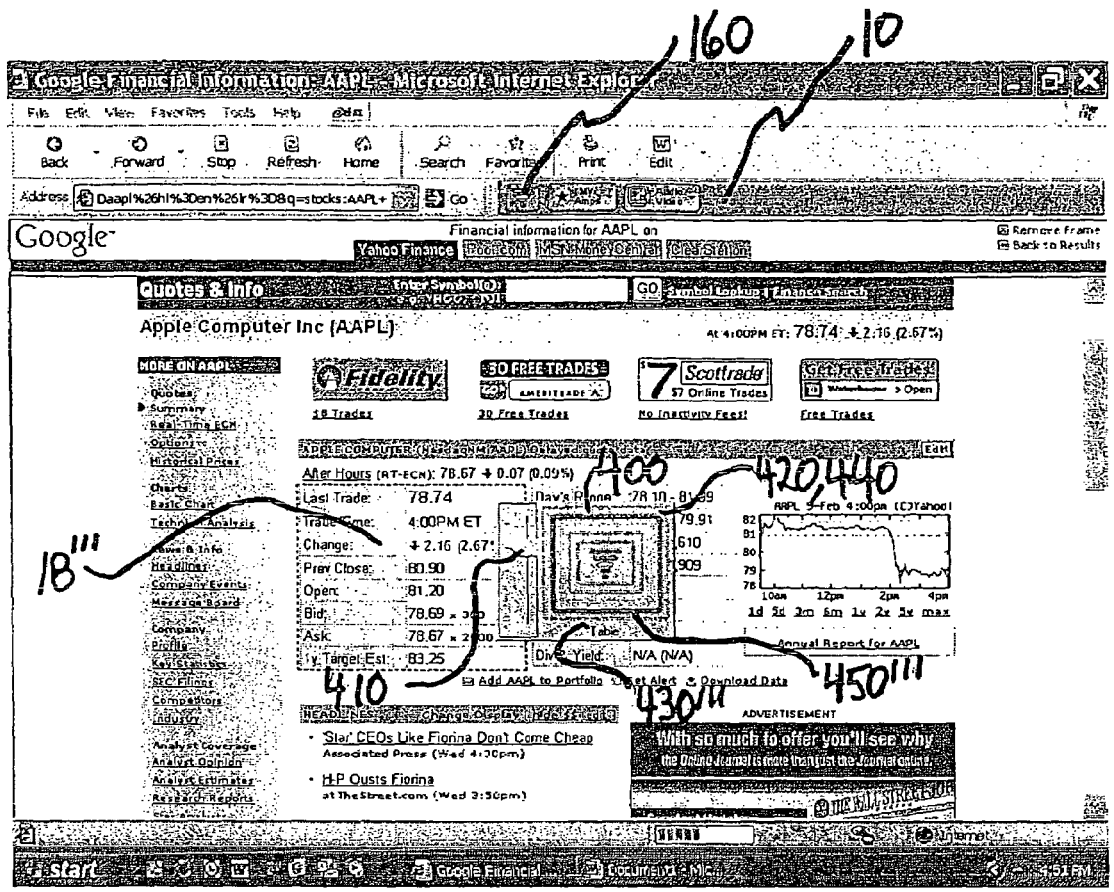

Referring to FIGS. 35 and 36, moving the Slide Bar 410 further upward steps further upward in the document hierarchy. As depicted in FIG. 35, if the previous content item 18' was a table column, the next selected content item 18'' is preferably a row of the originally selected table cell 18. Continuing upward, as in FIG. 36, if the previous content item 18'' was a table row, the next selected content item 18''' is preferably the entire table.

As before, movement of the Slide Bar 410 induces changes in the temporary border 162'', 162''', Concentric Graphics 450'', 450''' and Text Label 430'', 430''' to indicate the identity, position and type of the currently selected content item 18'', 18''', respectively.

Upon activation of the Enhanced Assisted Content Selection feature (e.g., by right clicking on a content item around which a temporary border appears), the system preferably analyzes the document to identify a series of objects within a predetermined number of steps in the document hierarchy from the originally selected content item. Specifically, the system preferably analyzes the document to determine the currently selected content item and the next four objects above the currently selected content item in the document hierarchy. Preferably, the system analyzes the document by inspecting the HTML tags of the objects.

If one of the analyzed objects is a table cell (e.g., TD), the next object is preferably set to be the column which includes the table cell. Further, if one of the objects analyzed has a tag indicating that it is a table body (e.g., TBODY), this object is skipped and the next object is analyzed. During the analysis of the objects in the document, the system stores a tag name of each object. Preferably, the tag name is equal to or derived from the associated HTML tag in the document. If the object is a column, the stored tag is preferably set to "COL" or another suitable distinctive tag.

After the analysis of the document is complete, the system displays the Assisted Content Selection Graphic Interface 400 in which the Slide Bar 410 is in a lowermost position and Hierarchical Graphic 420 is in an innermost position.

Upon movement of the Slide Bar 410 by the User, the system executes a predefined number of steps to step through the objects and the associated stored tags, beginning with the originally selected content item.

If the current step is not beyond a current position of the Slide Bar 410, the stored tag associated with the object of the current step is analyzed. If the current stored tag is equal to "COL," or another predetermined stored tag for columns, a Column Flag is set to True. If the current stored tag is not equal to "COL," or the other predetermined stored tag for columns, the Column Flag is set to False and a parent object is set as the current object. However if this parent object has an HTML tag of "TBODY" the parent of the parent object is selected.

If the current step is associated with (i.e., has reached) the current position of the Slide Bar 410, the associated Concentric Graphic 440 is activated (i.e., turned on). Otherwise, the associated Concentric Graphic 440 is turned off. Then, the next step in the series is executed until the predetermined number of steps have been completed.

Upon the completion of the series of steps, the Text Label 430 associated with the currently selected content item is updated and the temporary border 162 is placed around the item associated with the current position of the Slide Bar 410.

If the currently selected content item is a column, the temporary border is created around the column by selectively activating (i.e., turning on) the borders of certain edges of the table cells that comprise the column. Specifically, the top, right and left edges of the topmost cell are activated, along with the bottom, right and left edges of the bottommost cell, and the left and right edges of any intermediate cells. This is effected by stepping through and modifying the properties of the cells of the column. This provides a contiguous border around the column to visually identify the column to the User.

The content items within each cell of the column are extracted for inclusion in a Custom Selection Window by first determining an index position of a reference cell within the column. This reference cell may be the originally selected content item or a cell selected via the Slide Bar 410. Next, the system steps through each row of the associated table and extracts the content from each cell in the same index position as that of the reference cell. The extracted content may then be placed in a new table (1 column by N rows) in a Custom Selection Window using the method described above for adding content items to a new or existing Custom Selection Window.

Enhanced Dynamic Content Display

Objects in web pages may include an Element ID in the tag associated with the object in the source code of the web page. As an alternative to the Dynamic Content Display feature described above, when creating the Element Address, the system may terminate the creation of the Element Address if an Element ID is found in a superior object in the hierarchical lineage of the selected content item in the source code of the web page. The Element ID is stored in the Element Address and, when the system re-loads the web page and navigates through the web page to refresh the previously selected content, the document object having the stored Element ID is located and used as the reference (i.e., starting) point.

It has been found that the use of an Element ID as a reference point for such navigation (as compared to the "Body" tag) provides a higher degree of accuracy in relocating the previously selected content. This is because, while the hierarchical locations of content items sometimes change with respect to the "Body" tag, such locations seldom change with respect to the closest (hierarchically-superior) Element ID. In addition, the use of Element IDs as reference points often reduces the processing required to create and navigate using Element Addresses.

An example of a web page having two text content items "Text 1" and "Text 2" and having an object, <div>, with an Element ID of "dvContent" is set forth in Table AD below:

TABLE AD

```
<html>
<head>
</head>
<body>
<table>
<tr>
    <td>
        <div id="dvContent">
            <span>
                <span>Text 1</span>
                <span>Text 2</span>
            </span>
        </div>
    </td>
</tr>
</table>
</body>
</html>
```

The Element Addresses for the <table>, <row> and <cell> objects of the web page in Table AD would not include the Element ID because there is no Element ID above such objects in the hierarchy of the page. Instead, the Element Addresses for such objects would be defined (as above) with respect to the "Body" tag. Thus, the Element Addresses for the table, row and cell objects would be TABLE[0], TABLE[0]/TR[0] and TABLE[0]/TR[0]/TD[0], respectively. Therefore, if the content in the entire <table> object was being refreshed, the system would use the "Body" tag of the document as the reference point.

The Element Addresses for the <span> objects of the web page in Table AD would include an Element ID, specifically, the Element ID of the <div> object. Thus, the Element Address for the three <span> objects would be ELEMENT-ID[dvContent]/SPAN[0], ELEMENT-ID[dvContent]/SPAN[0]/SPAN[0], and ELEMENT-ID[dvContent]/SPAN[0]/SPAN[1], respectively. The second and third of these Element Addresses define the <span> objects containing the text "Text 1" and "Text 2," respectively. Therefore, if the content of one of the <span> objects was being refreshed, the system would use the <div> object as the reference point.

Further Enhanced Content Selection

As set forth in the description of the Enhanced Content Selection feature above, the system is operable to analyze objects in the hierarchical lineage of an initially selected content item (or moused-over content item) and is operable to define a group of selectable objects in that lineage. The system is also operable produce a graphical alternate selection interface, such as Slide Bar 410 to permit the user to select an alternate content item in the lineage of the initially selected content item. Preferably, the system creates a graphical selection indicator, such as the temporary border 162, which moves from the initially selected content item to the alternate content item upon the selection of an alternate content item by the user. Such graphical selection indicator may alternatively be a transparent or translucent overlay substantially immediately around or substantially coextensively over the content item.

When analyzing the document to identify and define the group of selectable objects in the document hierarchy, the system preferably skips, or excludes objects that are substantially visually identical or redundant to an (immediate) parent object. Preferably, during the analysis, the system compares the height and/or width dimensions (e.g., in pixels) of the currently analyzed object to that of its parent object to determine if the differences in the corresponding height and/or width dimensions are at least a predetermined value or values (e.g., about 10 pixels). If the differences are less than the predetermined value(s), then the currently analyzed object is excluded from the group of selectable objects and the parent object is set to the currently analyzed object. This process is repeated until an object is found that is sufficiently different than its parent object. Once an object is found that is sufficiently different than its parent object, such object is designated as a selectable object in the group of selectable objects and is represented by one of the positions on the Slide Bar 410 described above.

It has been found that hierarchically sequential objects having differences in height or width dimensions of less than about 10 pixels are typically identical or nearly identical in appearance (and content) and thus appear the same to a user. An example of such similar appearing objects would be an image occupying an entire table cell. In such an instance, the system would exclude the image object, set the table cell object as the currently analyzed object and then analyze the next object in the document hierarchy. If the difference in the height and/or width dimensions between the table cell and that next object are also less than the predetermined value, then the table cell is also excluded and that next object is set as the currently analyzed object.

Also, it has been found that, of all of such apparently identical objects, it is preferable to select the hierarchically uppermost such object as the selectable object to ensure that the content item selected contains all of the object attributes perceived by the user, such as font and color attributes. However, for efficiency purposes, the first selectable content item is preferably the lowermost child object over which the pointing device is located when the initial content item is selected. Therefore, the content item (object) associated with the first position of the Slide Bar 40 may not be the hierarchically uppermost apparent "identical" object.

As described above, during the analysis of the objects in the hierarchy of the web page document, the system is operable to identify (and then select) columns and rows of tables. Preferably, during the analysis, the system excludes columns where the table has only one row and, similarly, excludes rows where the table has only one column. Such one-row columns and one-column rows are visually identical to the cell in the column/row and are, therefore, redundant to the user. This is preferably accomplished by reading the table.children.length property for rows, and the table.children(0).children.length property for columns.

FIG. 37 depicts a web page defined by the code in Table AE, below:

TABLE AE

```
<html>
<head>
<body>
<!-- ##### SAMPLE 1 ##### -->
<table style="border:blue 2px solid">
<tr>
    <td style="border:green 2px solid">Sample 1</td>
</tr>
<tr>
    <td style="border:green 2px solid">Sample 1</td>
</tr>
</table>
<br>
<!-- ##### SAMPLE 2 ##### -->
<table style="border:blue 2px solid">
<tr>
    <td style="border:green 2px solid">Sample 2</td>
    <td style="border:green 2px solid">Sample 2</td>
</tr>
</table>
<br>
<!-- ##### SAMPLE 3 ##### -->
<table style="border:blue 2px solid">
<tr>
    <td style="border:green 2px solid" align="center"><font color="blue" style="border:pink 3px solid"><b style="border:blue 3px solid">Sample 3</b></font></td>
</tr>
</table>
<br>
<!-- ##### SAMPLE 4 ##### -->
<table style="border:blue 2px solid">
<tr>
    <td style="border: green 2px solid" align="center"><font color="blue" style="border:pink 3px solid"><b style="border:blue 3px solid">Sample 4</b></font></td>
    <td style="border:green 2px solid" align="center"><font color="blue" style="border:pink 3px solid"><b style="border:blue 3px solid">Sample 4</b></font></td>
</tr>
</table>
</body>
</html>
```

Referring to FIG. 37, if a cell in the Sample 1 table is chosen, the object associated with the first position of the Slide Bar 410 would be the <bold> tag, since this is the hierarchically lowermost object that the mouse is over when the initial selection is made. After the analysis, the object associated with the second position of the Slide Bar 410 would be the <table> object because the column is excluded in the hierarchical analysis since there is only one column. Similarly, if a cell in the Sample 2 table chosen, the row is excluded since there is only one row.

If a cell in the Sample 3 table is chosen, the object associated with the first position of the Slide Bar 410 would be the <bold> tag. The object associated with the second position of the Slide Bar 410 would be <table> object because this is the next object above the first selected object that has sufficiently different dimensions than its parent object.

If a cell in the Sample 4 table is chosen, the object associated with the first position of the Slide Bar 410 would be the <bold> tag, the object associated with the second position would be the parent cell, and the object associated with the third position would be the parent table. As above, the table row is skipped because there is only one row.

Multiple Clip Mode

Figure 38:
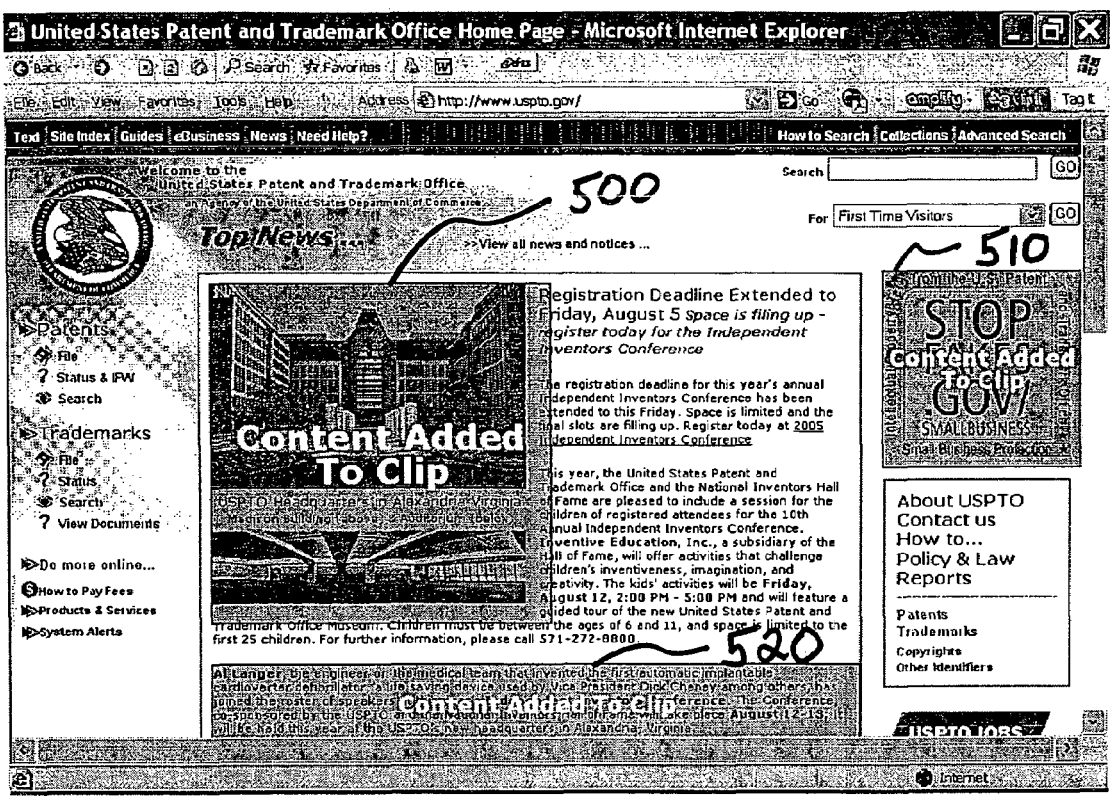
FIG. 38 is an image of an Internet browser application showing multiple graphic selection indicators overlayed over non-contiguous content items in a web page.

Referring to FIG. 38, as an alternative to using the click-and-drag method of selecting multiple content items, the system is preferably operable to select separate content items from different, contiguous or non-contiguous areas of a source web page by receiving and holding a first selection of one or more content items and then receiving and holding subsequent selections of content items (contiguous or non-contiguous with the first and any other previous selections) until the user has selected all desired content items. Preferably, each selection of content items is identified in the source web page by a graphic (i.e., visual) selection indicator 500, 510, 520, such as a colored, translucent overlays substantially coextensively over the selected content items and/or a text overlay, such as the indication "Content Added to Clip," as depicted, or a similar indication. Alternatively, such graphic selection indicator can be a border substantially immediately around the selected content item. Multiple graphic selection indicators are displayed simultaneously and are displayed until the user indicates that the selection process is complete, to provide a clear indication of all of the non-contiguous content items currently selected.

Preferably, the system prohibits (or rejects) the selection of child objects and other inferior objects of previously selected objects in the hierarchy lineage of the source web page, since the separate selection of such a child or inferior objects would be redundant. Similarly, the system preferably discards any previously selected child or other inferior objects upon the selection of a parent or other superior object in the same lineage, since the selection of the parent or superior object makes the previous selection of a child/inferior object redundant. This redundancy check may be accomplished by comparing the unique handles of the objects encompassed by the newly selected content item to the handles of previously selected content items to see if there is a redundancy. Alternatively, a suitable native function of the browser application may be employed, if present, such as the "contains" function of Windows Internet Explorer.

If a selection of a child or inferior object is discarded in favor of a selection of a parent or superior object in the same lineage, the visual selection indicator associated with the discarded selection is preferably moved to indicate the selection of the parent or superior object.

The system preferably simultaneously displays multiple graphic selection indicators 500, 510, 520 for all selected content items (that are in different lineages) until the user indicates that the selection process is complete. Upon receipt of an indication that the selection process is complete, the system stores or saves a definition of the selected content items, exclusive of non-selected ones of the content items displayed in the source web page. The definition may be stored on the user computing device or on a remote computer connected to the network for retrieval at a later time. The definition includes the complete network addresses of the selected content items. Alternately, the system is operable to display the multiple content items into an independent browser window.

Content Marks

Web browser applications commonly provide means for a user to store and organize a local list of "bookmarks" of web pages of interest locally, on their computing device. Such local web page bookmarks include the url, or network address of the web page and, upon selecting one of such local web page bookmarks, the browser application uses the stored url to re-load the associated web page.

There also exist on-line services that allow users to store similar web page bookmarks on a web server accessible over the Internet. Users may "tag" such on-line, web page bookmarks with keywords of their choosing, which keywords are searchable by users via the web server, which then produces a search result list of all such on-line, web page bookmarks tagged with the keyword or keywords.

The system of the present invention provides a significant improvement over the prior local and online web page bookmarks described above by allowing users to create and tag specific content items in web pages with a keyword or keywords, store a definition of the content item along with the keyword(s), and then search the stored definitions using search keywords. Thus, the system provides the ability to create and search novel and heretofore unknown Content Marks. In essence, what a prior on-line web page bookmark does only for an entire web page, a Content Mark of the present invention does for a specific content item of a web page.

The system allows the user to create such Content Marks in a convenient manner without leaving the source web page of the selected content item. Generally, to create a Content Mark, the user first selects the desired content item, tags it with relevant keywords of their choosing and saves it on a designated on-line web server, such as the web server at www.clipmarks.com, and/or on a local computing device. Each Content Mark is saved in the individual user's personal, keyword-searchable collection, on the designated on-line web server.

The specific content items are preferably selected according to any of the content selection methods described above. Accordingly, upon selection of a content item, the system preferably creates and stores a definition of the content item, which definition includes a complete network address of the selected content item (if the content item is file-based) and the keyword(s) entered by the user to tag the Content Mark. Additionally, the system may receive from the user, and store, further user-entered information with respect to the Content Mark, such as a title and a description of the Content Mark. Optionally, the system may permit the user to perform an advanced search of stored Content Marks using any combination of keywords, titles, descriptions, and/or any text within a selected content item.

A major improvement that the system provides over current technology is the ability to easily retain, organize and find the specific content items in web pages which, for example, could be the sixth paragraph of a long article, a quotation from a long blog post, or a photograph embedded in an otherwise cluttered page. Instead of bookmarking the entire page and then trying to remember and find what on that page was of interest to the user, the Content Marks of the present system allow a user to select and rapidly recall the specific content items of interest. Significantly, by enabling users to tag each Content Mark with relevant keywords, the system facilitates a high level of personal content organization that has not been realized before.

In addition to personal collections (i.e., private Content Marks), that are accessible and searchable only by the particular user that created the Content Mark, each saved Content Mark can be added to a public collection (i.e. public Content Marks) that is RSS compatible and accessible and searchable by any user. An important consequence of people using Content Marks to manage content is that they will have the opportunity to build a valuable resource of human-filtered content items that enables others to quickly and conveniently find relevant, specific content items. So, any user will be able to begin or augment their quest for information by visiting the web server and searching the public collection for information that has already been gathered and tagged by other users.

Figure 39:
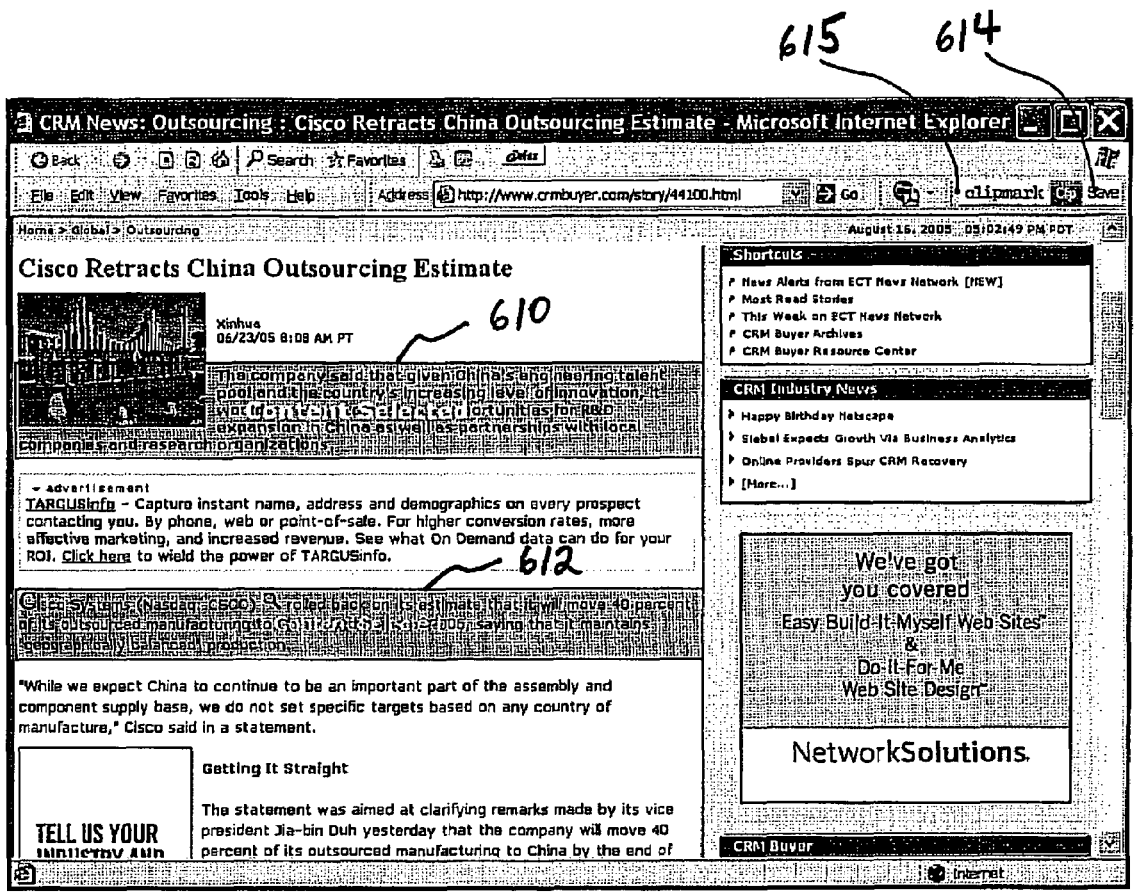
FIG. 39 is an image of an Internet browser application showing the selection of multiple content items for a content mark.
Figure 41:
FIG. 41 is an image of a Search Results List of matching definitions of content marks.

Referring to FIGS. 39-41, if a user is doing a research project on, for example, outsourcing to China, the user will likely use a browser application to read many online articles and studies on the subject. As the user finds content items on a web page that are of interest, the user may simply select the content items 610, 612 using any of the methods described above. The user may then save a definition of the selection by clicking on a Save icon 614 in the toolbar 615. Upon selection of the Save icon 614, the system produces a Content Mark Save interface 618 which provides a Preview 620 of the selected content item and provides user input areas 622, 624 and 626 for the keyword(s), Title, and Comments/Description, respectively. The Content Mark Save interface 618 also preferably includes a means to designate the Content Mark as a public Content Mark, such as a "Public Library" check box 627. In the present example, the user has given (i.e., tagged) the Content Mark the keyword "outsourcing", the title "China Outsourcing" and the Comments/Description "User-entered description." The user may then permanently save the definition of the Content Mark by clicking on the Save icon 628.

Later, the user may then access the on-line server and perform a keyword search via a Content Mark Search 630 for all their Content Marks tagged with the keyword "outsourcing" to access and recall all the information that they felt was pertinent. Preferably, the search may be limited to the user's private collection (e.g., "My Library") or may include the public library of Content Marks. Preferably, the system also provides an "advanced" search feature (not shown) that enables users to search any combination of the keywords, title, comments/description and any text within a selected content item.

Upon performing a search, the system provides a Search Results List 632 in a web browser, which list includes all of the Content Marks that were tagged with the searched keyword. The selected content items 610 associated with the Content Mark are loaded from their original network locations (if file-based) and are displayed in the search results list exclusive of non-selected content items of the original source web page. A hypertext link 634 (or non-hypertext link text url) is also displayed adjacent each displayed content item 610, which, when selected (or followed), loads the original source web page of the associated content item in a browser window. Further, the associated keyword(s) and the associated title and description (if any) are displayed adjacent the associated content item.

Optionally, if the content item is a post from a web log (blog), the definition may include, and the Search Results List may display, a hypertext link to a discrete web page for the particular blog post. Preferably, if the selected content item is a blog post, the system searches the original source web page for a so-called "permalink" for the post and retains any such permalink in the definition of the Content Mark.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed:

1. A system for creating, storing and searching content marks for selected content items of web pages, comprising:

a user computing device having a network browser application and a user pointing device;

said browser application being operable to display a source web page having a plurality of displayed content items;

said browser application being operable to select a selected content item from among said plurality of displayed content items, said selected content item being selected exclusive of non-selected ones of said plurality of displayed content items, and said selected content item being selected in response to input from a user through said pointing device;

said browser application being operable to receive an input from said user of a keyword associated with said selected content item, said keyword being created by said user;

said browser application being operable to save a definition of said selected content item in a database of stored definitions, said definition including said keyword associated with said selected content item;

said browser application being operable to search said database of stored definitions using a search keyword and being operable to produce a search results list comprising matching definitions having associated keywords matching said search keyword; and said search results list being displayed in a browser window and including a display of associated content items associated with each matching definition, each associated content item being displayed exclusive of non-selected content items of an original source web page of said associated content item.

2. The system as in claim 1, wherein:

said database of stored definitions is stored on a server accessible by a plurality of users over the Internet;

said browser application is operable to receive a designation from said user of said definition as being either a public definition, accessible and searchable by any user, or as being a private definition, accessible and searchable only by said user.

3. The system as in claim 2, wherein:

said browser application is operable to receive an input from said user of a title and a description of said definition; and said search results list includes a title and a description of each said matching definition.

4. The system as in claim 3, wherein:

said browser application is operable to search said database of stored definitions using any combination of said keywords, title or description.

5. The system as in claim 1, wherein:

said search results list includes a hypertext link or displayed url adjacent each of said associated content items, said hypertext link or displayed url being a complete network location of an original source web page of an adjacent associated content item;

whereby said user can retrieve said original source web page of an associated content item by following said hypertext link or displayed url.

6. The system as in claim 5, wherein:

said source web page is a web log and said selected content item is from a post from said web log;

said source web page includes a permalink associated with said post, said permalink leading to a discrete web page for said post;

said definition includes said permalink; and said search results list includes a display of said permalink.

7. The system as in clam 1, wherein:

said browser application is operable to select a second selected content item from among said plurality of displayed content items, said second selected content item is selected exclusive of said non-selected ones of said plurality of displayed content items, and said second selected content item is selected in response to input from said user through said pointing device, and said definition includes a definition of said selected content item.

8. The system as in claim 1, wherein:

said selected content item is file-based:

said definition includes a complete network address of said selected content item; and in said search results list, each associated content item that is file-based is loaded from an original network location thereof.

9. The system as in claim 1, wherein:

said system is operable to search text of content items of definitions in said database of stored definitions.

10. A system for creating, storing and searching content marks for selected content items of web pages, comprising:

a user computing device having a network browser application and a user pointing device;

said browser application being operable to display a source web page having a plurality of displayed content items;

said browser application being operable to select a selected content item from among said plurality of displayed content items, said selected content item being selected exclusive of non-selected ones of said plurality of displayed content items, and said selected content item being selected in response to input from a user through said pointing device;

said browser application being operable to receive an input from said user of a keyword associated with said selected content item;

said browser application being operable to save a definition of said selected content item in a database of stored definitions, said definition including said keyword associated with said selected content item;

said browser application being operable to search said database of stored definitions using a search keyword and being operable to produce a search results list comprising matching definitions having associated keywords matching said search keyword;

said search results list being displayed in a browser window and including a display of associated content items associated with each matching definition, each associated content item being displayed exclusive of non-selected content items of an original source web page of said associated content item;

said search results list includes a hypertext link or displayed url adjacent each of said associated content items, said hypertext link or displayed url being a complete network location of an original source web page of an adjacent associated content item;

whereby said user can retrieve said original source web page of an associated content item by following said hypertext link or displayed url;

said source web page is a web log and said selected content item is from a post from said web log;

said source web page includes a permalink associated with said post, said permalink leading to a discrete web page for said post;

said definition includes said permalink; and said search results list includes a display of said permalink.

* * * * *